US012579688B2

(12) United States Patent
Srivastava

(10) Patent No.: US 12,579,688 B2
(45) Date of Patent: Mar. 17, 2026

(54) SOFTWARE ENGINE ENABLING USERS TO INTERACT DIRECTLY WITH A SCREEN USING A CAMERA

(71) Applicant: Subversus Interactive LLC, Albany, CA (US)

(72) Inventor: Vishal Srivastava, Albany, CA (US)

( * ) Notice: Subject to any disclaimer, the term of this patent is extended or adjusted under 35 U.S.C. 154(b) by 388 days.

(21) Appl. No.: 17/682,512

(22) Filed: Feb. 28, 2022

(65) Prior Publication Data

US 2022/0277484 A1     Sep. 1, 2022

Related U.S. Application Data

(60) Provisional application No. 63/154,193, filed on Feb. 26, 2021.

(51) Int. Cl.
*G06T 7/73*          (2017.01)
*G06F 3/04815*     (2022.01)
*G06N 3/006*        (2023.01)

(52) U.S. Cl.
CPC ............ *G06T 7/75* (2017.01); *G06F 3/04815* (2013.01); *G06N 3/006* (2013.01); *G06T 2207/30196* (2013.01); *G06T 2207/30204* (2013.01)

(58) Field of Classification Search
CPC ............ G06T 7/75; G06T 2207/30196; G06T 2207/30204; G06T 2207/30244; G06T 7/246; G06F 3/04815; G06F 3/011; G06F 3/017; G06F 3/0304; G06F 3/0346; G06F 3/03545; G06F 3/04883; G06N 3/006
See application file for complete search history.

(56) References Cited

U.S. PATENT DOCUMENTS

| | | | |
|---|---|---|---|
| 11,003,308 B1 * | 5/2021 | Dryer ................. | G06F 3/04845 |
| 11,610,331 B2 * | 3/2023 | Kim ...................... | G06V 40/103 |
| 2012/0299876 A1 * | 11/2012 | De Leon .............. | G06F 3/0425 |
| | | | 345/175 |
| 2016/0217590 A1 * | 7/2016 | Mullins .................... | G06T 7/40 |
| 2021/0208232 A1 * | 7/2021 | Alwood ............... | G01S 5/0284 |

* cited by examiner

*Primary Examiner* — Han Hoang
(74) *Attorney, Agent, or Firm* — Nixon & Vanderhye PC

(57)          ABSTRACT

The technology of this application relates to a software engine that enables a user to interact with a display (e.g., television) by using an image capture device (e.g., camera). In one non-limiting example, a user can operate a device (such as a mobile phone) to run an application that interfaces with the software engine, so that the device's camera can operate in unison with a separate display to enable unique types of user interactions. For example, the user may use such an application to tap a user interface button or draw a shape with their hand, directly on the surface of a larger display (e.g., television), in view of the mobile phone's camera; the application's visual state would update in response to the user's captured gestures and to the position and orientation of the mobile phone. In another non-limiting example, a user, while playing a game utilizing the software engine, swings a device (such as a mobile phone) in free space, to control the position and orientation of a paddle within the three dimensional scene of the game, presented on the larger display.

20 Claims, 52 Drawing Sheets

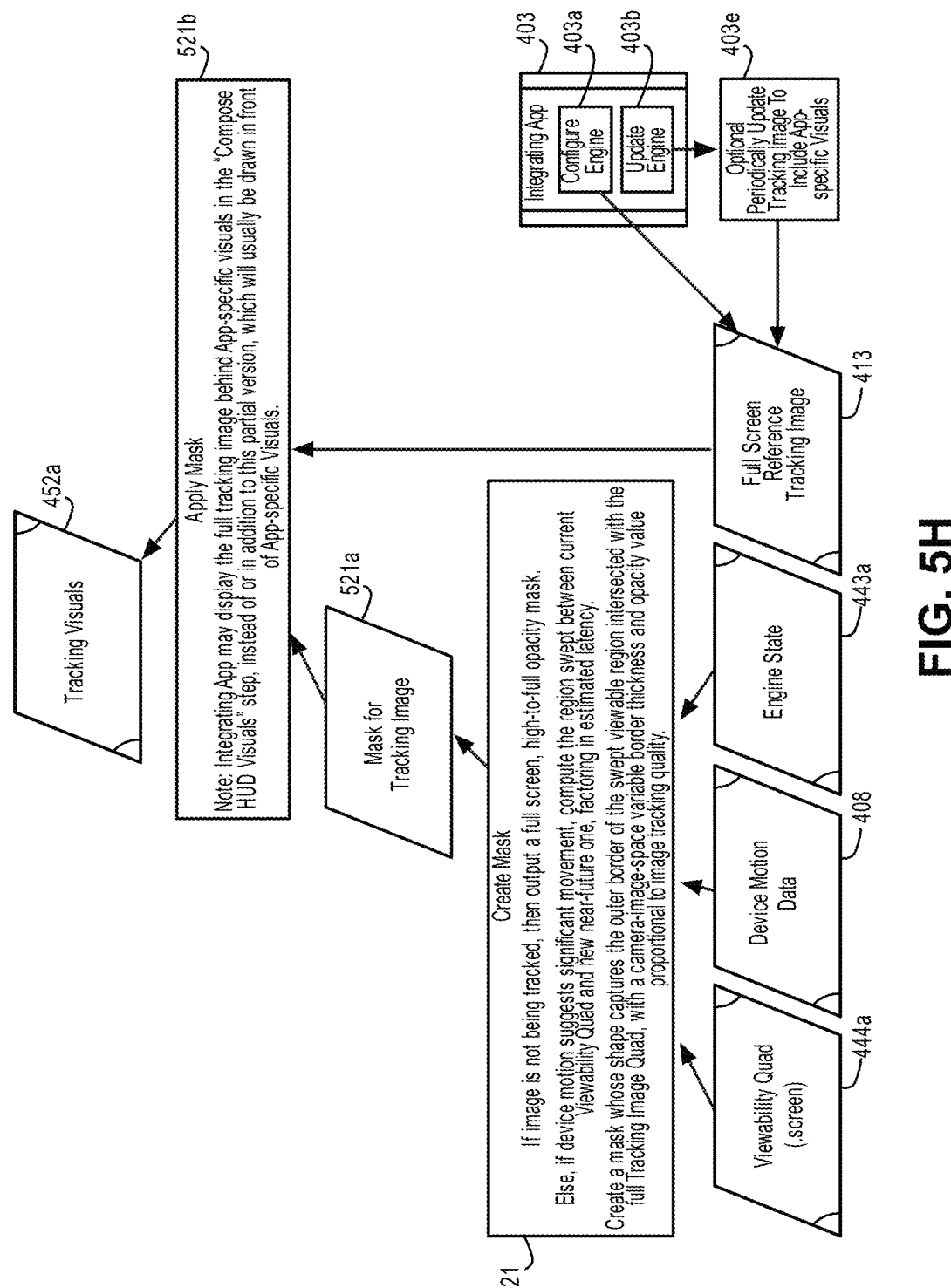

FIG. 5H

Tracking Visuals — 452a

Apply Mask — 521b

Note: Integrating App may display the full tracking image behind App-specific visuals in the "Compose HUD Visuals" step, instead of or in addition to this partial version, which will usually be drawn in front of App-specific Visuals.

Mask for Tracking Image — 521a

Create Mask — 521

If image is not being tracked, then output a full screen, high-to-full opacity mask.

Else, if device motion suggests significant movement, compute the region swept between current Viewability Quad and new near-future one, factoring in estimated latency.

Create a mask whose shape captures the outer border of the swept viewable region intersected with the full Tracking Image Quad, with a camera-image-space variable border thickness and opacity value proportional to image tracking quality.

Integrating App — 403
Configure Engine — 403a
Update Engine — 403b

Optional Periodically Update Tracking Image To include App-specific Visuals — 403e Full Screen Reference Tracking Image — 413

Engine State — 443a

Device Motion Data — 408

Viewability Quad (.screen) — 444a

111

111a 124f     124g     124h     124i     124j

125

120

127

Transform: .touch

Transform: .cameraImage

Transform: .screen

Transform: .trackingPlane

Transform: .cameraView

Visual Field Example - Breakdown
Human Body/Hand
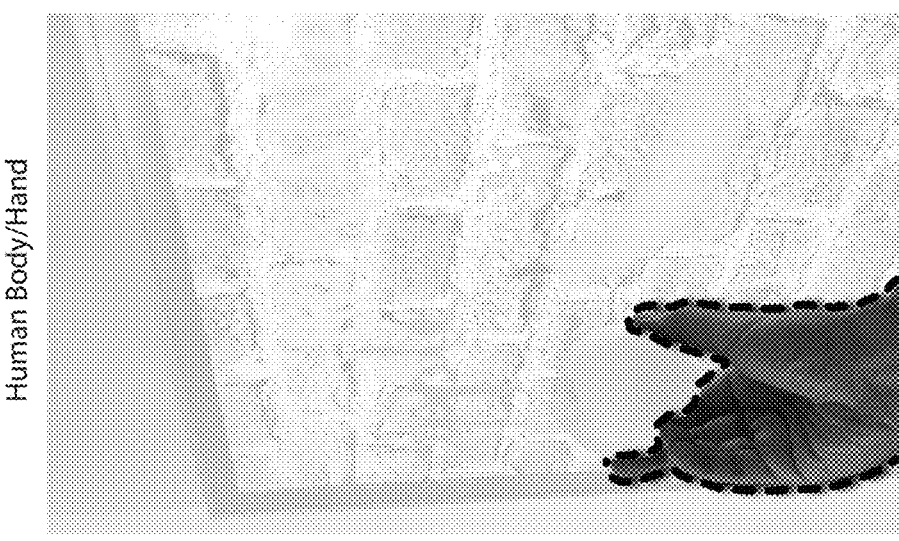
Visual Field Surrounding Screen
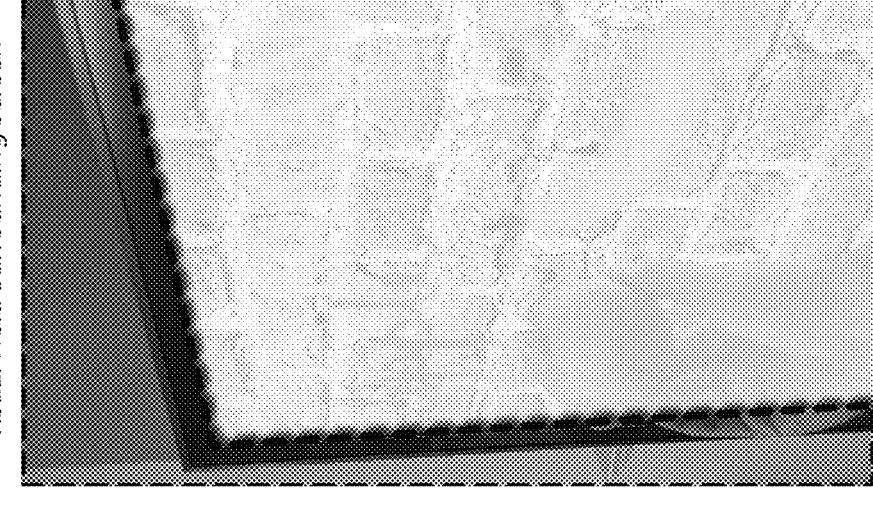
Full Visual Field
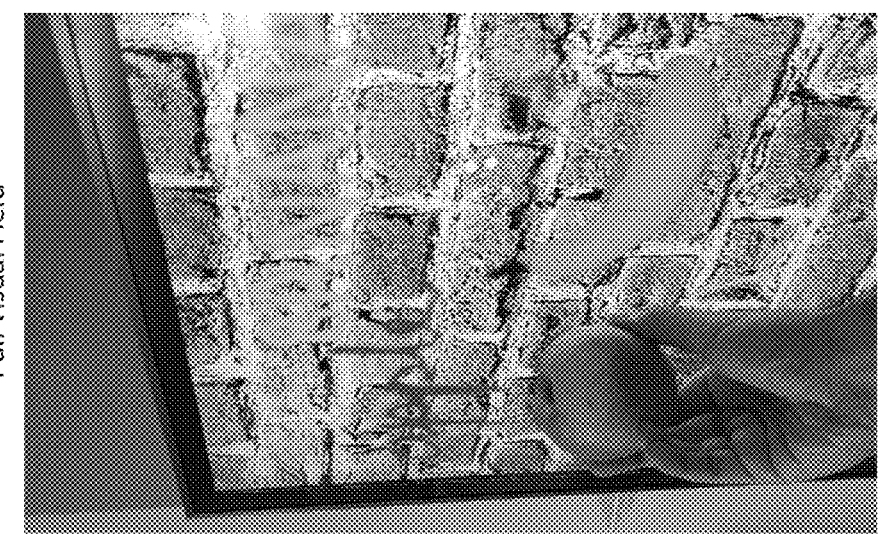
FIG. 8B-2

Visual Field Example - Breakdown
Tracking Image Visuals
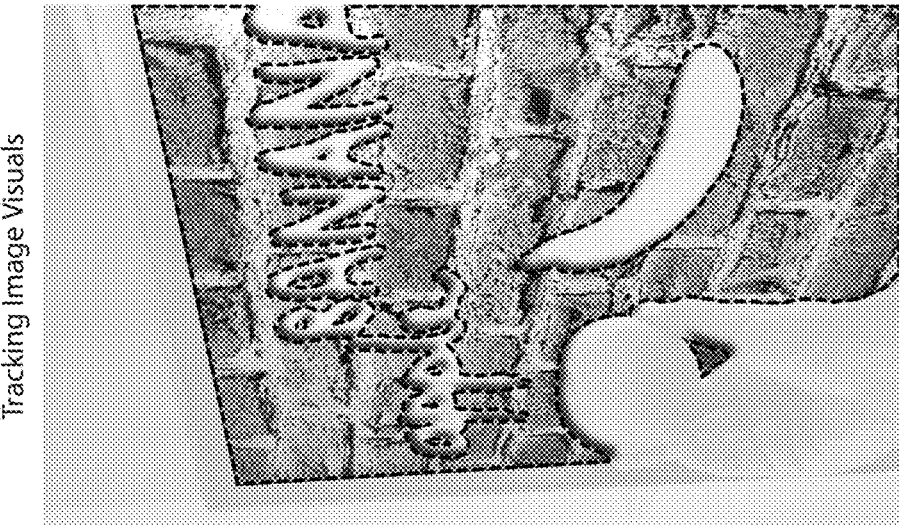
App-specific Visuals
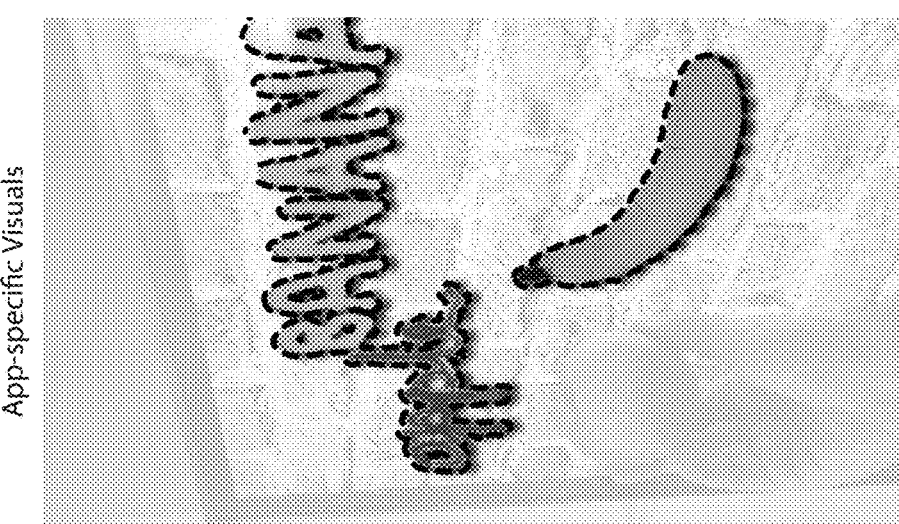
Other Occluding Objects
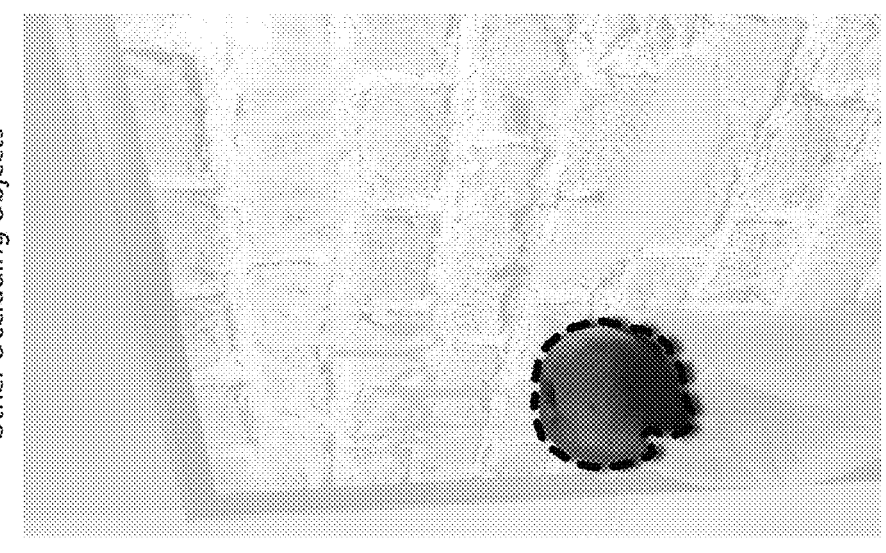
FIG. 8B-3

SOFTWARE ENGINE ENABLING USERS TO INTERACT DIRECTLY WITH A SCREEN USING A CAMERA

CROSS REFERENCE TO RELATED APPLICATION(S)

This application claims priority to U.S. Patent Application No. 63/154,193, filed Feb. 26, 2021, the entire contents of which are incorporated herein by reference.

TECHNICAL OVERVIEW

Modern electronic device (e.g., mobile phones, tablets) have revolutionized the ways in which users interact with the device. For example, touch screen displays on mobile phones and tablets allow users to enter more dynamic inputs such as swipes, pinches, taps, and other various methods. Likewise, many mobile phones and tablets contain various inertial sensing components (e.g., gyroscopes, accelerometers) that provide greater data as to how the device is being held in free space.

While modern electronic devices offer a greater degree of freedom in user input and interaction, these devices still have various limitations with how a user can operate the device. For example, modern electronic devices have very small displays (typically on the order of several inches) and thus the ability for a user to interact with the device while also view what is being displayed can be limited (or disrupted). As such, it should be appreciated that new and improved methods of using these devices is continually sought after.

COPYRIGHT NOTICE

BRIEF DESCRIPTION OF THE DRAWINGS

FIGS. 8A-1 to 8B-3 show further non-limiting example illustrations associated with various aspects of system 1.

DETAILED DESCRIPTION OF EXAMPLE NON-LIMITING EMBODIMENTS OF THE TECHNOLOGY

Figure 1A:
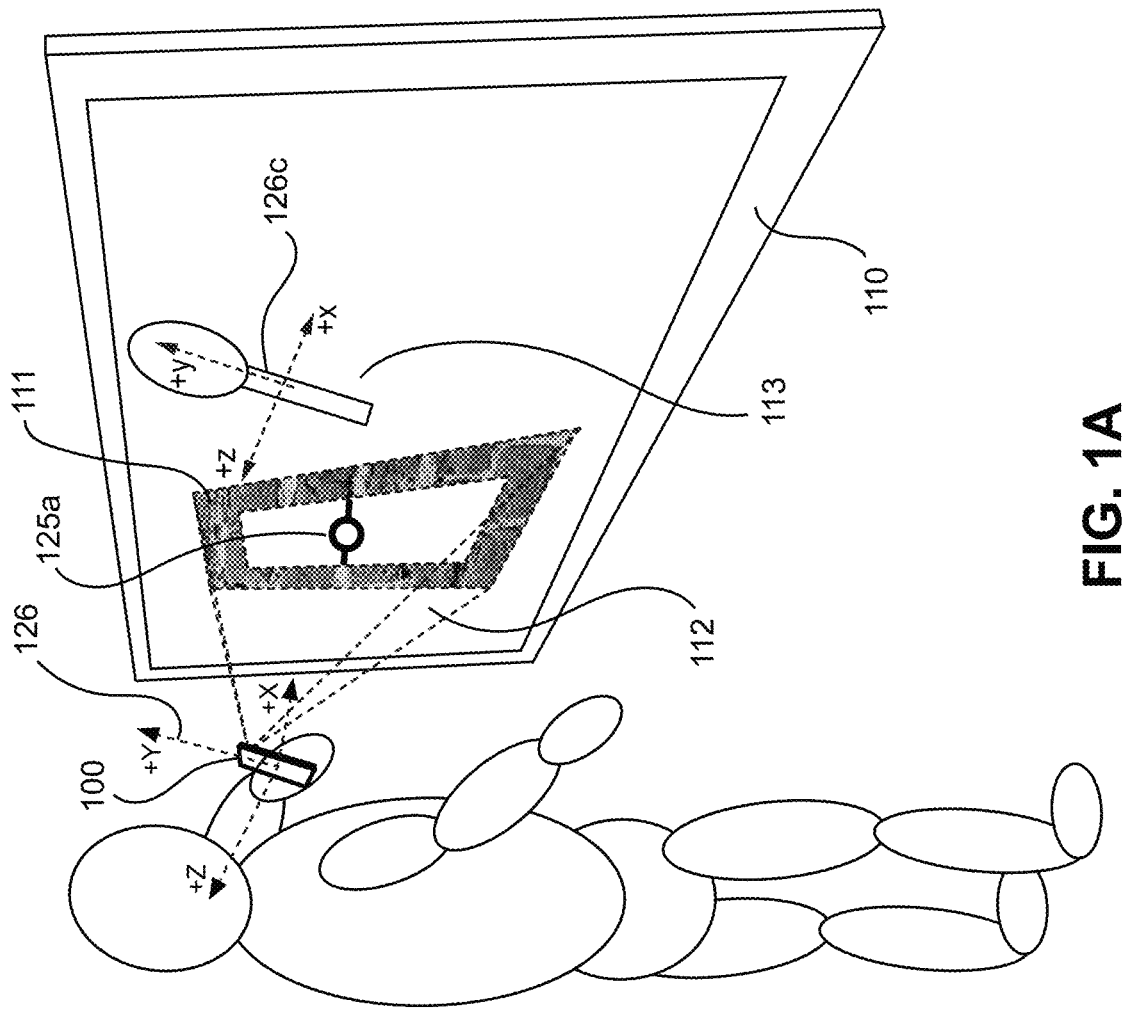
FIGS. 1A-C show non-limiting examples of a system 1 where the software engine described herein may be utilized.

As discussed herein, certain technology exists to allow a user to interact with an electronic device. For example, touch screen displays allow the user to view what is shown on the screen while also entering input via interacting with the display (e.g., touch input, swiping). Moreover, inertial sensor data and other data for determining position, orientation, and even location of the device (e.g., GPS data) allows the technology to have a greater degree of freedom in understanding how the user is operating the device. However, various limitations exist in the conventional technology. For example, many electronic devices have small displays that hinder the user ability to both interact with the display and view what is being displayed.

The technology of this application relates to, in part, a software engine that enables a user to interact with a separate display using an image capture device (e.g., camera). In one non-limiting example, a user can use a device (such as a mobile phone) to install and use the software engine so that the user can operate the device while also interact with a larger display. For example, the user may use an application using the software engine to draw or enter other inputs using a mobile device where such inputs cause a larger display (e.g., television) to display and provide various output. In a specific example, the user may move their hand in front of an image capture device where the separate display can generate and display a resultant output (e.g., draw an image).

In one example embodiment, the user can point a camera of a mobile phone at a television, and an application, installed on the mobile phone and using the software engine, can determine how the phone is being held with respect to the television. For example, the application may generate a tracking image displayed on the television, and the application can detect various features in the tracking image to understand how the camera is being directed at the television. Using this information, the application may understand how an orientation of the device, or how far the device is from the television. The user may use the mobile device to enter various input and such input can be reflected in the television display using the application. For example, the mobile device may be running a drawing application and the user uses a hand or stylus in front of the image capture device, in free space or on or near the surface of the television, to produce a corresponding drawing shown on the television. The user may also "point" with the image capture device to draw with the device (e.g., similar to a "spray can"), with the target located at the focal point of its camera. The user may also use a hand or stylus to interact with user interface elements displayed on the television, such as by tapping a button.

Likewise, the user could be playing a table tennis video game on the mobile device and can operate the mobile device as a paddle in free space, where the real world position and orientation of the image capture device will be reflected (e.g., mimicked by the paddle) in the gameplay shown on the television. These examples are of course non-limiting and the technology described herein envisions any variety of methods in which the software engine can use the data associated with the device to perform various processes.

In another non-limiting example embodiment, the technology described herein enables a user to use an image capture device to capture an image of a real world object and depict the same in a virtual environment. In one non-limiting example, the user could direct the camera to a target that includes a tracking image where the tracking may have one or more detectable features. The user could place an object in front of the camera in a viewing direction of the tracking image and the object (e.g., in the "real world") would be captured in an image obtained by the camera. The captured image of the object may then be depicted in a representation shown on a display associated with the camera (e.g., mobile phone display, tablet display, television). For example, the user could place a real banana in front of the camera and the software engine could capture the object by "excluding" other elements in the captured image. The captured object could then be displayed on a display device (e.g., a banana "captured" against a whiteboard backdrop).

In yet another non-limiting example embodiment, the various embodiments described herein may be combined and/or modified. For example, an application using the software engine described herein may allow a user to point the camera at a television display where various features may be detectable in a tracking image shown on the display. The user may then place a real world object (e.g., banana) in front of the camera while the camera is pointed at the television, and an object can then be shown on the television that replicates the banana's position and orientation. Likewise, various markers of the real world object (e.g., banana) may be detected, and the detected markers can be used to operate a virtual object (e.g., cursor). These examples are of course non-limiting and the technology described herein envisions any variety of approaches for implementing the systems and methods described herein.

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Figure 1B:
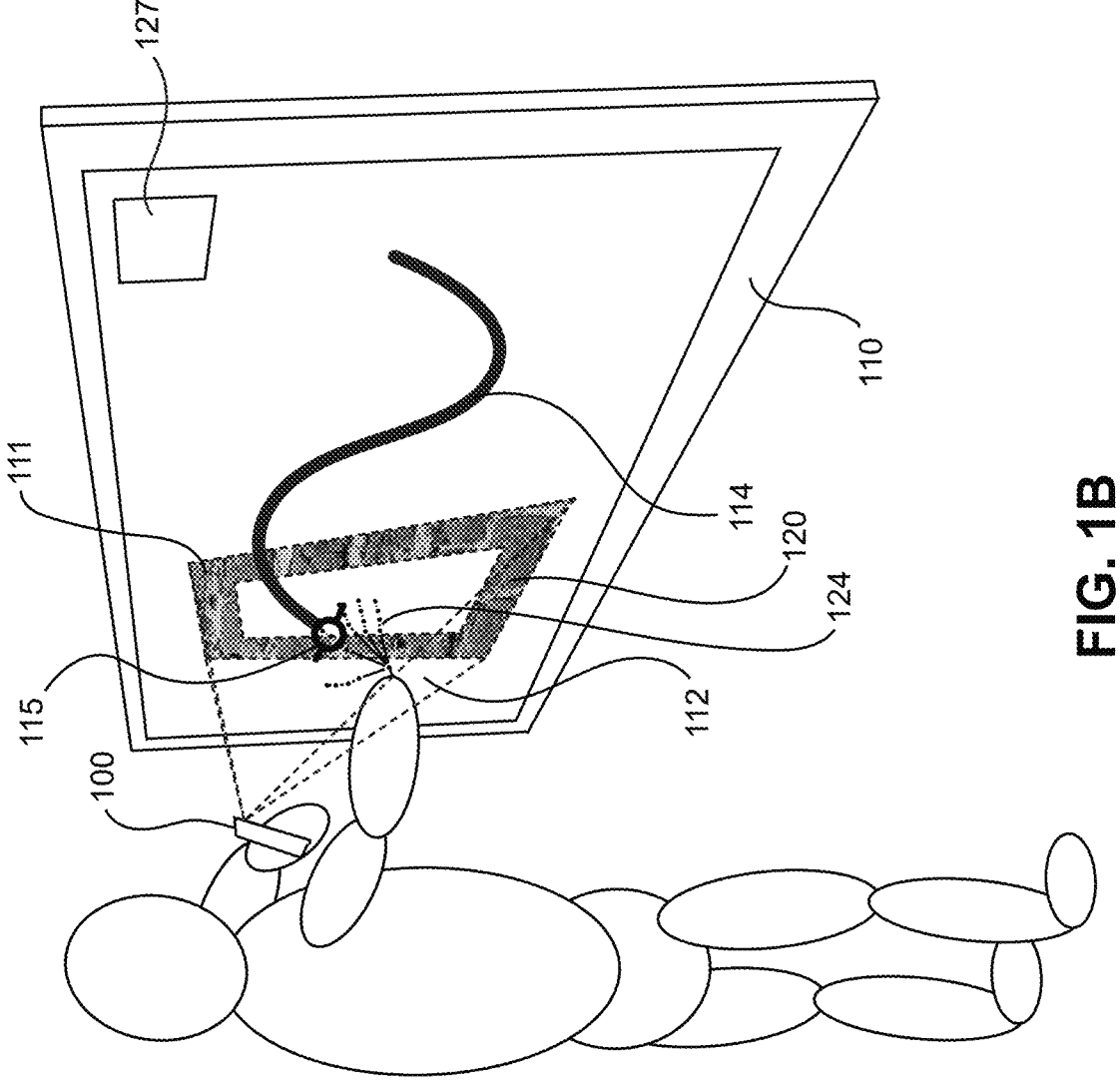
Figure 1C:
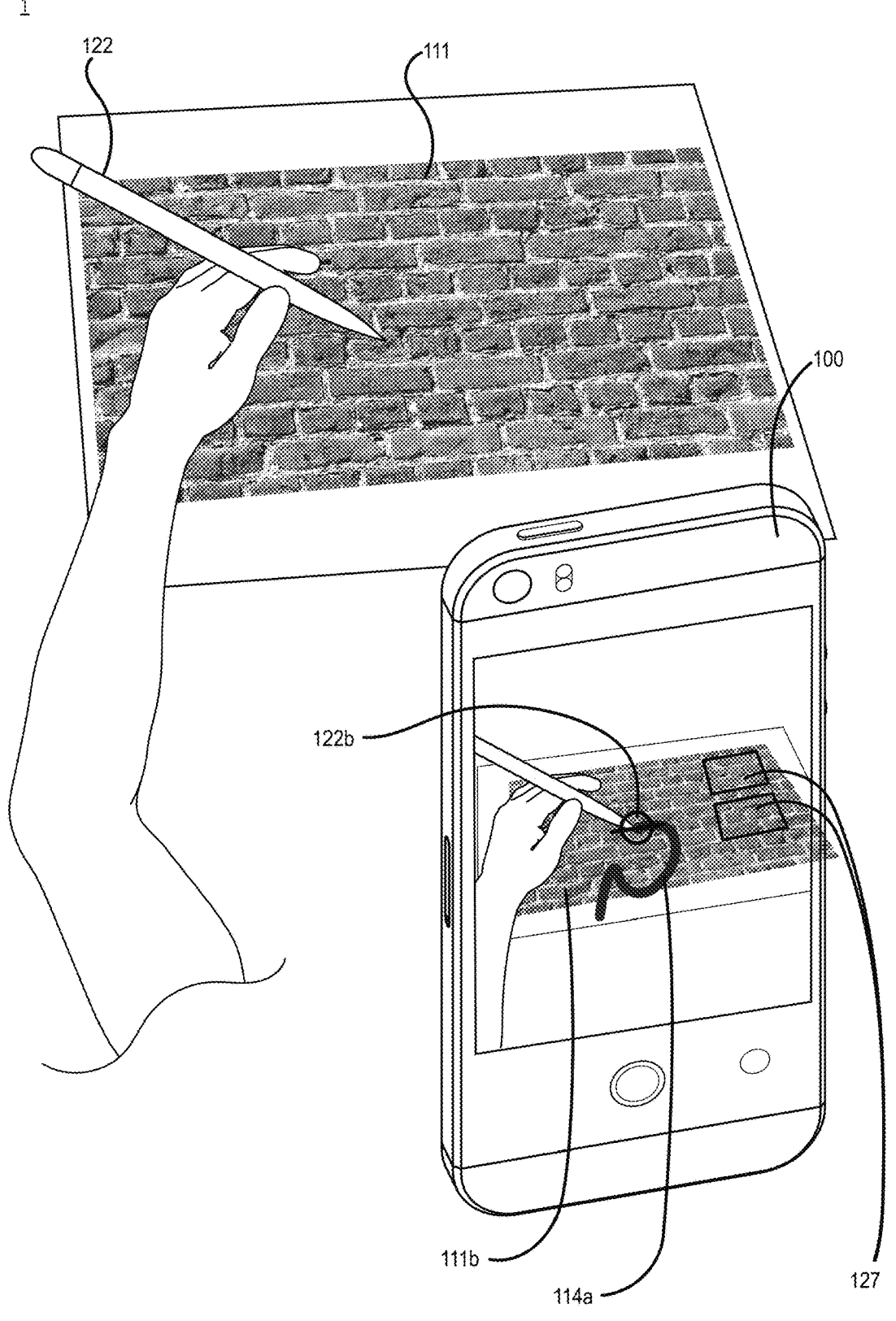

FIGS. 1A-C show non-limiting examples of a system 1 where the software engine described herein may be utilized. In the examples shown in FIGS. 1A and 1B, a user may hold or wear an electronic device 100 (e.g., mobile phone, tablet, remote control, light gun, mixed reality headset, computer) where the electronic device 100 can include an image capture device (e.g., camera). As can be seen in FIG. 1A, the user may hold the electronic device 100 so as to point an image capture device toward a display 110. The display 110 can be any device capable of displaying image/video data including, but not limited to, a cathode ray tube (CRT) television, a light emitting diode (LED) television, a liquid crystal display (LCD) television, a plasma television, a digital light processing (DLP) television, a rear projection television, an organic LED (OLED) display, a quantum LED, a computer monitor, and/or a video game monitor, among other displays. It should be appreciated that the display 110 could include a surface (e.g., projector screen) capable of receiving a projected image (e.g., from a projector), or any other type of display for displaying an image/video.

In the example of FIG. 1A, display 110 includes tracking image(s) 111 (hereinafter referred to as tracking image 111) that include one or more features detectable by device 100. For example, display 110 could include a partial tracking image 111 including several features, where the device 100 can detect the different features in tracking image 111. In one example, display 110 may display a "whiteboard" image. Display 110 may further show a tracking image 111 shown as a cropped image of bricks where features in the "bricks" are captured by an image capture device and detected by electronic device 100. As discussed herein, the software engine can utilize outputs associated with the detected features to understand various information associated with device 100 and allow an application running on device 100 to utilize the data in execution.

It should be appreciated that the image capture device of electronic device 100 can be a separate component of electronic device 100. That is, image capture device can be one of many components of electronic device 100, or image capture device can be a physically separable component from electronic device 100. Moreover, electronic device 100 can be entirely formed as an image capture device. That is, electronic device 100 can constitute the entire image capture device and can be used to capture an image (e.g., and send the captured image data to a separate information processing device).

An image capture device of electronic device 100 may include a pyramid of vision 112 in which the image capture device "views" the tracking image 111 shown on display 110. In more detail, pyramid of vision 112 can represent a volume of space visible by an image capture device of electronic device 100. A three-dimensional geometry of a top part of pyramid of vision 112, truncated on display 110, can be made for use in three-dimensional scenes. Operation of electronic device 100 can result in avatar 113 displayed and moved in association with operation of device 100. FIG. 1A also depicts camera transform 126 and camera focus cursor 125a, which is discussed in more detail herein.

FIG. 1B shows another non-limiting example of system 1 where the software engine can be utilized. In the example shown in FIG. 1B, a user is operating the electronic device 100 in a manner similar to that shown in FIG. 1A. In FIG. 1B, the user has positioned an object (e.g., hand) in front of an image capture device of electronic device 100. The user can move the object (and also move electronic device 100) so that the image capture device of electronic device 100 captures the object. In the example shown in FIG. 1B, the user's index fingertip touching the display is detected by engine 200, and a cursor 115 is generated and displayed at that point. In one example embodiment, the software engine can produce output usable by an application to generate a visual display. In the example shown in FIG. 1B, a drawing object 114 is displayed as a line being drawn on display 110. FIG. 1B further shows user interface button(s) 127 in which a user interface button may be displayed. Likewise, FIG. 1B also shows articulated hand skeleton 124 and viewability quad 120. These examples are of course non-limiting and the technology described herein envisions any variety of applications usable in association with the software engine described herein.

FIG. 1C shows another non-limiting example embodiment of system 1. In the example shown in FIG. 1C, a user is holding device 100 and pointing the camera of device 100 in a direction of a target object (e.g., paper) with the tracking image 111b printed thereon. Similar to tracking image 111 shown in FIGS. 1A and 1B, tracking image 111b includes various detectable features in the image that allow device 100 to capture and be detected by software engine 200. In the example shown in FIG. 1C, the user is holding stylus 122 where stylus tip is detected by engine 200 and stylus tip cursor 122b is generated (and displayable).

As can be seen in FIG. 1C, camera device 100 can display various user interface buttons 127 (e.g., from a software application running on device 100) on a display of device 100. A user may operate any of buttons 127 by touching an area of the display of device 100. Alternatively, the user could point to the buttons 127 in free space (e.g., using stylus 122) where the button 127 could be selected using a specified action (e.g., holding the stylus 122 tip over the button 127 for a period of time, motioning toward the button 127 in a manner appear to select button 127). The user can move the stylus 122 in free space to generate a drawing 114a shown on the display of device 100. In doing so, the system 1 shown in FIG. 1C allows the user to operate device 100 in an augmented reality environment. These examples are of course non-limiting and the technology described herein envisions any variety of methods in which the software engine can utilize the various data captured by image capture device 100. For example, the embodiments shown in FIGS. 1A, 1B, and/or 1C can be combined and used together.

It should be further appreciated that the examples shown in FIGS. 1A-C may include other various components (e.g., other than a display and camera device). For example, system 1 could include an additional device (e.g., a console, micro console, digital media player) may be connected to display 110 where software engine 200 running on camera device 100 can communicate with the additional device. Likewise, various components of software engine 200 may be distributed across multiple devices. That is, software engine 200 may incorporate components on camera device 100, display 110, and/or one or more additional devices, as discussed herein. It should be further appreciated that software engine 200 may run on a distributed computing platform (e.g., cloud computing platform) where display 110 may act as a "dummy terminal" obtaining data from the distributed computing platform running engine 200, and/or device 100 may provide data to said platform.

Figure 2:
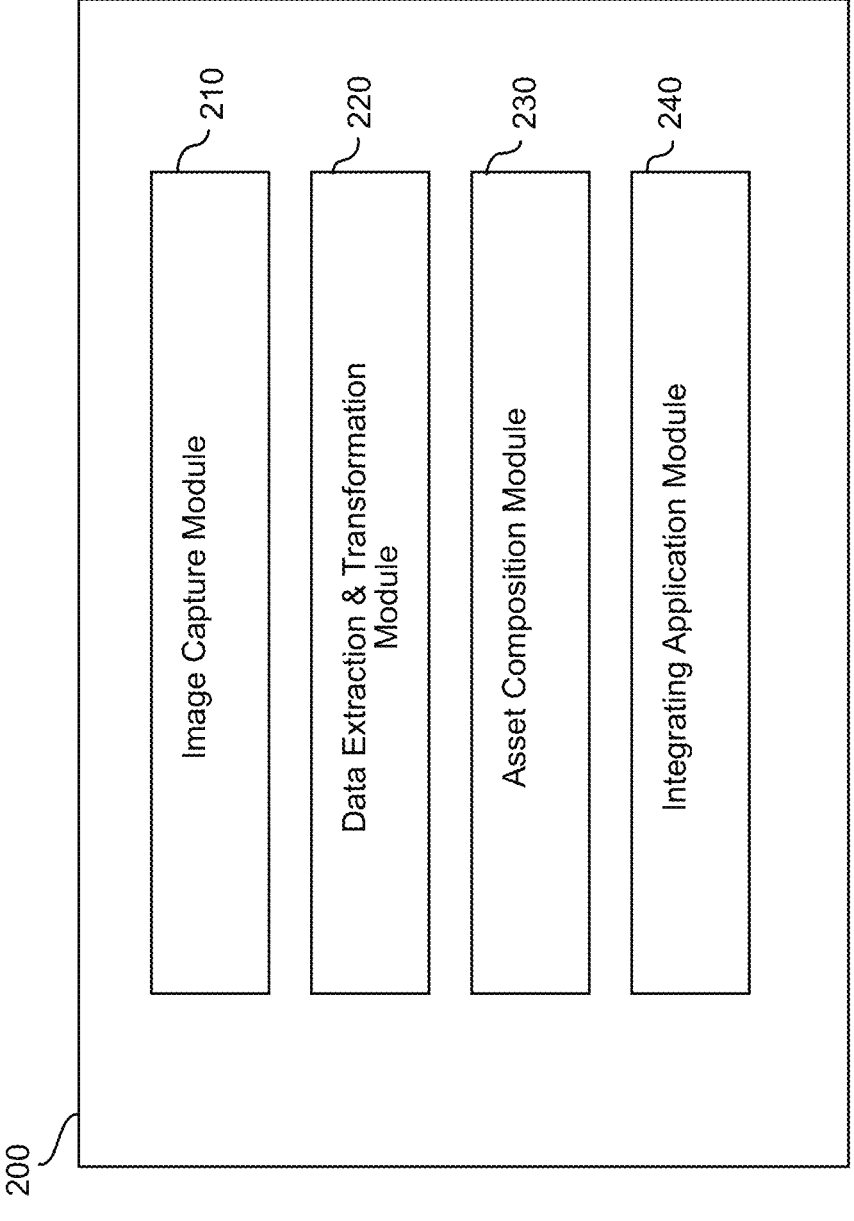
FIG. 2 shows a non-limiting example block diagram of software engine 200 in system 1.

FIG. 2 shows a non-limiting example block diagram of software engine 200 in system 1. In the example shown in FIG. 2, software engine 200 contains various modules for execution software processes associated with system 1. In one non-limiting example, software engine 200 can include an image capture module 210, a data extraction and transformation module 220, an asset composition module 230, and/or an integrating application module 240. These examples are of course non-limiting and the technology described herein envisions any variety of modules utilized by software engine 200.

Image capture module 210 may be configured to capture images captured by image capture device of electronic device 100. In one non-limiting example, image capture module 210 can capture one or more image elements captured by an image capture device 100. The image capture module 210 can generate image data usable by system 1 and software engine 200.

Data extraction and transformation module 220 (hereinafter referred to as DET 220) can extract certain elements in a captured image (e.g., a two-dimensional image) where such information can be used by the software engine 200 during execution. For example, DET 220 can use various image recognition and processing techniques to identify and extract items from a captured image. In one example, DET 220 may extract elements corresponding to detected features in an image. DET 220 may also extract elements corresponding to real world objects captured in the image. DET 220 is configured to extract elements contained in a still image, and can also extract elements from each frame of moving image data.

DET 220 may be configured to process various elements captured by image capture module 210. In one non-limiting example, DET 220 may be configured to identify elements from image data to aid software engine 200 in understanding what an image capture device is viewing. For example, DET 220 can identify features detected in a two-dimensional image to confirm that the image capture device is being pointed at a particular target. In one example, DET 220 can identify features extracted from image capture module 210 and use the identified features to determine how the device 100 is being held relative to the features (e.g., of an image on display 110). For example, DET 220 may identify a size of the detected features and, using other information (e.g., a known size of a television display), determine how far device 100 is positioned relative to the detected features.

Similarly, DET 220 may also use the relative size of each of the features to determine how the device 100 is being held relative to the features. For example, if a rectangular image is detected, and one side of the rectangle appears larger than the other side, such information may indicate to DET 220 that the device 100 is being held in a manner such that the image capture device of device 100 is at an orientation tilted in a manner such that it is "closer" in free space to the larger side compared to the smaller side. That is, if the detected features constitutes a rectangular image, and a left side of the rectangle is larger in the image compared to the right side, DET 220 may determine that device 100 is positioned at an angle such that the camera of device 100 perceives the rectangle to be "closer" on the left than the right. By understanding such information, software engine 200 may understand both the orientation and position of device 100 relative to a target.

DET 220 may identify other various elements in the image data captured from image capture module 210. For example, DET 220 may identify a marker as a real world object such as a user hand, a piece of fruit, a writing utensil, or any other various object. In one non-limiting example, DET 220 may recognize various joints in a user hand and may recognize items such as knuckles, fingertips, as well as other elements. DET 220 may detect in a captured image an elongated object in a user's hand, that was previously scanned or otherwise recognized, such as a stylus or some other writing utensil. DET 220 may also recognize a tracking image displayable by a display device. For example, a tracking image may have a variety of features throughout the image, or the entire image itself may constitute the tracking image. DET 220 can utilize such information of the tracking image in a similar manner described herein to process and understand various aspects of how device 100 is being held relative to the tracking image.

It should be appreciated that DET 220 may utilize various machine learning techniques to improve the recognition and extraction process. For example, DET 220 may maintain a history of previously captured images (e.g., in a database memory) in which image DET 220 may reference when extracting and identifying elements. In doing so, DET 220 may improve the ability to "learn" what elements are contained in a given image.

DET 220 may generate output data usable by software engine 200 for various tasks. For example, DET 220 can generate two-dimensional (or three-dimensional) coordinate data indicating where various detected items are contained in a given image. Likewise, DET 220 may output various data associated with markers and/or tracking images, and can output data associated with various occluding objects (e.g., real world objects) detected in an image. DET 220 may also output data associated with orientation of device 100 based on the processed image and/or other telemetry data. For example, DET 220 may output X, Y, Z, Yaw, Pitch, Roll data to provide information associated with six degrees of freedom of the device 100. That is, DET 220 may output the six degrees of freedom values (e.g., X, Y, Z, Yaw, Pitch, Roll) to ascertain the orientation and position of the device 100 with respect to a tracking image. These examples are of course non-limiting and the technology envisions any variety of information output by DET 220 for software engine 200 to utilize. Further details regarding the output data are described herein Asset composition module 230 may be configured to utilize the various elements extracted and processed by DET 220 to generate various output usable by software engine 200. In one non-limiting example, asset composition module 230 may use output data from DET 220 to generate visual elements displayable on a display device. Likewise, asset composition module 230 may generate visual elements separate from any output data associated with DET 220. For example, asset composition module 230 can generate tracking visuals (e.g., features) that can be captured by image capture device and detected and processed using the modules of software engine 200. Asset composition module 230 may further generate visuals associated with real world objects captured by image capture device. For example, asset composition module 230 may generate a virtual representation of a writing object being held in hand of a user holding the object in from of image capture device.

Asset composition module 230 may also generate various head-up-display (HUD) elements. For example, asset composition module 230 may generate instructional objects as HUD elements on a television so a user can view them and understand how to use an application running software engine 200 on device 100. Asset composition module 230 can generate various types of other viewable objects and the examples discussed herein are of course non-limiting. For example, asset composition module 230 can generate tracking visuals, shadow visuals, green screen visuals, cursor visuals, and/or coaching visuals, among other visual elements. It may assemble these visuals in a HUD.

Integrating application module 240 can use elements in software engine 200 to generate application specific interfaces. For example, integrating application module 240 may generate a specific application interface that can further transform elements detected and processed by modules 210-230. In one example, integrating application module 240 may be directed to a drawing application where a writing object captured by image capture device and detected by software engine 200 may be used to interact with a user interface on a display device. Similarly, user input gestures in real space may appear as "paint" drawn on a wall displayed on a television.

Integrating application module 240 may use the position and orientation data from software engine 200 to generate application specific visuals. For example, the position and orientation data could be used to allow user to mimic using device 100 as a paddle where a virtual paddle can be operated in a virtual space corresponding to movement of the device 100 in free space. These examples are of course non-limiting and the technology described herein envisions and variety of applications for integrating application module 240. For example, integrating application module 240 may generate a virtual robot representation of a user holding device 100, posed to approximate the user's body pose, based on the various data extracted and processed within engine 200. This virtual robot representation 101*a* may be used, for example, in an integrating game application as a player character whose position, orientation, and pose would be controlled by the user through their own position, orientation, and body pose, in order to complete game objectives. In addition to visual properties, virtual robot 101*a* may also have physical properties that affect how it interacts with other game objects and with its game environment.

Figure 3:
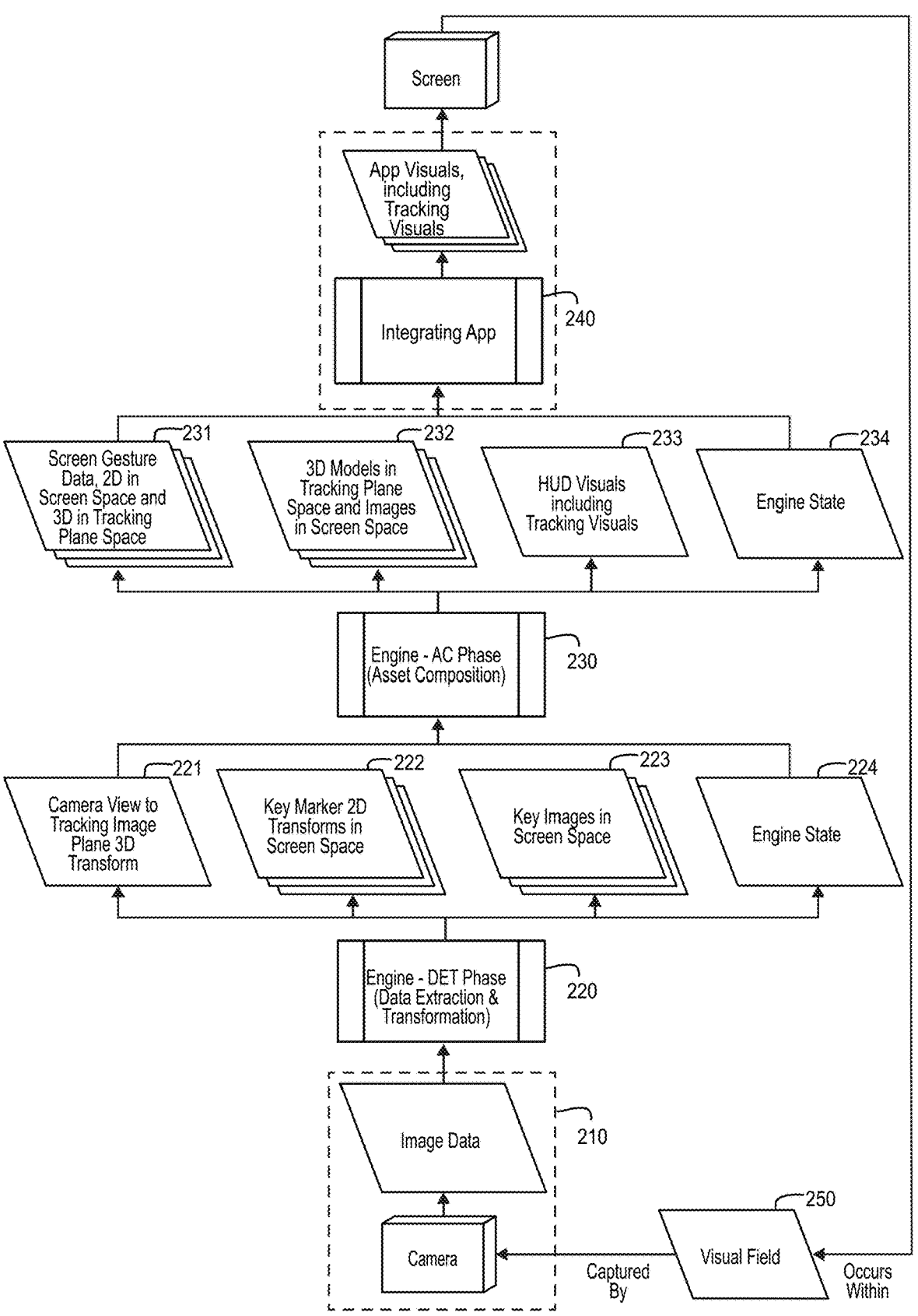
FIG. 3 shows a non-limiting example process flow depicting how modules 210-240 of software engine 200 can perform in operation.

FIG. 3 shows a non-limiting example process flow depicting how modules 210-240 of software engine 200 can perform in operation. It should be appreciated that the example shown in FIG. 3 is non-limiting and the modules 210-240 of engine 200 can operate together in any fashion. The example shown in FIG. 3 depicts one embodiment in which the software modules 210-240 can operate in a method for carrying out various aspects of system 1.

In one non-limiting example, and as discussed herein, image capture module 210 can capture various elements from an image (e.g., captured by an image capture device). Image capture module 210 can generate image data usable by DET 220. That is, image capture module 210 may output image data that is then obtained and used by DET 220 in processing.

DET 220 can use the image data (as well as other various inputs) to generate various output(s) associated with DET 220. In one example, DET 220 can output camera transform 221 which can include, among other aspects, a position and orientation of device 100 with respect to a tracking plane (e.g., in a tracking image 111) that can coincide with display 100. DET 220 can also output key marker transforms 222 that can include key marker two-dimensional transforms in a screen space. In one example, key marker transforms 222 can include data associated with extraction and processing of various markers detected by engine 200 and captured by image capture device of electronic device 100.

DET 220 can also output key images 223 that can include various key images in a screen space. For example, key images 223 can include image data associated with extraction and processing of various elements in the captured image other than detected markers or features associated with a tracking image. DET 220 may also output an engine state 224. In one non-limiting example, engine state 224 can include various output data associated with the current operating state of engine 200. For example, engine state 224 can include output data related to whether an image is detected, or if an image tracking quality is of a certain threshold. These examples are of course non-limiting and the outputs associated with items 221-224 can include any variety of different output data.

Asset composition module 230 can also generate various data usable in system 1. For example, asset composition module 230 can output screen gesture data 231 that can include data associated with various gestures made by a user. For example, screen gesture data 231 may indicate how a user's hand gestured in free space in front of image capture device and screen gesture data 231 can provide various coordinate information associated with a gesture. Screen gesture data 231 can include information associated with two-dimensions in a screen's space and three-dimensions in a tracking plane's space.

Asset composition module 230 can also generate three-dimensional model data 232 associated with three-dimensional models in a tracking plane's space and images in a screen's space. For example, three-dimensional model data 232 can include output data for generating various tracking image data displayable by display 110. Asset composition module 230 can also generate head-up display data 233 that can include heads-up display (HUD) visuals including tracking visuals. Asset composition module 230 may also include engine state data 234 which can contain information similar to engine state data 224. It should be appreciated that engine 200 will view a visual field 250 which can be seen as illustration shown in FIGS. 8B-1 to 8B-3. This visual field may include at least some of a tracking image displayed on a screen.

Integrating application module 240 can utilize the data output by DET 220 and asset composition module 230 for any variety of applications. For example, integrating application module 240 can be directed to a drawing application where an object captured by image capture device and recognized by software engine 200 may be used to extract a marker that can be used to position a cursor on a display device. Similarly, user input gestures in real space may appear as "paint" drawn on a wall displayed on a television. More specifically, the drawing application may use screen gesture data 231 to translate the gesture output to items drawn in display 110 by the application. User input gestures in real space may also be used by the application to, for example, interact with user interface items or position 3-D objects displayed on a television. These examples are of course non-limiting and the technology described herein envisions any variety of applications in which integrating application module 240 may implement for using the data output by engine 200.

It should also be appreciated system 1 may be thought of as being composed of two separate components. In particular, system 1 may generally be comprised of the software engine 200 and an associated application (e.g., integrating application module 240) that uses data generated by software engine 200. In one non-limiting example, module 210-230 may be thought of as the core elements of software engine 200 where integrating application module 240 is one or more software applications utilizing software engine 200. Of course, this is one example and the technology described herein envisions any configurations of system 1. For example, integrating application module 240 may be integrated with the software engine 200 and all modules 210-240 may be considered a part of a single system. Likewise, module 210-240 may all be parts of a separate system and the examples described herein are non-limiting.

Figure 4A:
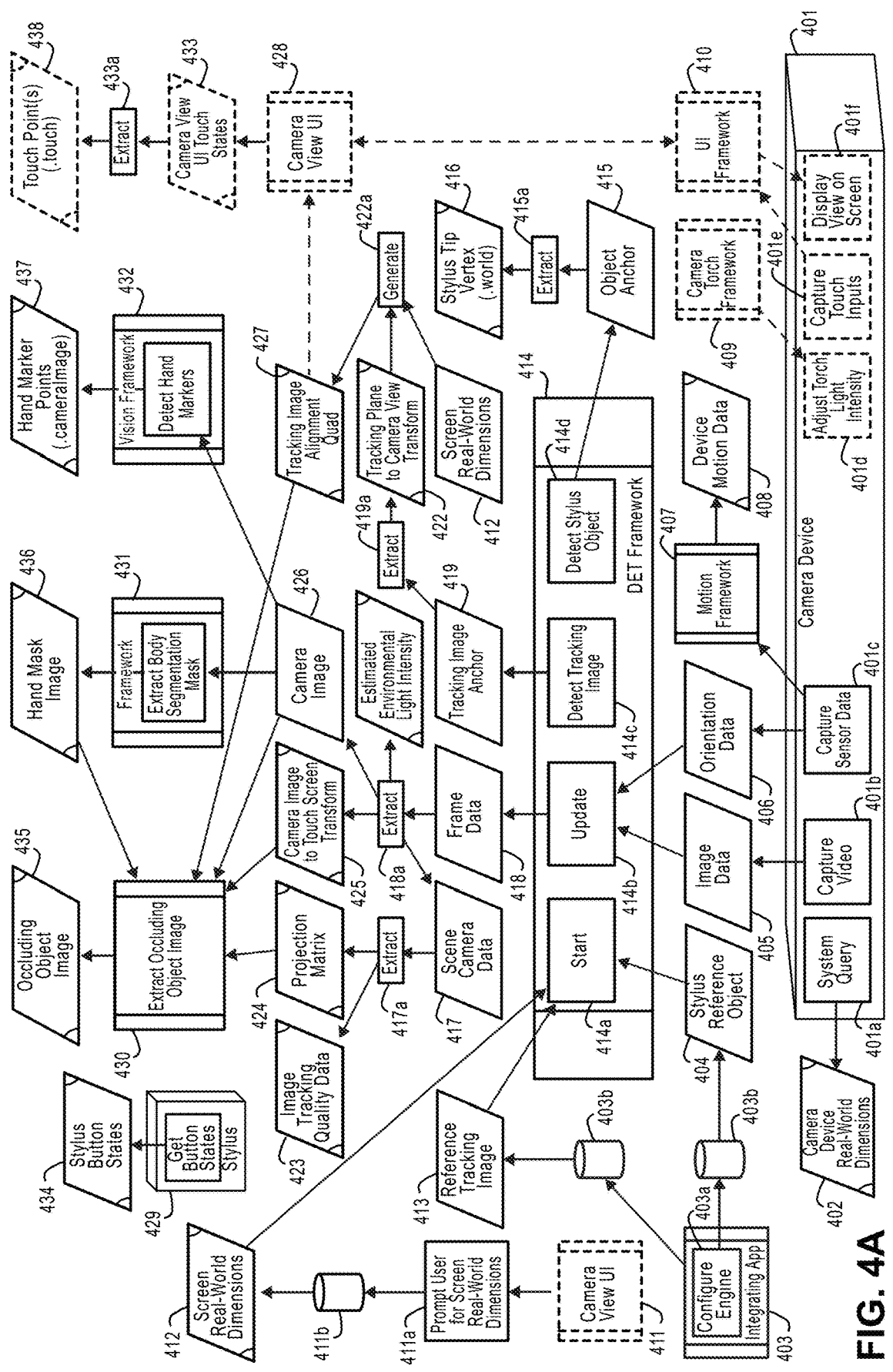
FIGS. 4A-C show non-limiting example methods for implementing certain processes associated with modules 210-240.
Figure 4B:
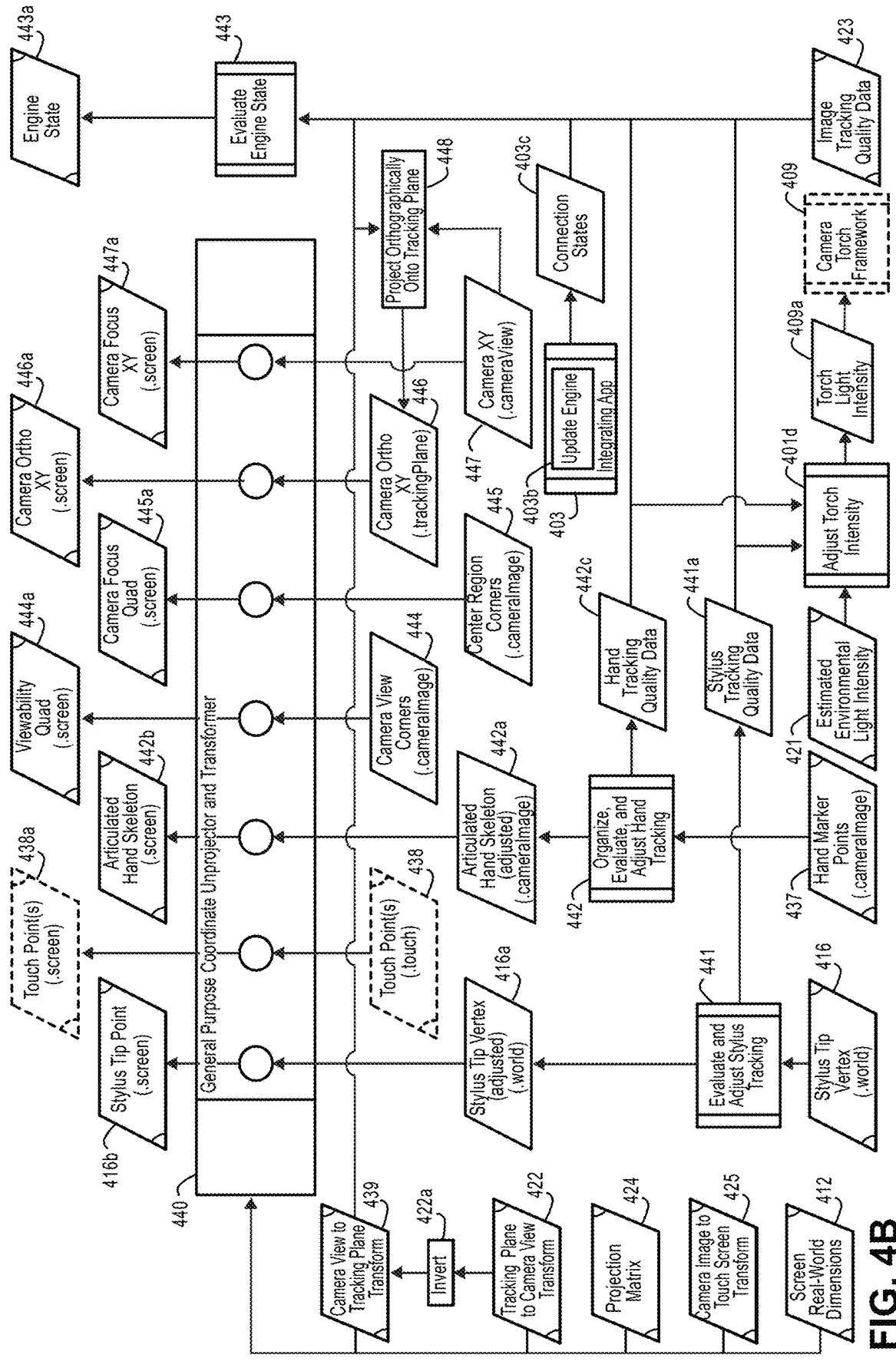
Figure 4C:
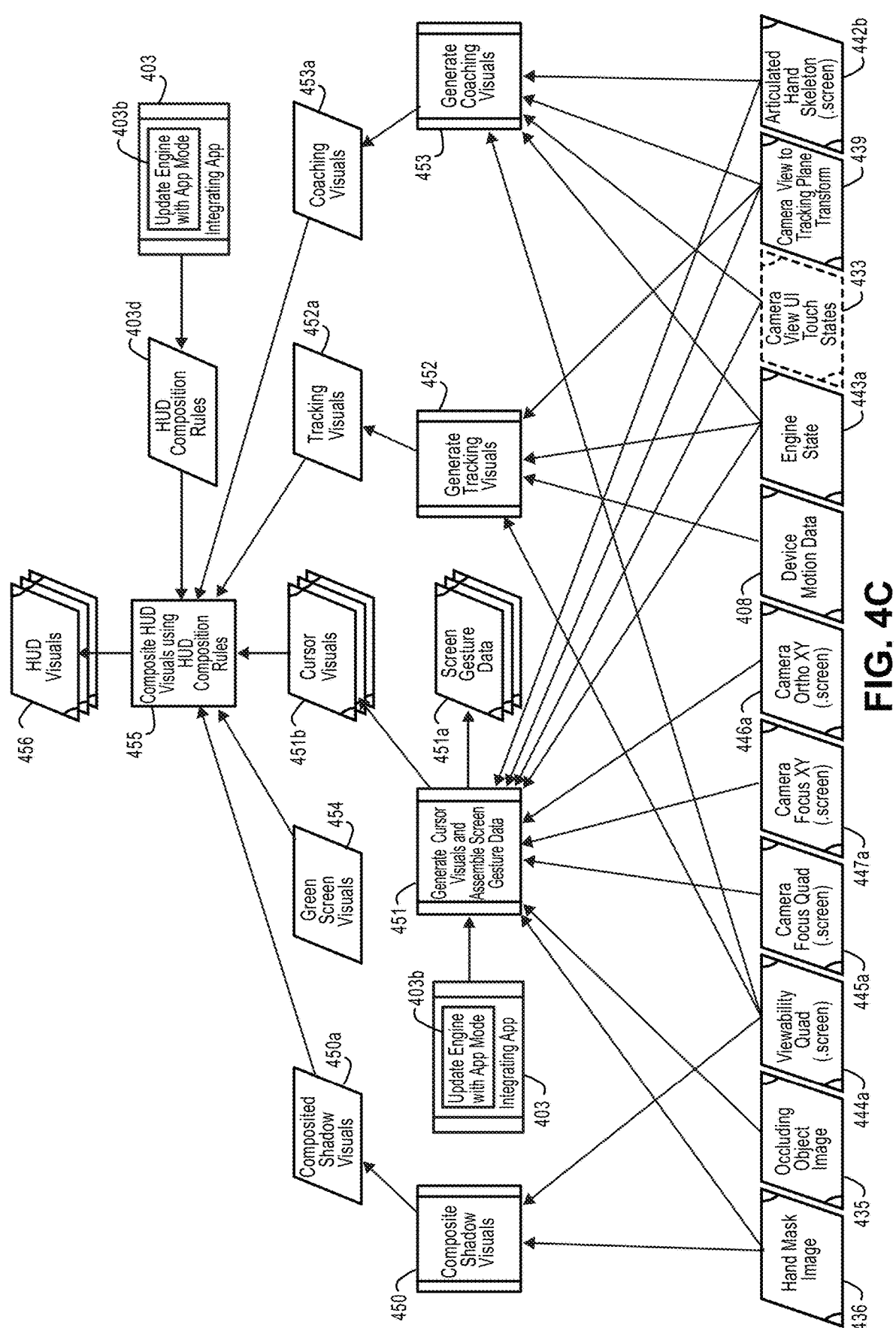

FIGS. 4A-C show non-limiting example methods for implementing certain processes associated with modules 210-240. FIGS. 4A and 4B depict a non-limiting example process flow for executing certain processes associated with DET 220, while FIG. 4C shows a non-limiting example process flow for executing certain processes associated with assert composition module 230. It should be appreciated that the examples shown herein may also include certain elements associated with the other modules (e.g., image capture module 210 and integrating application module 240). Moreover, certain elements depicted in FIGS. 4A-C will be discussed in other parts of this document.

It should be further appreciated that the system 1 may work in various different coordinate frames for processing data associated with software engine 200. Certain non-limiting example coordinate frames include, at least, a ".cameraImage" coordinate frame, a ".touch" coordinate frame, a ".cameraView" coordinate frame, a ".world" coordinate frame, a ".trackingPlane" coordinate frame, and a ".screen" coordinate frame. The ".cameraImage" coordinate frame can exist in a camera feed image space and can contain two-dimensional values in units of pixels. An origin of the ".cameraImage" coordinate frame can exist in a top-left portion and extend towards the right and the bottom (e.g., of an image). The ".touch" coordinate frame can exist in a touch screen image space and can also contain two-dimensional values in units of pixels. Similar to ".cameraImage," the origin of the ".touch" coordinate frame can be a top-left touch point that extends towards the right and bottom (e.g., of a touch screen display).

The ".cameraView" coordinate frame can exist in a scene camera view space and can contain three-dimensional values in units of meters. The origin of the ".cameraView" coordinate frame can include a real world location of a lens of a camera device and can extend along a right axis of the camera device (e.g., in a "+X" direction), a top axis of the camera device (e.g., in a "+Y" direction), and in an opposite direction as the camera's focus (e.g., in a "+Z" direction). The ".screen" coordinate frame can exist in a screen image space and can contain two-dimensional values in units of pixels (or texels). An origin of the ".screen" coordinate frame can exist in a top-left portion of a screen image and can extend (or point) to a right of a screen and to a bottom of a screen. The ".screen" coordinate frame may coincide with the tracking image space.

The ".trackingPlane" coordinate frame can exist in a tracking image plane's space and can contain three-dimensional values in units of meters. An origin of the ".trackingPlane" coordinate frame can exist in a center of a quad representing a tracking image and can extend along a right axis of the tracking image quad (e.g., in a "+X" direction), an "up" axis of the tracking image quad (e.g., in a "+Y" direction), and along the tracking image plane's normal, on a visible side of the tracking image (e.g., in a "+Z" direction). The ".trackingPlane" coordinate frame can contain and share an origin with the tracking image quad. Moreover, when the tracking image is being correctly tracked, the ".trackingPlane" can coincide with ".screen" (e.g., in a shared mixed reality scene). The ".world" coordinate space can exist in world space and can contain three-dimensional values in units of meters. An origin and direction in which it extends (or points) is similar to that of ".trackingPlane." Moreover, ".world" may coincide with ".trackingPlane." It should be appreciated that these various coordinate frames (and associated transformations) are shown as non-limiting example illustrations in FIGS. 8A-1 to 8A-5.

It should be appreciated that the examples shown in FIGS. 4A-C relate to certain specific examples implemented by software engine 200. For example, FIGS. 4A-C reference a "stylus" or "button states" as elements contained within the general processing of software engine 200. However, these examples are non-limiting and the technology described herein envisions and variety of elements that could be used by software engine 200. Moreover, some of the elements described herein are intended as specific examples for purposes of illustration. In particular, FIGS. 4A-C may specifically relate to an implementation where software engine 200 is detecting certain elements (e.g., tracking plane, marker objects (e.g., stylus, hand), occluding objects) and processing data corresponding to those certain elements.

FIG. 4A depicts a camera device 401 containing various elements including system query 401*a*, capture video 401*b*, capture sensor data 401*c*, adjust torch light intensity 401*d*, capture touch inputs 401*e*, and display view on screen 401*f*. System query 401*a* may provide general information associated with a system of camera device 401 and can generate various output data usable by engine 200. In particular, system query 401*a* may output a camera device's real-world dimensions 402 that represent the real-world dimensions of camera device 401 (e.g., as depicted in at least FIG. 5L and FIG. 6H-2). The camera device real-world dimensions 402 could include the physical/real-world dimensions of the camera device (e.g., length, width, height of a smartphone). This can be used for scaling a 3D model in the "3$^{rd}$ Person Interaction Scene View" which essentially renders a 3D scene to be shown in the corner that recreate what is happening in real life (e.g., user as robot, holding phone, near TV).

Capture video 401*b* is configured to capture video (including still image data) that is output as image data 405. In one non-limiting example, image data 405 can include multiple frames of moving image data that is generated by capture video 401*b*. Capture sensor data 401*c* can include data associated with various sensors of camera device 401. As an example, camera device 401 may contain a variety of sensors that can include inertial sensors (e.g., accelerometer, gyroscope, magnetometer). Capture sensor data 401*c* can use certain sensor data to generate orientation data 406. For example, data obtained from accelerometer(s) or gyroscope(s) in camera in device 401 can be used as output for orientation data 406. Likewise, data output from capture sensor data 401*c* can be provided to motion framework 407 for understanding the general motion of camera device 401. In turn, motion framework 407 may generate device motion data 408 containing data associated with movement of the device. It should be appreciated that image data 405 may include depth data (e.g., from LiDAR or infrared sensors).

An integrating application 403 may contain various specific applications for interacting with engine 200. As discussed herein, the integrating application 403 may be a specific software application (e.g., a drawing application) that interacts with engine 200 by using various outputs from engine 200 in application 403. Likewise, integrating application 403 may provide certain input data for engine 200 that can be used by engine 200 in processing. In one non-limiting example, integrating application 403 may include configure engine 403*a* used by application 403 to specifically configure aspects for processing by engine 200. For example, if application 403 is directed to a drawing application, a pointing object, such as a stylus, may be used in application 403 to aid in drawing various items. Configure engine 403*a* may be used to specifically configure elements associated with the stylus. For example, configure engine 403*a* may invoke application 403 to prompt a user to select an item that could correspond to a stylus (e.g., pen, pencil, finger) where the user can designate the specific stylus object that will be detected by engine 200. The output from configure engine 403*a* may be saved in a storage (shown by item 403*b*) where the saved information can be used by engine 200 in various ways. In the example shown in FIG. 4A, configure engine

403*a* may output stylus reference object 404 which can identify an item in which engine 200 will use as a reference object for the stylus. Configure engine 403*a* may also output reference tracking image 413 in which engine 200 will use for generating (and identifying) the tracking image. For example, configure engine 403*a* may allow a user to select from different tracking images (e.g., a brick wall, an outlined whiteboard image) where reference tracking image 413 may reflect the specifically chosen tracking image.

In addition to obtaining various information from camera device 401 as input data, camera device 401 may interact with engine 200 to operate various elements associated with camera device 401. For example, camera device 401 may include a light source (e.g., "torch") that can illuminate a surface in which camera device 401 is pointing. Camera torch framework 409 may interact with the torch to operate adjust torch light intensity 401*d* to change the brightness/ intensity of the light source. In doing so, engine 200 may control the light source in a manner allowing it to more effectively capture image data, and thus more effectively process the captured image data. Furthermore, engine 200 may output haptic feedback to camera device 401, to provide tactile cues to the user about their interactions on a touch screen of camera device 401 and/or their interactions with elements on display 110.

Engine 200 may also include a user interface framework 410 that can be generated for display on camera device 401. In one example display view on screen 401*f* may generate the user interface for display where capture touch inputs 401*e* may obtain various touch input data associated with elements of the user interface. For example, user interface framework 410 may generate various elements displayable by camera device 401 and selectable (e.g., via touch input) as user input.

Camera view user interface 411 and 428 may include further user interface elements associated with engine 200. In one example, camera view user interface 411 and 428 may relate to a view that contained DET 220 in configurations where the camera device 401 includes a touch screen. For example, camera view user interface 428 may include camera view UI touch states 433 to obtain touch input data that the user input to a touch sensitive display of camera 401. In one example embodiment, camera device 401 may display a button where the user can touch the display of device 401 at a location of the button to generate touch input data (e.g., as camera view UI touch states 433). The camera view UI touch states 433 may include two-dimensional coordinate data indicating where exactly on the touch sensitive display the user made input and the data may be extracted (at item 433*a*) and processed as touch point(s) 438 as output data. It should be appreciated that touch point(s) 438 may include data in the ".touch" coordinate system described herein.

Camera view user interface 411 may also provide various user interface elements for obtaining other input information of a user (e.g., besides touch input data). For example, camera view user interface 411 may include screen dimension prompt 411*a* where the user interface 411 may prompt a user for a display real-world dimensions. In one example embodiment, the larger display in which the software engine 200 is interacting may be in variable sizes. Thus, the screen dimension prompt 411*a* may ask the user to manually input the size of the display (e.g., 50 inches) and such information may be stored (at item 411*b*) for use by engine 200 as screen real-world dimensions 412.

DET framework 414 can utilize various input data for processing in the general operational framework. For example, DET framework 414 can utilize reference tracking image 413 (output in association with configure engine 403), stylus reference object 404, image data 405, orientation data 406, and/or screen real-world dimensions 412. DET framework 414 can include a start 414a element for processing initial data associated with DET framework 414. In one example embodiment, start 414a element may utilize screen real-world dimensions 412 to understand the screen size of the display. Likewise, start 414a element may utilize the selected reference tracking image 413 and stylus reference object 404 for understanding the specific tracking image and stylus object to be detected (and processed in engine 200).

Update 414b element of DET framework 414 can cause DET framework 414 to continually update processing. For example, update 414b may use various data output from camera device 401 to update elements within DET framework 414 (and engine 200). In one example, update 414b may use image data 405 and orientation data 406 to allow for update processing associated with how the camera is viewing an object, as well as how the camera is being held. Update 414b may output frame data 418 indicating various information associated with an image frame. For example, frame data 418 may include a captured image frame (e.g., as two-dimensional image data). Frame data 418 could also include certain information related to how camera device 401 is being held (e.g., inertial sensor data).

DET framework 414 may also include detect tracking image 414c for detecting a specific tracking image from image data. As discussed herein, DET framework 414 may use reference tracking image 413 to understand the specific tracking image it is attempting to identify from image data. As an example, the tracking image may include a cropped brick wall where certain features in the tracking image (e.g., colors, lines in the brick) can be detected by detect tracking image 414c. Detect tracking image 414c may output tracking image anchor 419 as output data associated with the detected tracking image.

Information from tracking image anchor 419 may be extracted (at action 419a) to generate camera view transform 422 in which includes data associated with the tracking plane to camera view transform. The camera view transform 422 may include a position and orientation of the tracking plane with respect to the camera. Elements from camera view transform 422 and the screen real-world dimensions 412 may be combined (at action 422a) to generate tracking image alignment quad 427. The tracking image alignment quad 427 could include a three-dimensional model in the ".cameraView" coordinate space. The tracking image alignment quad 427 may further include an outline of a three-dimensional rectangular quad that coincides with a tracked image (e.g., rendered on a display) in a scene view. For example, a user may view the display to see if a tracking of the image in the camera view is aligned properly with where it sits in the camera feed, and when misaligned, the user can refresh tracking. The output from tracking image alignment quad 427 may be used as input to extract occluding object image 430.

DET framework 414 may also include detect stylus object 414d for detecting a specific marker from image data. As discussed herein, DET framework 414 may use stylus reference object 404 to understand the nature of the marker (e.g., stylus) object to detect. As an example, the stylus reference object 404 may relate to a pen (or pencil) where detect stylus object 414d may identify certain features associated with the pen (e.g., body of the pen, tip of the pen). Detect stylus object 414d may output stylus object anchor 415 as output data associated with the detected stylus. The information in stylus object anchor 415 may be extract (at action 415a) to produce a specific output associated with the marker. In particular, stylus tip vertex 416 may be output as an identified point of the stylus object that can indicate where the stylus is inputting in free space. It should be appreciated that stylus tip vertex 416 may be output in ".world" coordinate data as described herein.

Scene camera data 417 may contain data associated with a specific camera screen. In particular, engine 200 may extract (at item 418a) information from frame data 418 to generate scene camera data 417. Engine 200 may further extract information from scene camera data 417 (at action 417a) to generate image tracking quality data 423 and projection matrix 424. Image tracking quality data 423 may be used by engine 200 to determine how well an image is being tracked (e.g., how well the tracking image is being viewed by camera 401). Projection matrix 424 may be utilized as an input to extract occluding object image 430 in order to identify and extract an occluding object from the image (as occluding object image 435).

As a result of extracting information from frame data 418 (i.e., at action 418a), touch screen transform 425 may be generated to include various camera image to touch screen transform data. Moreover, camera image 426 may be generated to include various camera image data. Likewise, estimated environmental light intensity 421 may be generated to provide data associated with the environmental light detected from an image.

Engine 200 may also employ stylus 429 to determine button state(s) (e.g., as "get button states") in association with a specific stylus device. For example, a recognized stylus may have a physical push-button that the user can press to control software, such as to tap a user interface button or to indicate that the "pen" is "down" in a drawing scenario. In addition to a physical-button, the stylus may also contain, for example, a touch surface.

Camera image 426 (extracted from frame data 418) may be used by various aspects of engine 200. In particular, extract occluding object image 430 may use data from camera image 426 to extract particular regions of the captured image that occur in front of the tracking image in the image capture device's visual field. For example, if camera image 426 includes an object (e.g., an orange) in the image, extract occluding object image 430 may extract the region of the captured image representing that object by eliminating other identified regions, such as a tracking image, a green screen, or a part of a human body. Framework 431 may extract a body segmentation mask to generate hand mask image 436. In one example, framework 431 may generate a body (e.g., hand) mask image as a 1-bit mask image encompassing all regions recognized as part of a human body (e.g., in a given moment) and such data will be represented in hand mask image 436. It should be appreciated that extract occluding object image 430 may use data from hand mask image 436 when detecting an occluding object. For example, if a user is holding an orange, extract occluding object image 430 may detect the orange and then "remove" the user's hand from the image.

Vision framework 432 may also use information from camera image 426. For example, vision framework 432 may detect various hand markers to generate hand marker points 437. In one example embodiment, vision framework 432 may identify various features associated with a user hand (e.g., fingertips, knuckles, joints). Vision framework 432 may extract these points to generate identifiable hand points as hand marker points 437. It should be appreciated that the hand marker points 437 data may be specified in the ".cameraImage" coordinate space.

FIG. 4B shows a further non-limiting example process for associating with DET 220. In the example shown in FIG. 4B, various output (from FIG. 4A) can be seen and used as input to various components. For example, screen real-world dimensions 412, projection matrix 424, touch screen transform 425, camera view transform 422, and tracking plane transform 439 (which includes data from camera view transform 422 that is inverted (at action 422*a*)) can all be used as input to coordinate unprojector and transformer 440.

Estimated environmental light intensity 421 can be input to adjust torch intensity 401*d* in order to modify torch light intensity 409*a*. For example, estimated environmental light intensity 421 (where light intensity could be a floating point value between 0 and 1) could be evaluated by adjust torch intensity 401*d* in order to determine how bright the environment is in the camera view. If the environment is not bright enough (or too bright), adjust torch intensity 401*d* may modify the light intensity value and produce torch light intensity 409*a* with the modified value. As a specific example, torch light intensity 409*a* may be used to dynamically control the torch light intensity of the torch on a camera device (e.g., to illuminate a marker or occluding object) for better tracking or image capture. Torch light intensity 409*a* may be input into camera torch framework 409 in order to continually evaluate and modify the light intensity.

Stylus tip vertex 416 may be used as input to evaluate stylus tracking 441. In one example embodiment, evaluate stylus tracking 441 may determine how well software engine 200 is tracking the detected stylus object. Evaluate stylus tracking 441 may generate adjusted stylus tip vertex 416*a* which may correspond to a "smoothed out" rendering of the stylus tip. Adjusted stylus tip vertex 416*a* may be input into coordinate unprojector and transformer 440 to generate stylus tip point 416*b*. Stylus tip point 416*b* could include a two-dimensional coordinate value in the ".screen" coordinate space and could correspond to the actual tip point in which the stylus is pointing.

Evaluate stylus tracking 441 may also generate stylus tracking quality data 441*a* that can indicate how well the stylus is being tracked as it moves in free space. In one example embodiment, stylus tracking quality data 441*a* can include an aggregation of movement of the stylus tip over time which can be used to determine how well the stylus is being tracked by engine 200. Moreover, the stylus tracking quality data 441*a* can be used as input to evaluate engine state 443.

Hand marker points 437 may be input into evaluate hand tracking 442. In one example embodiment, evaluate hand tracking 442 may determine how well software engine 200 is tracking the detected hand object. Evaluate hand tracking 442 may generate an adjusted hand skeleton 442*a* which could include a two-dimensional shape in the ".cameraImage" (and unprojected on ".screen") coordinate space. Adjusted hand skeleton 442*a* may be input to coordinate unprojector and transformer 440 to generate articulated hand skeleton 442*b*. It should be appreciated that articulated hand skeleton 442*b* may include a labeled set of up to 21 marker points, connected together into an articulated, posed two-dimensional skeleton. The marker points could correspond to points in an actual human hand seen in the camera visual field and recognized by engine 200. Articulated hand skeleton 442*b* may include a two-dimensional value in the ".screen" coordinate space.

Evaluate hand tracking 442 may also generate hand tracking quality data 442*c* that can indicate how well the hand is being tracked as it moves in free space. In one example embodiment, hand tracking quality data 442*c* can include an aggregation of movement of the hand over time which can be used to determine how well the hand is being tracked by engine 200. Moreover, the hand tracking quality data 442*c* can be used as input to evaluate engine state 443.

Integrating application 403 may invoke update engine 403*b* to generate connection states 403*c*. Connection states 403*c* could indicate, among other aspects, when a connection between camera device and display device has not been established, or has been lost. In some example embodiments, system 1 may generate a prompt for a new connection which could be shown on any display. Output from connection states 403*c* may be input to evaluate engine state 443. Evaluate engine state 443 may also obtain input from image tracking quality data 423. The collection of data input into evaluate engine state 443 can be used to understand the overall state of engine 200 which can be output as engine state 443*a*.

Engine state 443*a* could include an enumerated value describing the current state of engine 200. For example, engine state 443*a* could include a ".disconnected" state in which a prompt may be generated for connection of camera and/or display device (the prompt is displayable on any device). Engine state 443*a* could further include ".screenDimensionsUnknown" in which a prompt for screen measurement dialogue (e.g., asking for screen measurement input) can be generated. Engine state 443*a* could further include ".lookingForImage" in which a coaching visual may be generated instructing a user to position camera to capture the tracking image on screen. Engine state 443*a* could further include ".imageTrackingQualityPoor" in which a coaching visual may be generated instructing a user to change camera device angle (and then refresh tracking) and/or adjust ambient lighting conditions. Engine state 443*a* could further include ".imageOutOfView" which could (after a specified period of time) generate a coaching visual instructing a user to reposition camera to capture the tracking image on screen. Engine state 443*a* may also include ".stylusTrackingQualityPoor" in which a coaching visual may be generated instructing a user to adjust ambient lighting conditions and/or bring the camera closer to the stylus. Likewise, engine state 443*a* may include ".stylusInFrame" to indicate that the stylus is being properly viewed by camera.

Engine state 443*a* may further include ".handTrackingQualityPoor" in which a coaching visual may be generated instructing a user to adjust ambient lighting conditions and/or bring the camera closer to the user's hand. Engine state 443*a* may also include ".handInFramePartially" in which (after a specified period of time) a coaching visual is generated instructing a user to adjust the camera angle to capture all (or most) of a hand. Engine state 443*a* may also include ".handInFrame" to indicate that a hand has been successfully detected/viewed by camera. Likewise, engine state 443*a* could include ".noStylusOrHandInFrame" to indicate that the camera currently does not view a hand or stylus.

Coordinate unprojector and transformer 440 also process various input associated with the camera device. For example, camera view corners 444 (provided as data in the ".cameraImage" coordinate space) may be input to transformer 440 to generate viewability quad 444*a*. Viewability quad 444*a* may include a two-dimensional skew-transformed quadrilateral in the ".screen" coordinate space and can represent a region of the tracking plane or screen that is visible to the camera at a given moment. Viewability quad 444*a* may include an intersection of a pyramid of vision and the plane coinciding with the display. In one specific example, viewability quad 444*a* may represent an area that will be filled with a skew-transformed image, to simulate a projection cast from camera device, as if from a front projection television, that can be added to a canvas in an art application. Likewise, touch point(s) 438 (provided as data in the ".touch" coordinate space) may be input to transformer 440 to generate touch point(s) 438*a* in the ".screen" coordinate space.

Center region corners 445 (provided as data in the ".cameraImage" coordinate space) may be input to transformer 440 to generate camera focus quad 445*a*. Camera focus quad 445*a* may include a two-dimensional shape in the ".screen" coordinate space and can represent a two-dimensional quad formed from four two-dimensional points representing a square centered in a touch screen's center in the ".cameraImage" space (or the same points unprojected onto a screen's plane in the ".screen" space). In one specific example, camera focus quad 445*a* may show an unprojected, skewed-transformed circle that represents an elliptical area that will be spray painted in an annotation drawing (or for use in a spray painting application). The elliptical area could roughly represent an intersection of a camera spotlight cone and a screen plane. "Spray painting" could include where the camera device acts as a "spray can" painting a "wall" of a screen (e.g., without involvement of any markers in the camera's visual field beyond features in a tracking image).

Camera ortho XY 446 (provided as data in the ".trackingPlane" coordinate space) may be input to transformer 440 to generate camera ortho XY 446*a*. Camera ortho XY 446*a* may include a two-dimensional coordinate frame in the ".screen" coordinate space and can represent a two-dimensional coordinate frame whose origin includes the origin of camera transform projected orthographically onto a plane containing the screen (e.g., the origin is translated along a screen plane normal such that it is on the screen plane). A length of X and Y axes may be scaled by a distance of the translation, such that the axes elongate when the camera device is farther from the display device, and can shorten as camera device approaches the screen device. An orientation may be determined by a camera device "roll" in a "world" space. An example usage may include a game that requires a user to scan a surface of a television to search for objects hidden in the display.

Camera XY 447 (provided in ".cameraView" coordinate space) may be input to transformer 440 to generate camera focus XY 447*a*, and also projected orthographically onto the tracking plane (at action 448) as input to camera ortho XY 446 (as described herein). Camera focus XY 447*a* may include a two-dimensional coordinate frame in the ".screen" coordinate space and can represent a two-dimensional coordinate frame whose origin is a center of a camera's view (e.g., in ".cameraImage" coordinate space), unprojected onto a plane containing the screen. Camera focus XY 447*a* may represent a focal point of what a camera views on a screen plane, and a length of X and Y axes may be scaled by a distance of the origin to camera transform's origin. An orientation may be determined by a camera device "roll" in the ".world" space. An example usage may include drawing strokes in an annotation view using a spray paint effect that traces movement of where the camera points (e.g., turning camera device effectively into a "spray can" in the user's hand).

FIG. 4C shows a non-limiting example process flow associated with asset composition module 230. Similar to the flow shown in FIG. 4B, various inputs from FIGS. 4A and/or 4B can be used in processing associated with asset composition module 230. As can be seen in FIG. 4C, hand mask image 436, occluding object image 435, viewability quad 444*a*, camera focus quad 445*a*, camera focus XY 447*a*, camera ortho XY 446*a*, device motion data 408, engine state 443*a*, camera view UI touch states 433, tracking plane transform 439, and articulated hand skeleton 442*b* are among inputs used in processing associated with module 230.

In more detail, hand mask image 436 and viewability quad 444*a* may be used as input to composite shadow visuals 450. In one example embodiment, composite shadow visuals 450 may input these items (among other inputs) to generate various shadow images associated with the user (e.g., a shadow of a user hand) as composite shadow visuals 450*a*. Generate cursor visual and screen gesture data 451 can utilize any of hand mask image 436, occluding object image 435, camera focus quad 445*a*, camera focus XY 447*a*, camera ortho XY 446*a*, engine state 443*a*, camera view UI touch states 433, tracking plane transform 439, and articulated hand skeleton 442*b* as input. In one example embodiment, generate cursor visual and screen gesture data 451 can be used in generating and positioning various cursor visuals which could also utilize the screen gesture data in the process (e.g., to understand where and how to move cursor(s)). Generate cursor visual and screen gesture data 451 may also use output from integrating application 403 (which has invoked update engine 403*b*) in processing where generate cursor visual and screen gesture data 451 may output cursor visuals 451*b* and screen gesture data 451*a*.

Generate tracking visuals 452 may utilize any of viewability quad 444*a*, device motion data 408, engine state 443*a*, and/or tracking plane transform 439 as input to generate various tracking visuals for display. In one non-limiting example, generate tracking visuals 452 may output data associated with a tracking image displaying on the display device as tracking visuals 452*a*. Generate coaching visuals 453 may utilize any of viewability quad 444*a*, engine state 443*a*, camera view UI touch states 433, tracking plane transform 439, and articulated hand skeleton 442*b* as input to generate various coaching visuals. In one non-limiting example, generate coaching visuals 453 may output data for producing difference visuals to "coach" a user to perform a certain action (e.g., move the camera to a certain spot, input certain data) as output of coaching visuals 453*a*. Green screen visuals 454 may be generated to produce a "green screen" effect displayable on a display and capture-able by the image capture device.

Integrating application 403 may (by invoking update engine 403*b*) generate various HUD composition rules 403*d* for determining how different heads-up displays are generated. For example, HUD composition rules 403*d* could include rules for a type of HUD to be displayed and/or for various elements that should be included in the HUD.

Output from HUD composition rules 403*d*, composite shadow visuals 450*a*, green screen visuals 454, cursor visuals 451*b*, tracking visuals 452*a*, and/or coaching visuals 453*a* may be used by composite HUD visuals 455. In one example, composite HUD visuals 455 may employ HUD composition rules 403*d* in determining how the other inputs should be used to generate HUD visuals 456. HUD visuals 456 may include a HUD frame image of the ".screen" coordinate space (unprojected from ".cameraImage") and includes a composite of the HUD elements in one image to be displayed on a screen. These examples are of course non-limiting and the technology described herein envisions any variety of methods for executing different processes associated with software engine 200.

FIGS. 5A-L show non-limiting example flowcharts for process flows associated with those shown in FIGS. 4A-C.

Figure 5A:
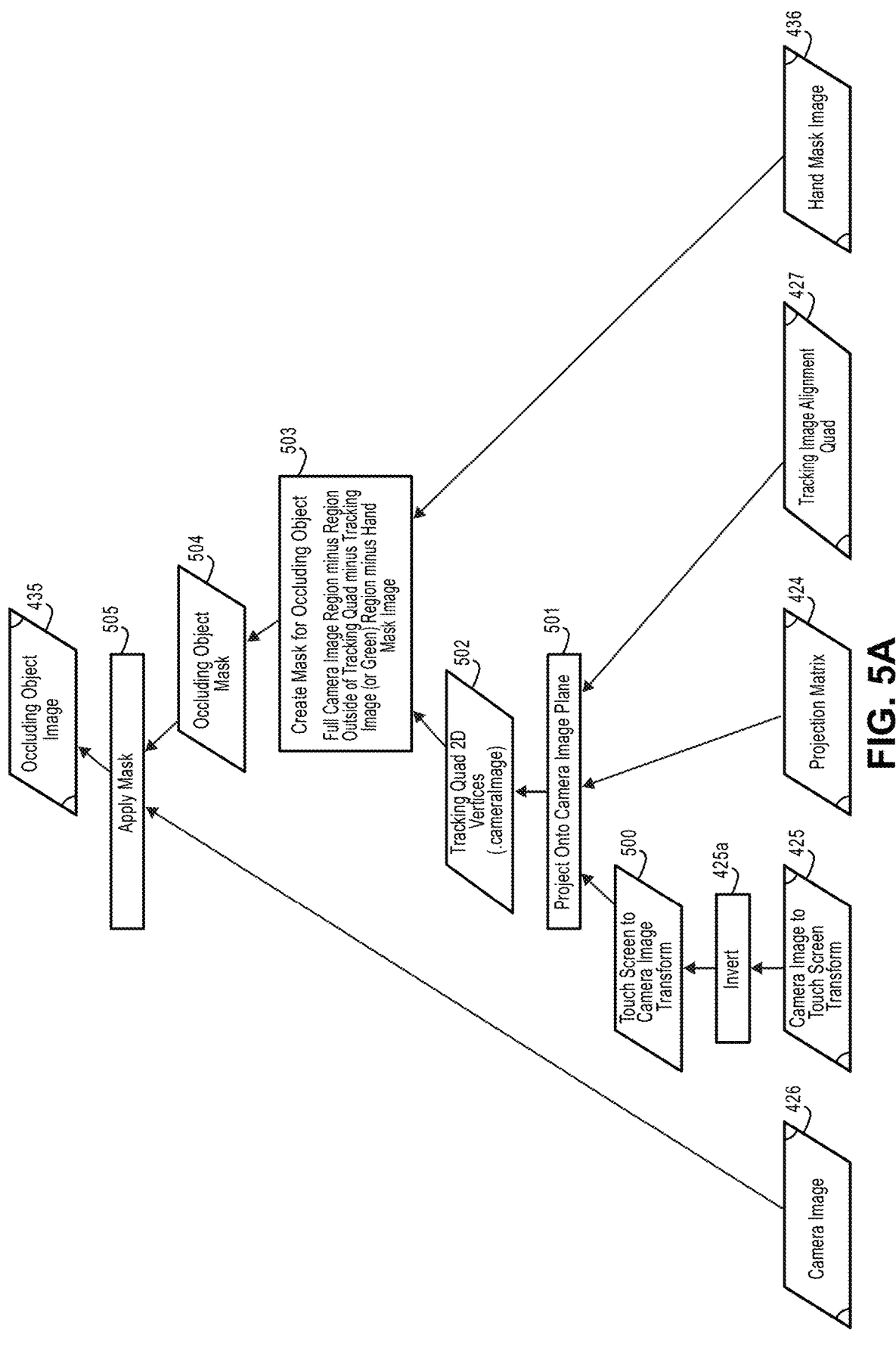
FIGS. 5A-L show non-limiting example flowcharts for process flows associated with those shown in FIGS. 4A-C.

FIG. 5A specifically shows a non-limiting example process flow related to extract occluding object image 430 (e.g., as shown in FIG. 4A). In the example shown in FIG. 5A, extract occluding object image utilizes camera image 426, touch screen transform 425, projection matrix 424, tracking image alignment quad 427, and hand mask image 436 as input data (as can also be seen in FIG. 4A).

In one example, touch screen transform 425 may be inverted (at action 425*a*) to generate camera image transform 500 which includes the touch screen to camera image transform data. Camera image transform 500, projection matrix 424, and tracking image alignment quad 427 may be used as inputs to project onto camera image plane (at action 501) to generate tracking quad 2D vertices 502. Tracking quad 2D vertices 502 may include a two dimensional value (e.g., in the ".cameraImage" coordinate space) indicating vertices of the tracking quad.

Tracking quad 2D vertices 502 and hand mask image 436 can be used as inputs to create occluding object mask 503 to create a mask for the occluding object. In one non-limiting example, create occluding object mask 503 may include a full camera region minus a region outside of the tracking quad minus the tracking image (or green) region minus the hand mask image. That is, create occluding object mask 503 may be the product of the full camera image with the region outside of the tracking quad, the tracking image (or green) region, and the hand mask image being removed to generate occluding object mask 504. Occluding object mask 504 and camera image 426 may be used as input to apply mask 505 to generate occluding object image 435. That is, camera image 426 may apply the occluding object mask 504 (at action 505) to generate occluding object image 435 as output.

Figure 5B:
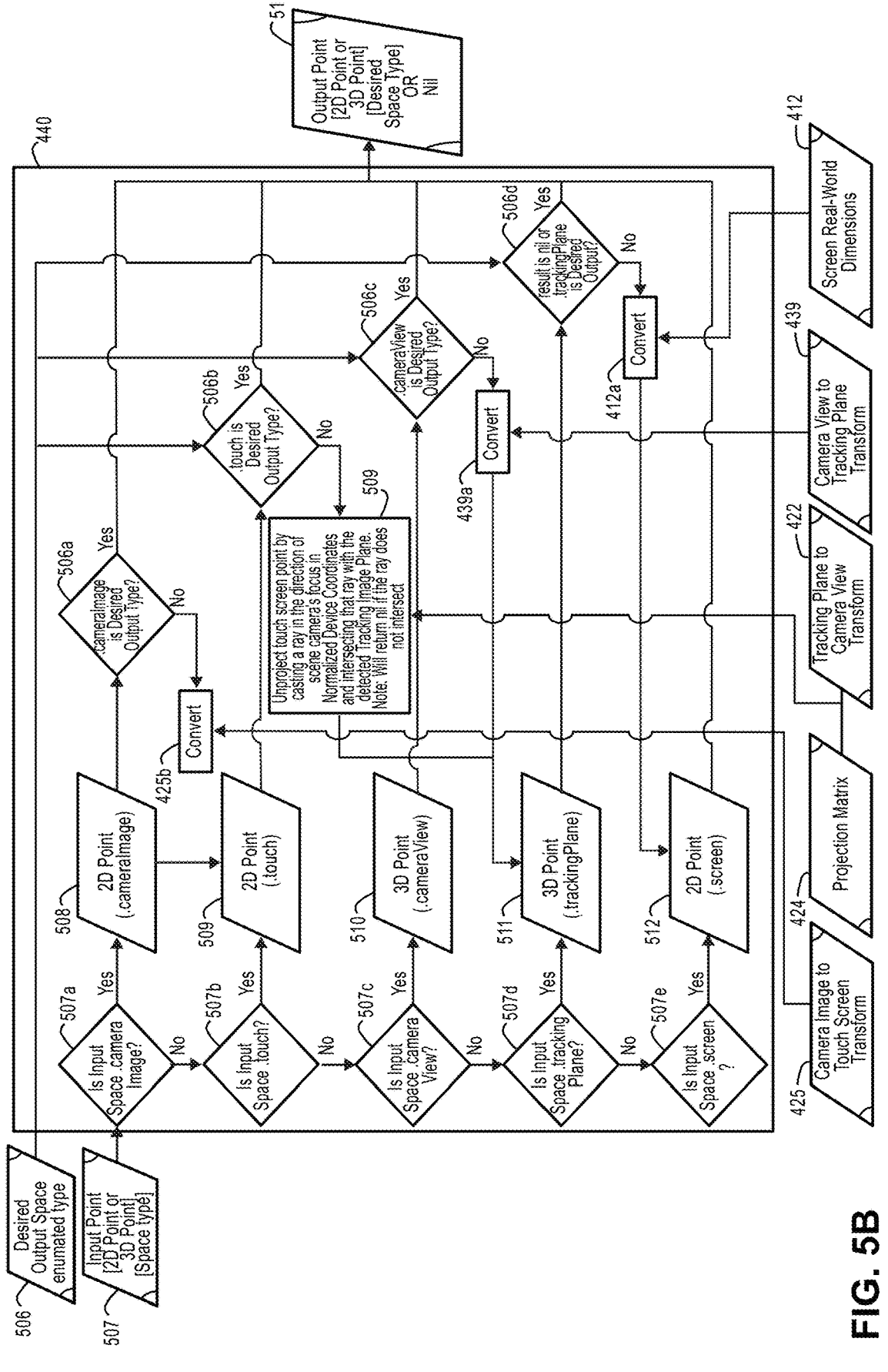

FIG. 5B shows a non-limiting example flowchart for process flows associated with general purpose coordinate unprojector and transformer 440. In the example shown in FIG. 5B, transformer 440 utilizes touch screen transform 425, projection matrix 424, camera view transform 422, tracking plane transform 439, and screen real-world dimensions 412 as inputs (among other possible inputs). Transformer 440 can also utilize desired output space 506 and input point(s) 507 as further inputs in the process. In one example embodiment, desired output space 506 can include which coordinate space is desired for the specific output. For example, transformer 440 can use a point or set of points, and provide a same point, but transformed or unprojected to a new space (e.g., "space" being the named "coordinate frame" indicated at the bottom of the data nodes—e.g., ".touch" or ".screen"). Moreover, and as can be seen in FIG. 4B, transformer 440 includes at least seven input "nodes" (i.e., items 416*a*, 438, 442*a*, 444, 445, 446, 447, and 448) where desired output space 506 may implicitly derive from each of these "nodes." Such output "nodes" are illustrated in items 416*b*, 438*a*, 442*b*, 444*a*, 445*a*, 446*a*, and 447*a*. For example, stylus tip point 416*b* denotes the ".screen" coordinate space indicating that the node has a desired output space 506 equal to ".screen."

Input point(s) 507 may include certain two-dimensional and/or three-dimensional points, as an example embodiment. For example, input point(s) 507 may include the input "nodes" (i.e., items 416*a*, 438, 442*a*, 444, 445, 446, 447, and 448) mentioned above. Transformer 440 may determine which input point (e.g., coordinate space) is relevant and then perform various processing accordingly. If the input space is ".cameraImage," transformer 440 may process (at action 507*a*) a two-dimensional point in the ".cameraImage" coordinate space as 2D point cameraImage 508. If the input space is ".touch," transformer 440 may process (at action 507*b*) a two-dimensional point in the ".touch" coordinate space as 2D point touch 509. If the input space is ".cameraView," transformer 440 may process (at action 507*c*) a three-dimensional point in the ".cameraView" coordinate space as 3D point cameraView 510. If the input space is ".trackingPlane," transformer 440 may process (at action 507*d*) a three-dimensional point in the ".trackingPlane" coordinate space as 3D point trackingPlane 511. Similarly, if the input space is ".screen," transformer 440 may process (at action 507*e*) a two-dimensional point in the ".screen" coordinate space as 2D point screen 512.

It should be appreciated that certain points 508-512 may also be affected by other operations and inputs within transformer 440. For example, if ".cameraImage" is not a desired output space 506, transformer 440 may (at action 506*a*) convert (at action 425*b*) the value for desired output space 506 for use with 2D point touch 509. Likewise, transformer 440 may convert (at action 425*b*) touch screen transform 425 for use with 2D point touch 509. Similarly, if ".cameraView" is not a desired output space 506, transformer 440 may (at action 506*c*) convert (at action 439*a*) the value for desired output space 506 for use with 3D point trackingPlane 511. Likewise, transformer 440 may convert (at action 439*a*) tracking plane transform 439 for use with 3D point trackingPlane 511. If ".trackingPlane" is not a desired output space 506, transformer 440 may (at action 506*d*) convert (at action 412*a*) the value for desired output space 506 (along with 3D point trackingPlane 511) for use with 2D point screen 512. Likewise, transformer 440 may convert (at action 412*a*) screen real-world dimensions 412 for use with 2D point screen 512.

Ray intersection detection 509 may also produce output usable with 3D point trackingPlane 511. In one example, ray intersection detection 509 may utilize projection matrix 424 and camera view transform 422 as input to ray intersection detection 509. Likewise, if ".touch" is not a desired output space 506 (determined at action 506*b*), ray intersection detection 509 may utilize the value for desired output space 506. In one example, ray intersection detection 509 may unproject touch screen point(s) by casting a ray in a direction of a scene camera's focus in normalized device coordinates and intersect that ray with a detected tracking image plane (returning "nil" if the ray does not intersect). The resultant output may be used by transformer 440 (e.g., for use with 3D point trackingPlane 511). It should be appreciated that transformer 440 may generate output point(s) 510 that can include two-dimensional and/or three-dimensional points (e.g., in a desired output space). Similarly transformer 440 may generate a nil value for output point(s) 510.

Figure 5C:
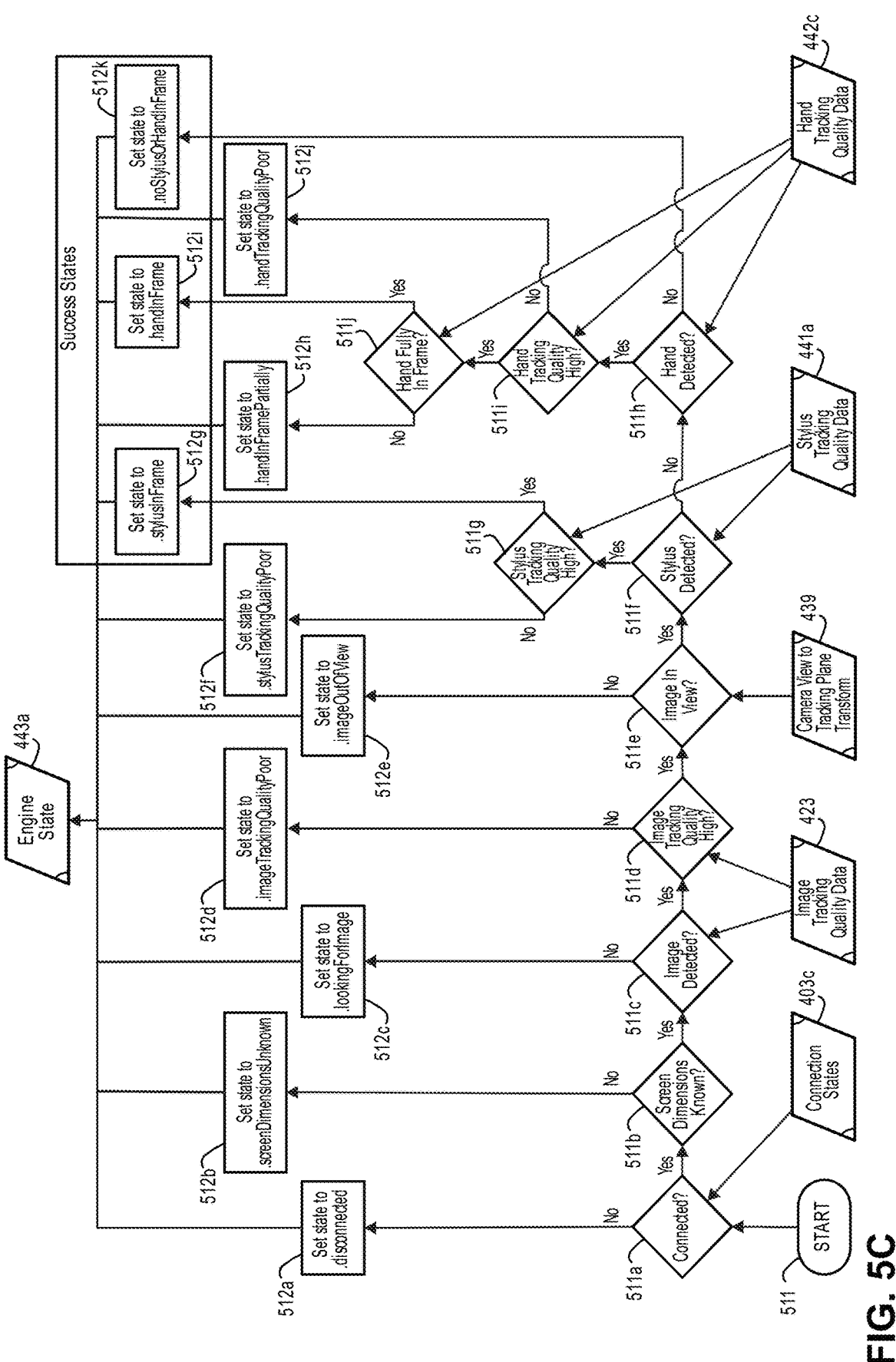

FIG. 5C shows a non-limiting example flowchart of a process flow associated with evaluate engine state 443 for producing engine state 443*a*. In one non-limiting example, evaluate engine state 443 may utilize connection states 403*c*, image tracking quality data 423, tracking plane transform 439, stylus tracking quality data 441*a*, and/or hand tracking quality data 442*c* as input for determining various engine states.

The process can begin (at action 511) by determining a connection (at action 511*a*) using connection states 403*c* (e.g., to determine if there is a connection between a camera device and screen device). If no connection is detected, engine state 443*a* may be set to ".disconnected" (at action 512*a*). Otherwise, evaluate engine state 443 will determine if the screen dimensions (e.g., of the display device) are known (at action 511*b*). If the screen dimensions are not known, engine state 443*a* may be set to ".screenDimensionsUnknown" (at action 512b). Otherwise, evaluate engine state 443 will determine if an image is detected (at action 511c) using image tracking quality data 423. If an image is not detected, engine state 443a may be set to ".lookingForImage" (at action 512c). Otherwise, evaluate engine state 443 will determine if the image tracking quality is high (at action 511d) using image tracking quality data 423. If the image tracking quality is not high, engine state 443a may be set to "imageTrackingQualityPoor" (at action 512d).

In continuation the determinations of engine state 443a, evaluate engine state 443 may determine if an image is in view (at action 511e) using tracking plane transform 439. If the image is not in view, engine state 443a may be set to ".imageOutOfView" (at action 512e). Otherwise, evaluate engine state 443 will determine if the stylus is detected (at action 511f) using stylus tracking quality data 441a. If the stylus is detected, evaluate engine state 443 will determine if the stylus tracking quality is high (at action 511g) also using stylus tracking quality data 441a. If the quality is not high, engine state 443a may be set to ".stylusTrackingQualityPoor" (at action 512f). If the quality is high, engine state 443a may be set to ".stylusInFrame" (at action 512g) indicating a successful state.

Evaluate engine state 443 may also determine (at action 511h) if a hand is detected using hand tracking quality data 442c. If no hand is detected (and assuming no stylus is detected at action 511f), engine state 443a may be set to ".noStylusOrHandInFrame" (at action 512k) indicating a successful state. If a hand is detected, engine state 443 may determine if the hand tracking quality is high (at action 511i) using hand tracking quality data 442c. If the quality is not high, engine state 443a may be set to ".handTrackingQualityPoor" (at action 512j). If the quality is high, engine state 443 may determine if the hand is fully within a frame (at action 511j) using hand tracking quality data 442c. If the hand is not fully in the frame, engine state 443a may be set to ".handInFramePartially" (at action 512h). If the hand is fully in the frame, engine state 443a may be set to ".handInFrame" (at action 512i) indicating a successful state. It should be appreciated that states 512g, 512i, and/or 512k may indicate successful states for engine state 443a (as noted herein). Similarly, states 512a, 512b, 512c, 512d, 512e, 512f, 512h, and/or 512j may be considered unsuccessful states. It should be further appreciated that these examples are of course non-limiting.

Figure 5D:
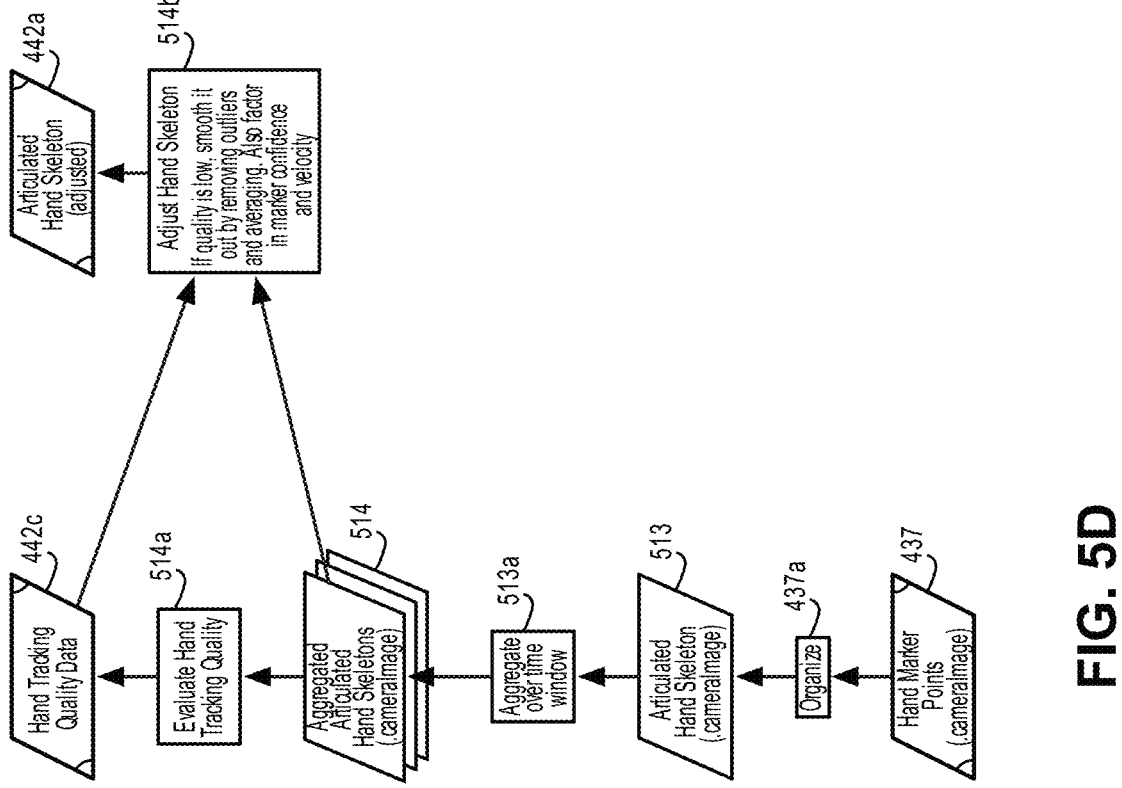

FIG. 5D shows a non-limiting example flowchart of a process flow associated with evaluate hand tracking 442. In one example embodiment, evaluate hand tracking 442 may use hand marker points 437 as input for generating hand tracking quality data 442c and/or articulated hand skeleton 442a. Hand marker points 437 may be organized (at action 437a) to generate articulated hand skeleton 513. Articulated hand skeleton 513 may exist in the ".cameraImage" coordinate space and may include a labeled set of up to 21 marker points, connected together into an articulated, posed two-dimensional skeleton. The marker points could correspond to points in an actual human hand seen in the camera visual field and recognized by engine 200. Articulated hand skeleton 513 may be aggregated over a time window (at action 513a) to generate aggregated hand skeletons 514. Aggregated hand skeletons 514 may exist in the ".cameraImage" space and may include one or more aggregated articulated hand skeletons.

Evaluate hand tracking 442 may use aggregated hand skeletons 514 to evaluate hand tracking quality (at action 514a). The resultant output of evaluating hand tracking quality will result in hand tracking quality data 442c. Likewise, evaluate hand tracking 442 may use aggregated hand skeletons 514 and hand tracking quality data 442c to determine the overall hand tracking quality. If the quality is low, evaluate hand tracking 442 may (at action 514b) smooth the hand skeleton out by removing various outliers from the image and averaging data points associated with the image to generate articulated hand skeleton 442a.

Figure 5E:
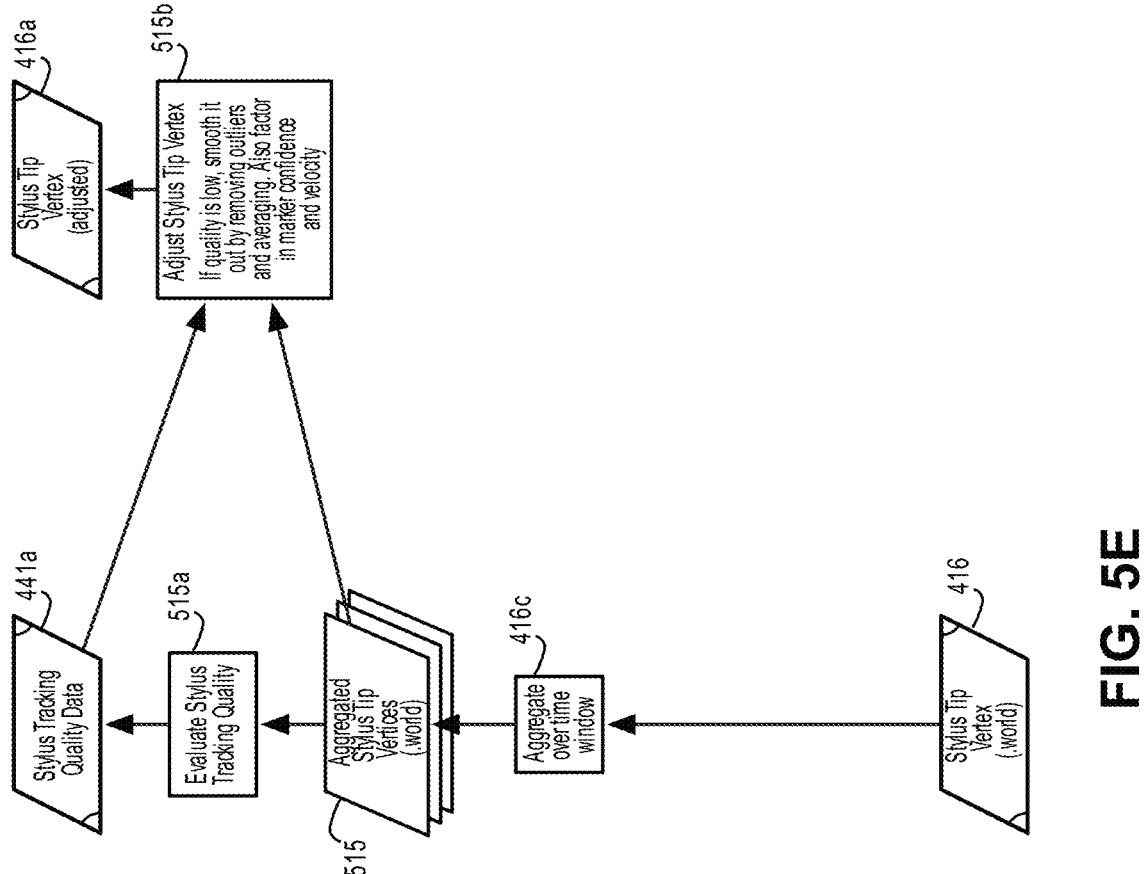

FIG. 5E shows a non-limiting example flowchart of a process flow associated with evaluate stylus tracking 441. In one example embodiment, evaluate stylus tracking 441 may use stylus tip vertex 416 as input for generating stylus tracking quality data 441a and/or adjusted stylus tip vertex 416a. Stylus tip vertex 416 may be aggregated over a time window (at action 416c) to generate aggregated stylus tip vertices 515. Aggregated stylus tip vertices 515 may exist in the ".world" coordinate space and may include one or more aggregate stylus tip vertices.

Evaluate stylus tracking 441 may use aggregated stylus tip vertices 515 to evaluate stylus tracking quality (at action 515a). The resultant output of evaluating stylus tracking quality will result in stylus tracking quality data 441a. Likewise, evaluate stylus tracking 441 may use aggregated stylus tip vertices 515 and stylus tracking quality data 441a to determine the overall stylus tracking quality. If the quality is low, evaluate stylus tracking 441 may (at action 515b) smooth the stylus out by removing various outliers from the image and averaging data points associated with the image to generate adjusted stylus tip vertex 416a.

Figure 5F:
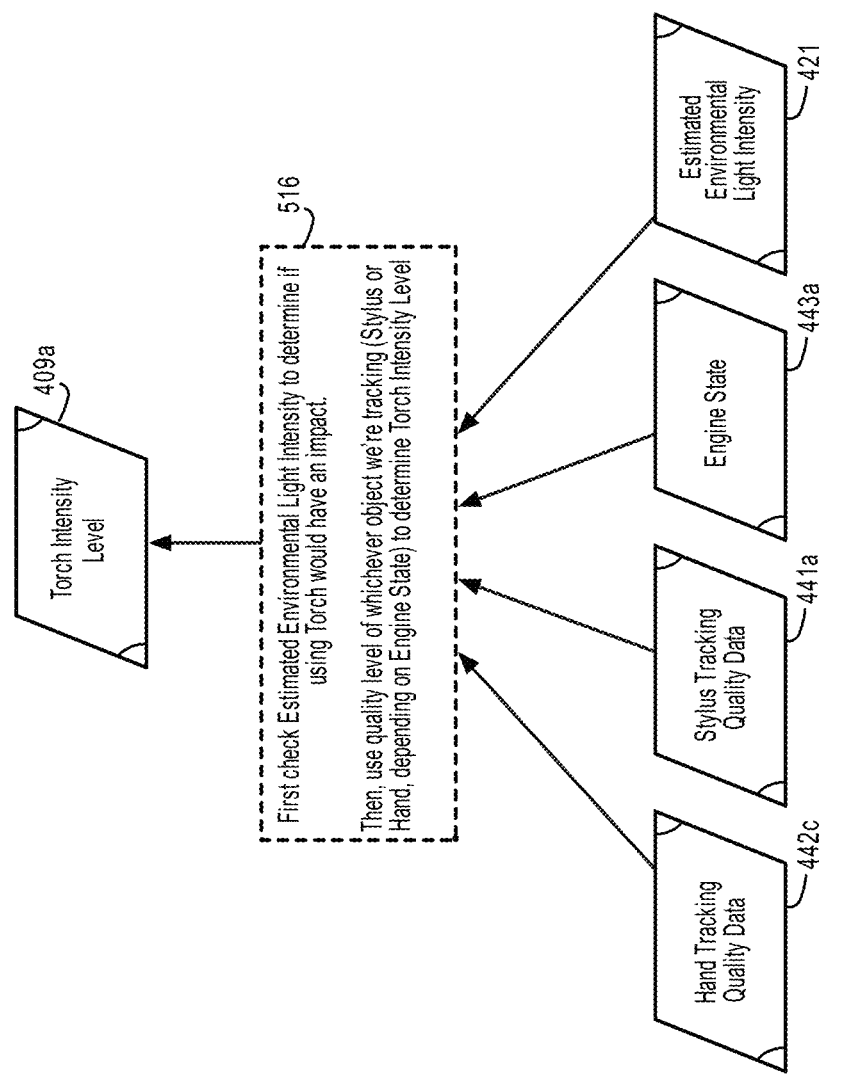

FIG. 5F shows a non-limiting example flowchart for a process flow associated with camera torch framework 409 (and adjust torch light intensity 401d). In one non-limiting example, camera torch framework 409 and/or adjust torch intensity 401d may utilize hand tracking quality data 442c, stylus tracking quality data 441a, engine state 443a, and/or estimated environmental light intensity 421 as input to generate torch intensity level 409a.

In one example embodiment, at action 516, engine 200 may first monitor estimated environmental light intensity 421 to determine if using a torch (e.g., light source) will have any impact. For example, the environmental light intensity may be at a brightness where using a torch may not produce any beneficial effect. After such a determination, a quality level of a tracked object (e.g., stylus using stylus tracking quality data 441a, hand using hand tracking quality data 442c) may be used (in conjunction with engine state 443a) to determine a proper torch intensity level thereby generating torch intensity level 409a. It should be appreciated that these examples are of course non-limiting and the torch light intensity may be adjusted under any variety of circumstances (or using any type of object being tracked).

Figure 5G:
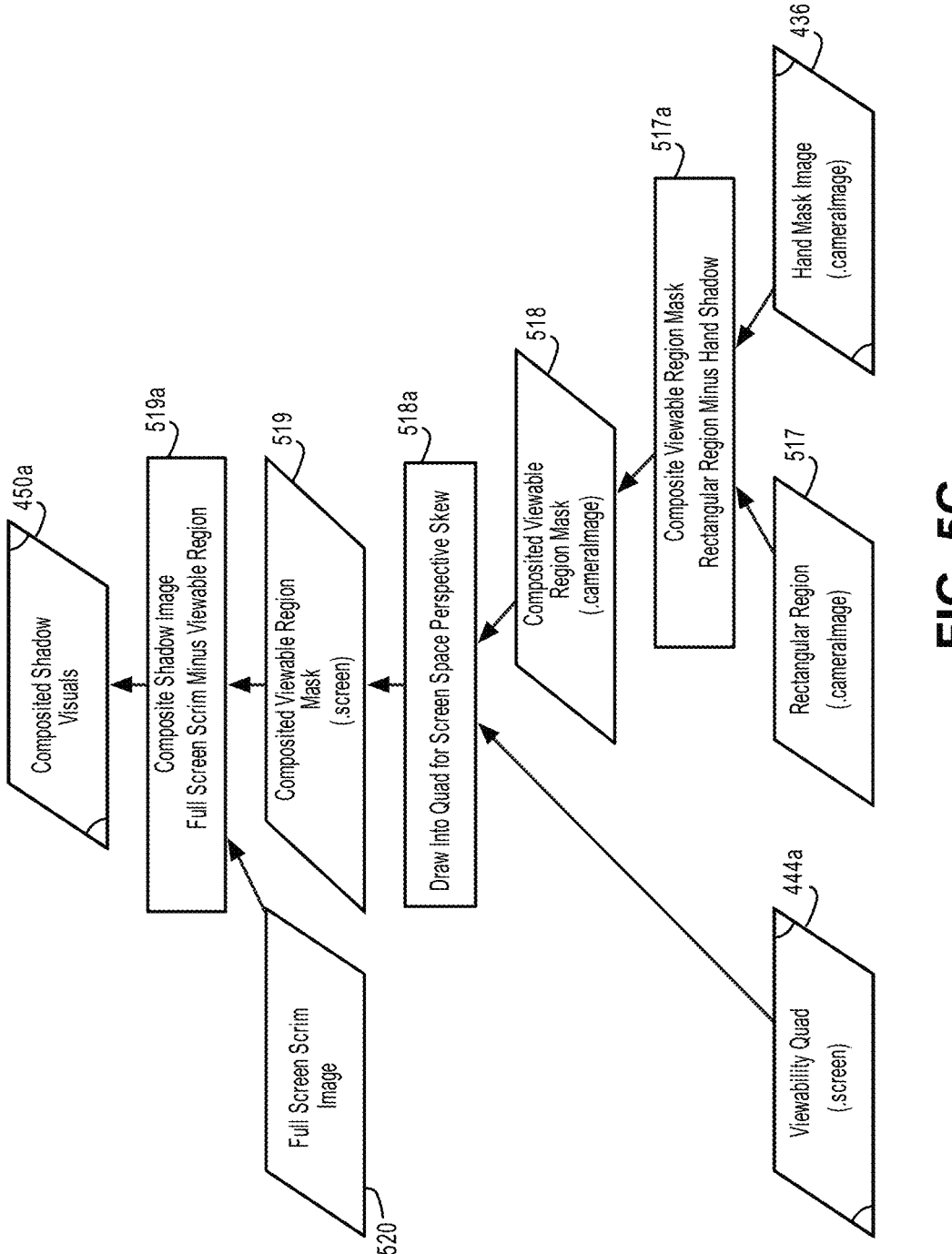

FIG. 5G shows a non-limiting example flowchart for process flows associated with composite shadow visuals 450. In one non-limiting example, composite shadow visuals 450 can utilize viewability quad 444a and hand mask image 436 as inputs to generate composite shadow visuals 450a. Composite shadow visuals 450 may also utilize rectangular region 517 and full screen scrim image 520 as further input(s) in the processing.

Composite shadow visuals 450 may generate (at action 517a) a composite viewable region mask 518 using rectangular region 517 and hand mask image 436 as inputs. In one non-limiting example, the composite viewable region mask 518 may include rectangular region 517 (in the ".cameraImage" coordinate space) minus the hand shadow (from the hand mask image 436). It should be appreciated that composite viewable region mask 518 may similarly exist in the ".cameraImage" coordinate space. Composite shadow visuals 450 can use viewability quad 444*a* and composite viewable region mask 518 to draw into the quad for a screen space perspective skew (at action 518*a*) to generate composited viewable region mask 519 in the ".screen" coordinate space. From there, visuals 450 may use full screen scrim image 520 and composited viewable region mask 519 to generate a composite shadow image (at action 519*a*). Specifically, composite shadow visuals 450*a* may be generated by taking full screen scrim image 520 minus the viewable region of composited viewable region mask 519.

FIG. 5H shows another non-limiting example flowchart for a process flow associated with generate tracking visuals 452. In one non-limiting example, generate tracking visuals 452 may utilize viewability quad 444*a*, device motion data 408, engine state 443*a*, and reference tracking image 413 as input. In one non-limiting example, integrating application 403 may (at action 403*e*) optionally periodically update tracking image (in reference tracking image 413) to include application specific visuals.

Generate tracking visuals 452 can (at action 521) create tracking image mask 521*a* using viewability quad 444*a*, device motion data 408, and/or engine state 443*a* as input. More specifically, if an image is not being tracked, then system 1 can output a full screen, high-to-full opacity mask. Otherwise, if the image is being tracked, and if device motion (using device motion data 408) suggests significant movement, system 1 can compute the region swept between the current viewability quad (using viewability quad 444*a*) and a new near-future one, while factoring in estimated latency. System 1 can create a mask whose shape captures the outer border of the swept viewable region, with a Camera-Image-space variable border thickness and opacity value proportional to image tracking quality to generate the resultant tracking image mask 521*a*. Generate tracking visuals 452 utilize tracking image mask 521*a* and reference tracking image 413 to apply the mask and create tracking visuals 452*a*. Specifically, the full screen reference tracking image (from reference tracking image 413) can apply mask 521*a* to output tracking visuals 452*a*. It should be appreciated that integrating application 403 may display the full tracking image behind an application specific visual in the composite HUD visuals 455 (instead of, or in addition to, a partial version that will usually be drawn in front of an application specific visual). It should also be appreciated that tracking visuals 452*a* may not be displayed every frame, may be the rendering of a 3-D scene, may be comprised of non-visible regions (e.g., infrared light), may be otherwise invisible to the user (e.g., because the user is wearing polarized lenses that filter out at least some of the tracking visuals 452*a*), may appear non-uniformly, and may be updated periodically to include visuals generated by integrating application.

Figure 5I:
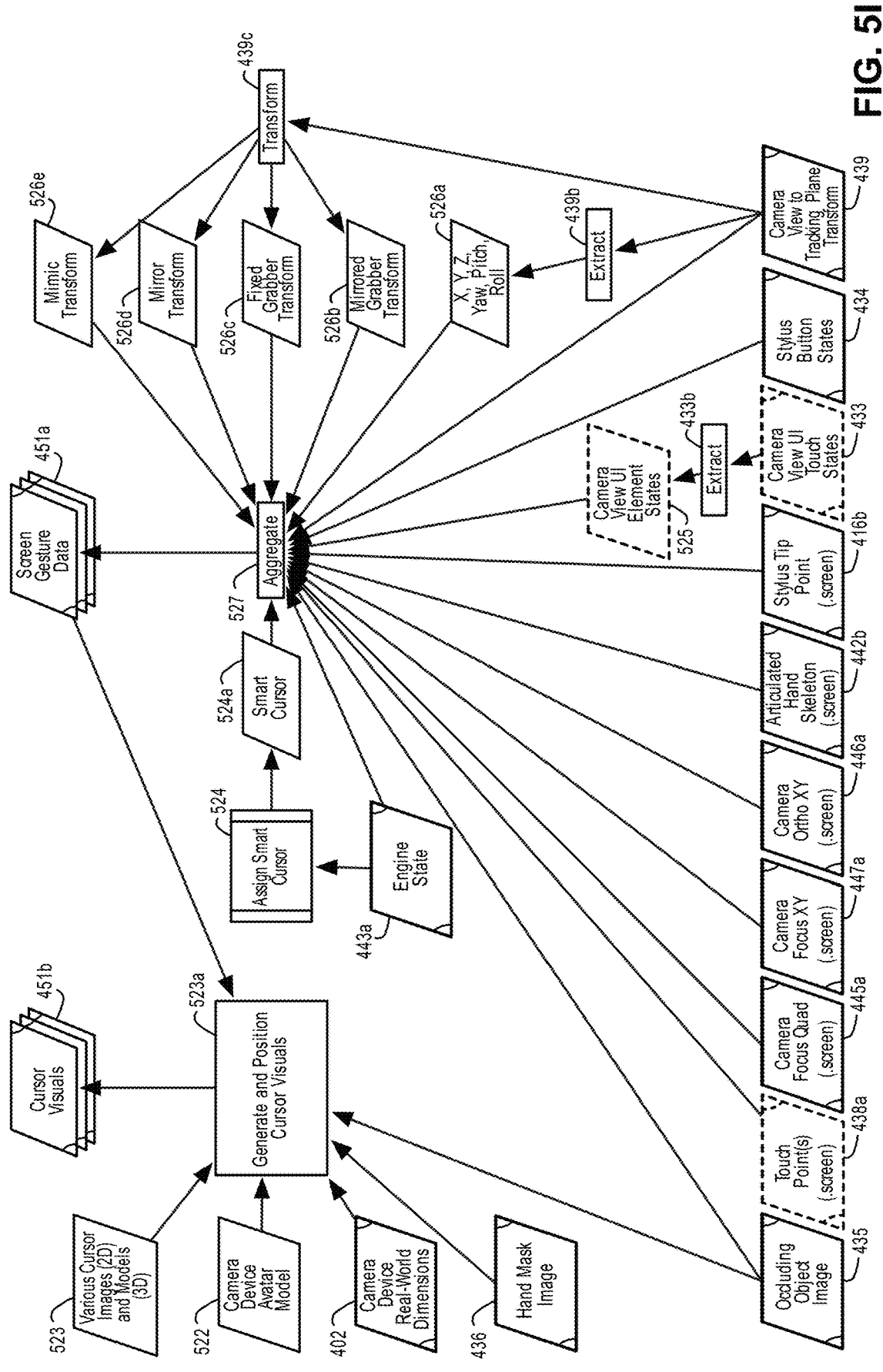

FIG. 5I shows another non-limiting example flowchart for a process flow associated with generate cursor visual and screen gesture data 451. In one non-limiting example embodiment, generate cursor visual and screen gesture data 451 may utilize camera device real-world dimensions 402, hand mask image 436, occluding object image 435, camera focus quad 445*a*, camera focus XY 447*a*, camera ortho XY 446*a*, engine state 443*a*, camera view UI touch states 433, tracking plane transform 439, articulated hand skeleton 442*b*, touch point(s) 438*a*, stylus tip point 416*b*, and stylus button states 434 as input to generate cursor visuals 451*b* and screen gesture data 451*a*. Generate cursor visual and screen gesture data 451 may also utilize cursor images and models 523 and camera device avatar model 522 as further input in generating cursor visuals 451*b* and screen gesture data 451*a*.

In one non-limiting example, camera view UI touch states 433 may be extracted (at action 433*b*) to generate camera view UI element states 525. Camera view UI element states 525 may include various states associated with different user interface elements displayed on the camera device. For example, camera view UI element states 525 may include indication of a user interface element being selected (e.g., via user input) to indicate that the state of the element has changed. Generate cursor visual and screen gesture data 451 may also extract (at action 439*b*) tracking plane transform 439 to generate XYZ yaw pitch roll 526*a* indicating how the device is moving in free space (e.g., as six degrees of freedom information). XYZ yaw pitch roll 526*a* can include a float value (e.g., labeled set of 6) in the ".trackingPlane" coordinate space. XYZ yaw pitch roll 526*a* can include a value depicting six degrees of freedom (including three-dimensional position and at least three angles) of camera device, extracted from camera transform. Any subset of these six values can be used, for example, to control an avatar in a three-dimensional scene on the screen. Generate cursor visual and screen gesture data 451 may transform (at action 439*c*) tracking plane transform 439 to generate various transforms that include mimic transform 526*e*, mirror transform 526*d*, fixed grabber transform 526*c*, and mirrored grabber transform 526*b*. These various transforms are depicted with respect to FIGS. 6F-1 to 6F-6 (discussed herein).

Generate cursor visual and screen gesture data 451 may use engine state 443*a* to assign smart cursor 524 in order to generate smart cursor 524*a*. In particular, assign smart cursor 524 can detect an object within the camera view (using data from engine state 443*a*) to determine what is being used as a cursor (e.g., stylus, hand) in order to generate smart cursor 524*a*. Various elements may be aggregated (at action 527) to generate screen gesture data 451*a*. More specifically, smart cursor 524*a*, camera view UI element states 525, mimic transform 526*e*, mirror transform 526*d*, fixed grabber transform 526*c*, mirrored grabber transform 526*b*, XYZ yaw pitch roll 526*a*, occluding object image 435, camera focus quad 445*a*, camera focus XY 447*a*, camera ortho XY 446*a*, engine state 443*a*, tracking plane transform 439, articulated hand skeleton 442*b*, touch point(s) 438*a*, stylus tip point 416*b*, and stylus button states 434 may be aggregated (at action 527) to generate screen gesture data 451*a*.

Output from screen gesture data 451*a* as well as hand mask image 436, camera device real-world dimensions 402, cursor images and models 523, and camera device avatar model 522 may be used to generate and position cursor visuals (at action 523*a*) to generate cursor visuals 451*b*. That is, screen gesture data 451*a*, hand mask image 436, camera device real-world dimensions 402, cursor images and models 523, and camera device avatar model 522 can be used by generate cursor visual and screen gesture data 451 to create the different cursor visuals (taking into account various elements such as different screen gestures) and position the cursor visuals when generating cursor visuals 451*b*.

Figure 5J:
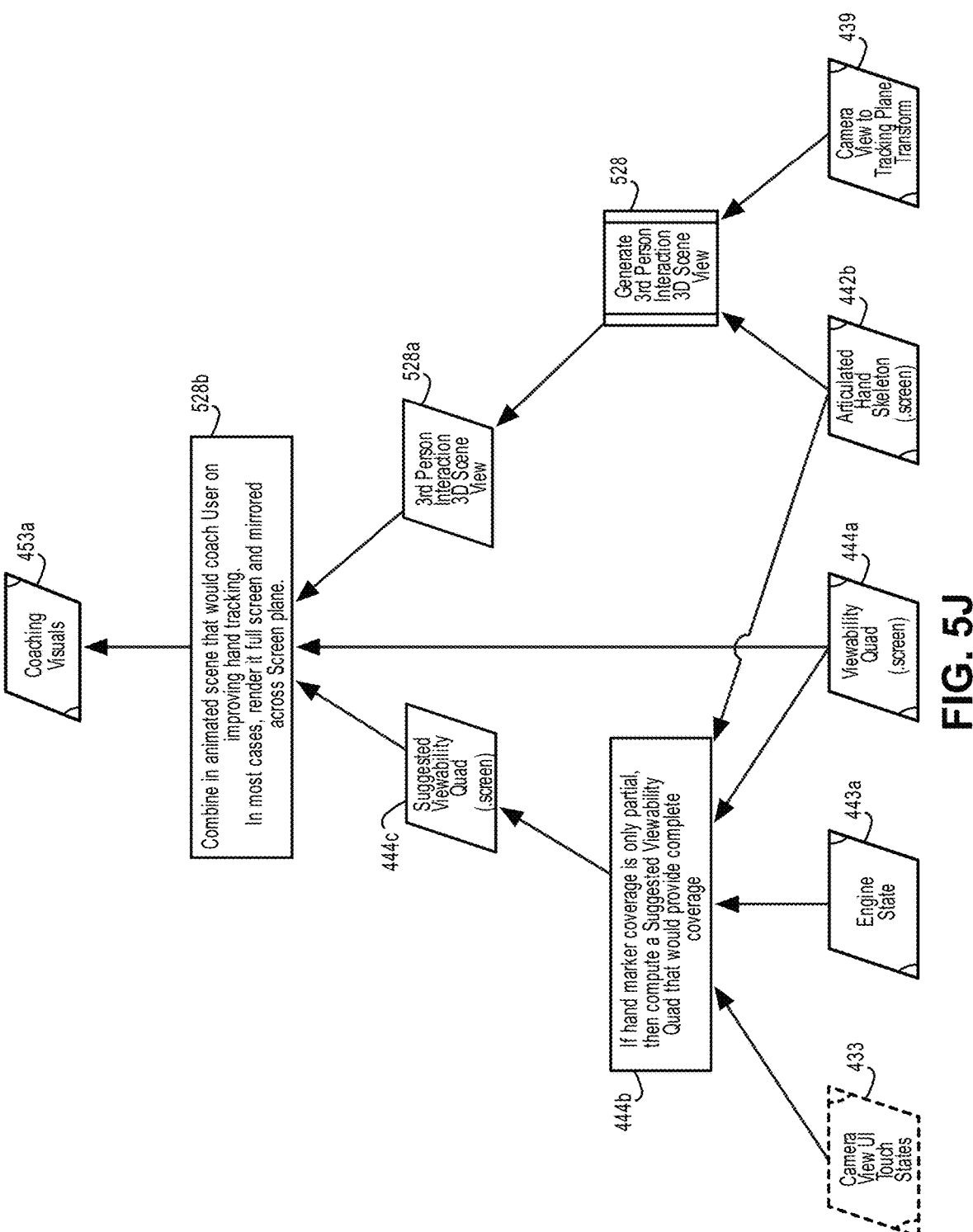

FIG. 5J shows another non-limiting example flowchart of a process flow associated with generate coaching visuals 453. In one non-limiting example, generate coaching visuals 453 may utilize camera view UI touch states 433, engine state 443*a*, viewability quad 444*a*, articulated hand skeleton 442*b*, and tracking plane transform 439 to generate coaching visuals 453*a*.

Generate coaching visuals 453 may specifically utilize camera view UI touch states 433, engine state 443a, viewability quad 444a, and articulated hand skeleton 442b to generate suggested viewability quad 444c (in the ".screen" coordinate space). More specifically, if hand marker coverage is only partial (determined at action 444b), generate coaching visuals 453 may compute a suggested viewability quad that would provide complete coverage (as suggested viewability quad 444c).

Generate coaching visuals 453 may utilize articulated hand skeleton 442b and tracking plane transform 439 as input to generate third person 3d scene view 528 for generating third person interaction view 528a. In particular, generate third person interaction view 528a may include a specific avatar displayed in third person for use in operating a "virtual robot" (displayed as an avatar). Generate coaching visuals 453 can utilize suggested viewability quad 444c and third person interaction view 528a along with viewability quad 444a to generate coaching visuals 453a. In particular, generate coaching visuals 453 may combine these elements in an animated scene that would coach a user on improving hand tracking. In certain example embodiments, the display can be rendered on a full screen and mirrored across a screen plane.

Figure 5K:
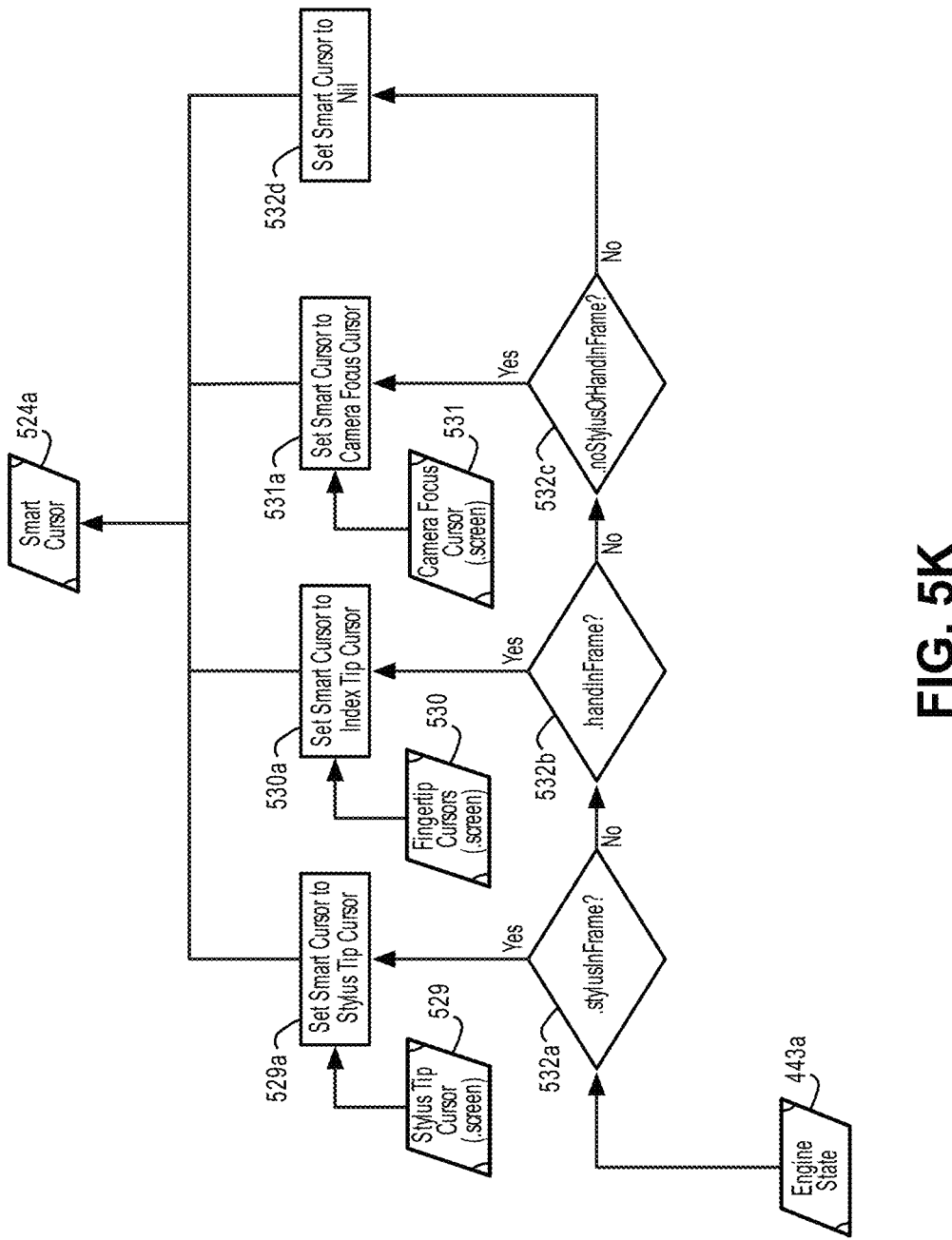

FIG. 5K shows another non-limiting example flowchart for a process flow associated with assign smart cursor 524. In one example embodiment, assign smart cursor 524 may utilize engine state 443a as input in processing. Assign smart cursor 524 may also utilize stylus tip cursor 529, fingertip cursors 530, and camera focus cursor 531 as input in processing. It should be appreciated that stylus tip cursor 529, fingertip cursors 530, and camera focus cursor 531 may all be represented in the ".screen" coordinate space and may all represent cursor data associated with each of a stylus, fingertip(s), and/or camera focus elements.

Assign smart cursor 524 may use engine state 443a to determine if ".stylusInFrame" indicates that a stylus is detected in frame (at action 532a). If the stylus is detected in frame, assign smart cursor 524 may set smart cursor 524a to stylus tip cursor (at action 529a) using stylus tip cursor 529. If ".stylusInFrame" (at action 532a) returns a negative value, assign smart cursor 524 may determine (at action 532b) if there is a hand in the frame using ".handInFrame" from engine state 443a. If a hand is detected in frame, assign smart cursor 524 may set smart cursor 524a to index tip cursor (at action 530a) using fingertip cursor 530. If ".handInFrame" (at action 532b) returns a negative value, assign smart cursor 524 may determine (at action 532c) if there is no stylus of hand in the frame using ".noStylusOrHandInFrame" from engine state 443a. If the result of action 532c is positive, assign smart cursor 524 may set smart cursor 524a to camera focus cursor (at action 531a) using camera focus cursor 531. If the result of action 532c is negative, assign smart cursor 524 may set smart cursor 524a to "nil" (or NULL value) at action 532d.

Figure 5L:
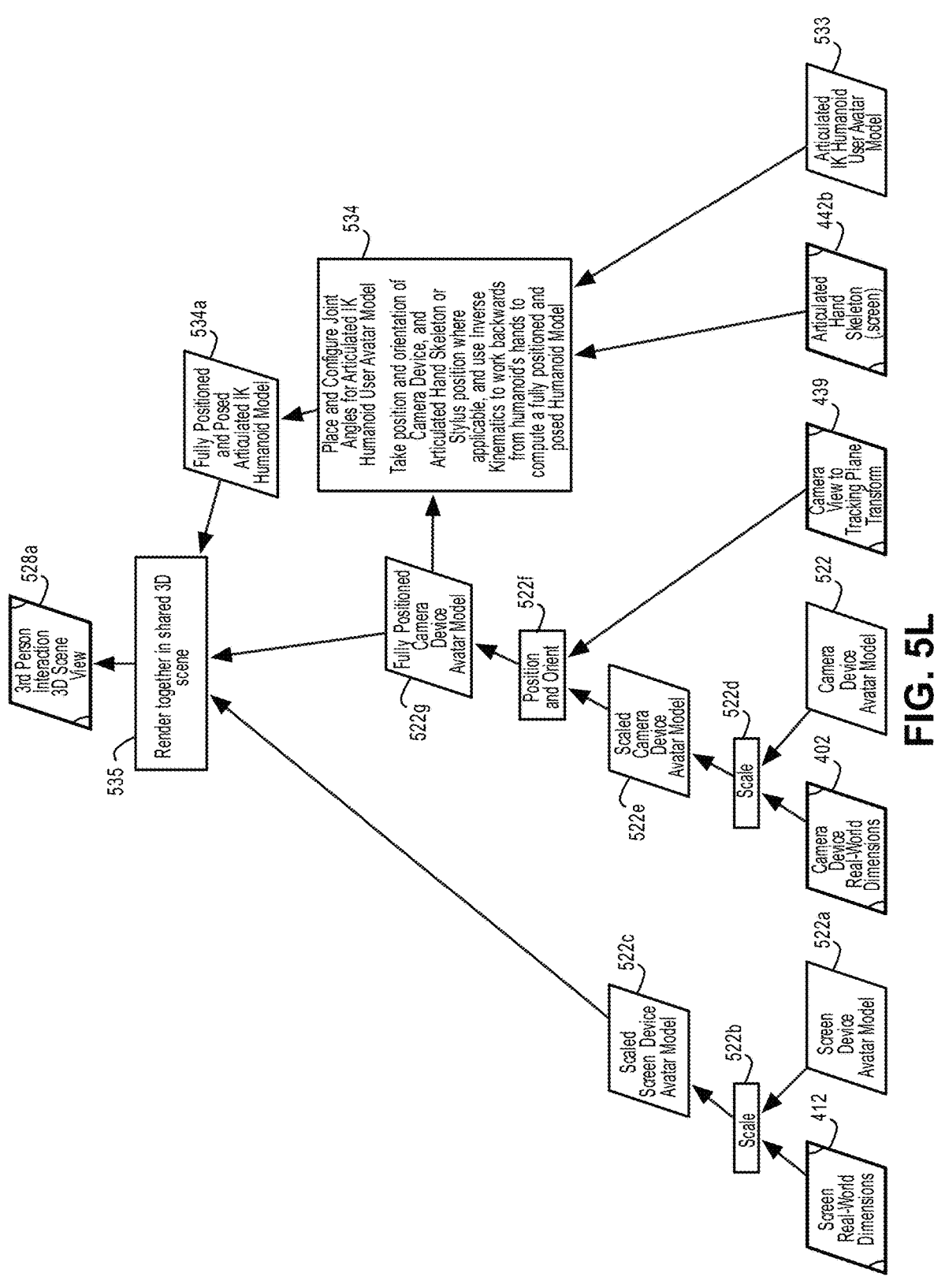

FIG. 5L shows another non-limiting example flowchart for a process flow associated with generate third person 3d scene view 528. In one example embodiment, generate third person 3d scene view 528 may utilize screen real-world dimensions 412, camera device real-world dimensions 402, articulated hand skeleton 442b, tracking plane transform 439, and camera device avatar model 522 as input to generate third person interaction view 528a. Generate third person 3d scene view 528 may also utilize screen device avatar model 522a and humanoid user avatar model 533 as input to generate third person interaction view 528a.

Generate third person 3d scene view 528 may scale (at action 522b) screen real-world dimensions 412 and screen device avatar model 522a to generate scaled screen device avatar model 522c. Similarly, generate third person 3d scene view 528 may scale (at action 522d) camera device real-world dimensions 402 and camera device avatar model 522 to generate scaled camera device avatar model 522e. Generate third person 3d scene view 528 can position and orient (at action 522f) scaled camera device avatar model 522e using tracking plane transform 439 to generate fully positioned camera device avatar model 522g.

Using fully positioned camera device avatar model 522g, along with articulated hand skeleton 442b and humanoid user avatar model 533, generate third person 3d scene view 528 can create fully positioned and posed model 534a of a fully positioned and posed articulated IK humanoid model. In particular, at action 534, generate third person 3d scene view 528 can place and configure joint angles for an articulated IK humanoid user avatar model. More specifically, generate third person 3d scene view 528 and take position and orientation of camera device and articulated hand skeleton (or stylus position where applicable), and use inverse kinematics (IK) to work backwards from humanoid's hands to compute a fully positioned and posed humanoid model in generating fully positioned and posed model 534a. The combination of fully positioned and posed model 534a, fully positioned camera device avatar model 522g, scaled screen device avatar model 522c can be rendered together (at action 535) in a shared three-dimensional scene to generate third person interaction view 528a.

It should be understood that, although various actions depicted in FIGS. 4A-5L are described above as separate actions with a given order, this is done for ease of description. It should be understood that, in various embodiments, the above-mentioned actions may be performed in various orders; alternatively or additionally, portions of the above-described actions may be interleaved and/or performed concurrently with portions of the other actions.

Figures 1, 6A:
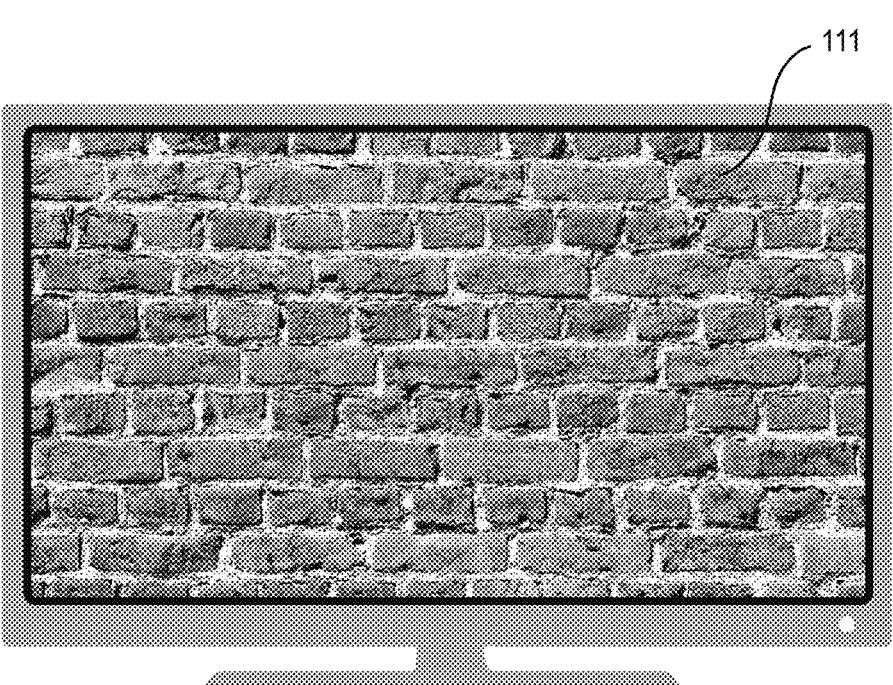
FIGS. 6A-1 to 6H-6 show non-limiting example illustrations associated with various aspects of system 1.
Figures 2, 6A:
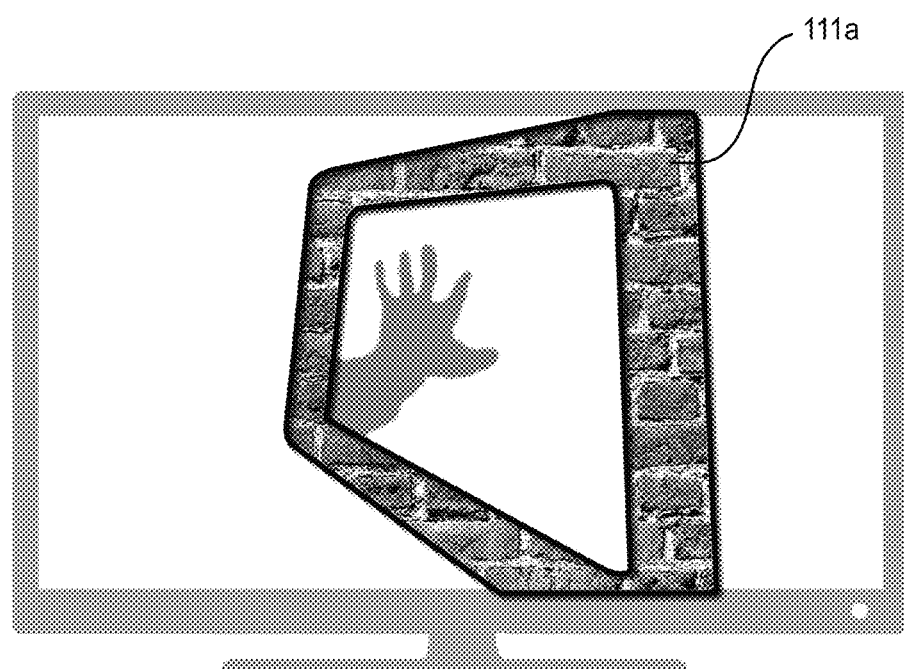
Figures 3, 6A:
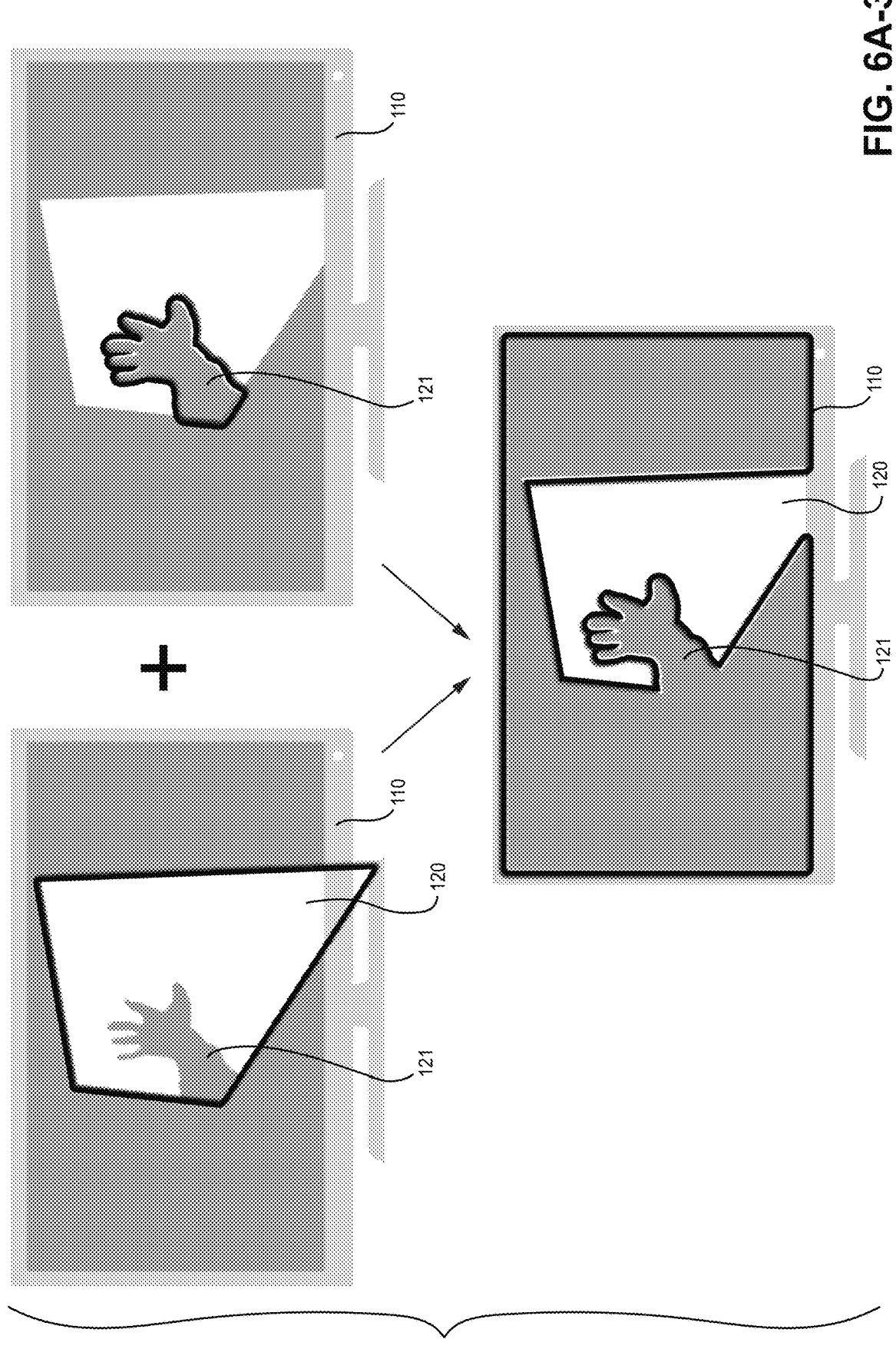

FIGS. 6A-1 to 6H-6 show non-limiting example illustrations associated with various aspects of system 1. In one example embodiment, the illustrations shown in these figures depict different elements of the system 1 and/or different usage cases associated with system 1. FIGS. 6A-1 to 6A-3 show non-limiting example illustrations depicting how system 1 associates different elements in a captured image.

FIG. 6A-1 shows a non-limiting example illustration of display 110 displaying tracking image 111. As discussed herein, tracking image 111 may include certain features capturable by the camera and detectable by engine 200 during processing. In the example shown in FIG. 6A-1, a full-screen background tracking image 111 is displayed where the tracking image 111 encompasses the entirety (or substantial entirety) or display 110.

As explained herein, engine 200 will generate a composited shadow plane image, which is a partial opacity, black full screen image depicting a shadow (e.g., as shown in FIG. 6A-3). This image is created using an image mask of the user's hand, as captured by image capture device, adding it to the mask image generated by cutting out the area marked by the viewability quad from a full-screen mask display device 110.

FIG. 6A-2 shows a similar configuration to FIG. 6A-1, but instead depicting partial tracking image 111a. That is, and as explained herein, engine 200 may instead display partial tracking image 111a, which is cropped from full tracking image, on display 110 so as not to consume the entire display 110 with a full tracking image. Engine 200 can process partial tracking image 111a in a manner similar to those described herein.

In one example embodiment, display 110 will display tracking image 111, output by engine 200, which shows a full screen tracking image in the example of FIG. 6A-1. This example is of course non-limiting, and the technology envisions any type of tracking image 111 displayable on display 110 including a partial tracking image (e.g., as shown in FIG. 6A-2). Engine 200 will use tracking image 111 to determine whether the camera is viewing the display 110 displaying image 111 and to understand the orientation of the camera device relative to display 110.

Engine 200 can generate various elements including the tracking image 111, viewability quad 120, and front composited shadow plane image 121 (as shown in FIG. 6A-3). In one example embodiment, engine 200 will view various portions of tracking image 111 depending on the orientation of the camera device relative to display 110. The portion that is "viewable" by camera device based on a certain position and orientation is, in some embodiments, cropped by viewability quad 120. Within viewability quad 120, the camera device may image the user hand and from that, engine 200 may generate hand shadow image 121. In the example of FIG. 6A-3, front composited shadow plane image 121 and viewability quad 120 may be unprojected. Moreover, the example of FIG. 6A-3 also shows a front composited shadow plane image including hand shadow image 121 and viewability quad 120.

Figures 1, 6B:
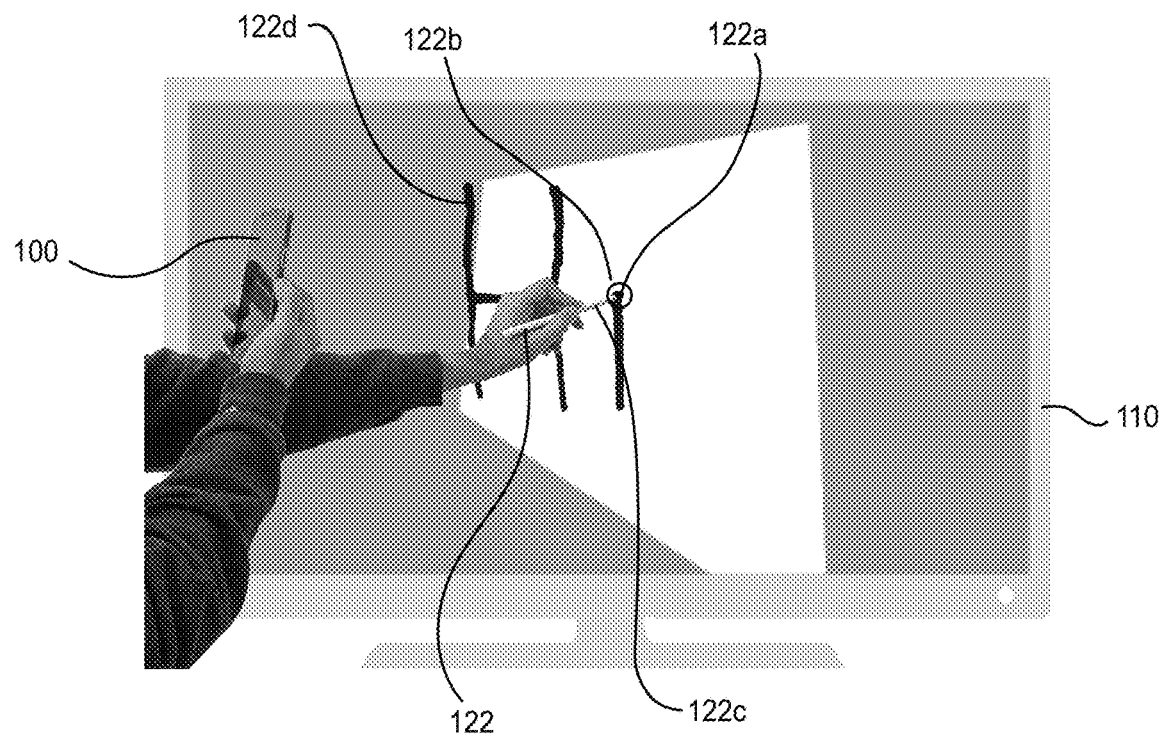
Figures 2, 6B:
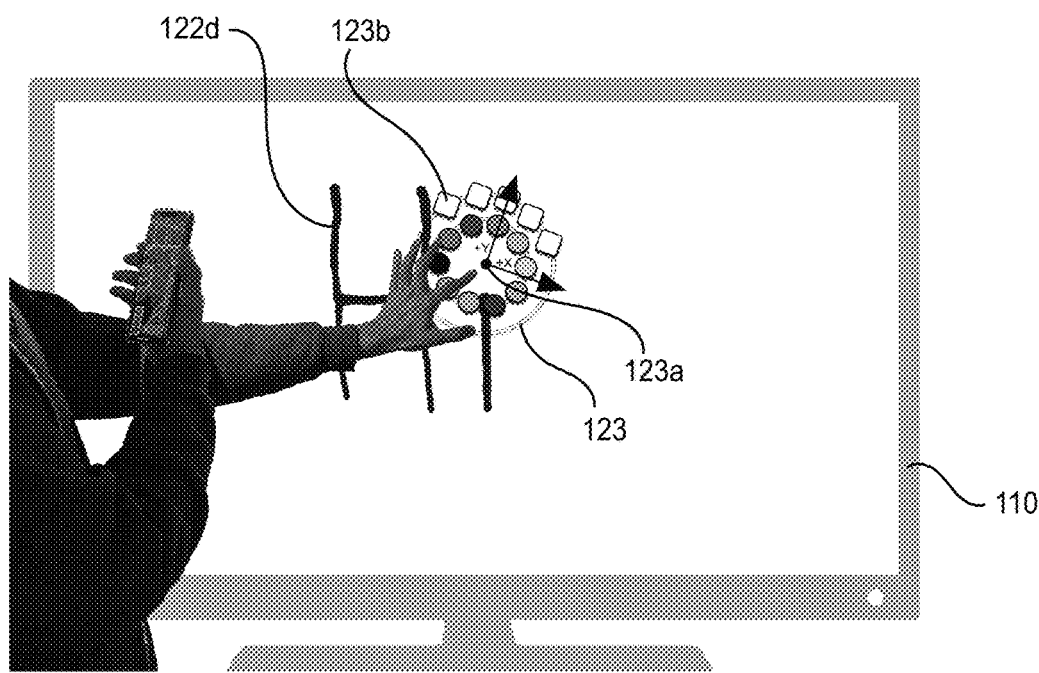

FIG. 6B-1 shows another non-limiting example illustration of system 1 with different elements detected and composed by engine 200. In the example of FIG. 6B-1, a user is holding an object (e.g., stylus) in front of the camera device 100 where different elements of the object are detected (and possibly composed on display 110). In the example of FIG. 6B-1, a user is holding stylus 122 in a hand where camera device 100 can view and capture an image of stylus 122. Software engine 200 can detect various elements associated with stylus 122 (as discussed herein). For example, engine 200 can detect stylus tip 122a indicating a tip of the stylus object. In one example embodiment, stylus tip 122a may be represented as a two-dimensional coordinate (e.g., in an X-Y plane) represented in the ".screen" space. Engine 200 may further generate stylus tip cursor 122b indicating a cursor (e.g., displayable by display 110) associated with movement of stylus 122. Engine 200 may also detect (and generate) stylus button 122c indicating a potential physical input area associated with stylus 122. For example, the user may push button 122c that can invoke engine 200 to perform an action associated with a "button press" of stylus 122. As the user operates stylus 122, a resultant annotation image 122d may be output (shown as the word "Hi" in FIGS. 6B-1 and 6B-2). These examples are of course non-limiting and the technology described herein envisions any object that can be detected by system 1 and used in processing. Non-limiting examples of stylus 122 include a recognized real world object, a recognized tracking image, or an area that appears as a solid color.

FIG. 6B-2 shows another non-limiting example illustration of system 1 showing various aspects of a displayable user interface using engine 200. In the example shown in FIG. 6B-2, selection menu 123 is displayed on display device 110 as the user is positioning the hand in free space near the display device 110. In more detail, the user may position the hand in front of the camera device 100 where a digit of the hand (e.g., index finger) can be detected. Engine 200 may detect the index tip 123a (represented as a two-dimensional coordinate point) where the menu 123 may be generated relative to index tip 123a. That is, engine 200 may detect index tip 123a and then generate a menu 123 with selectable options 123b surrounding at the two-dimensional coordinate location of index tip 123a. In the example shown in FIG. 6B-2, the menu 123 represents a color palette where selectable options 123b can correspond to different colors and buttons surrounding the color palette.

Figures 2, 6C:
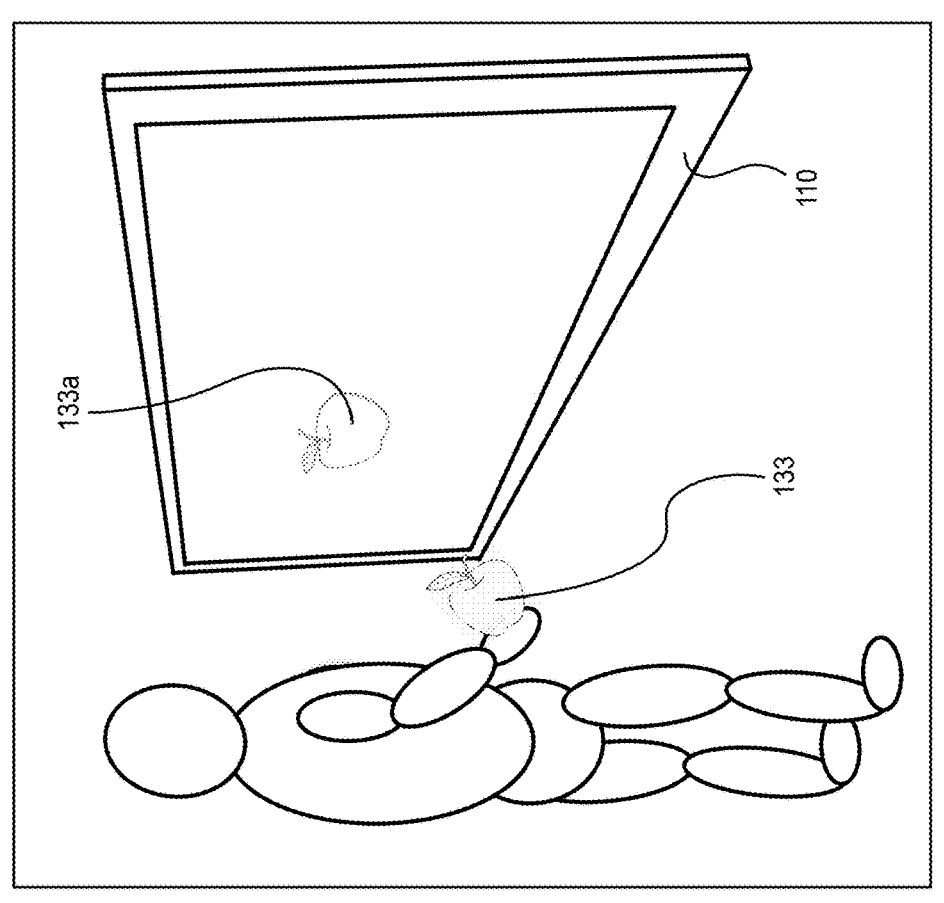
Figures 1, 6C:
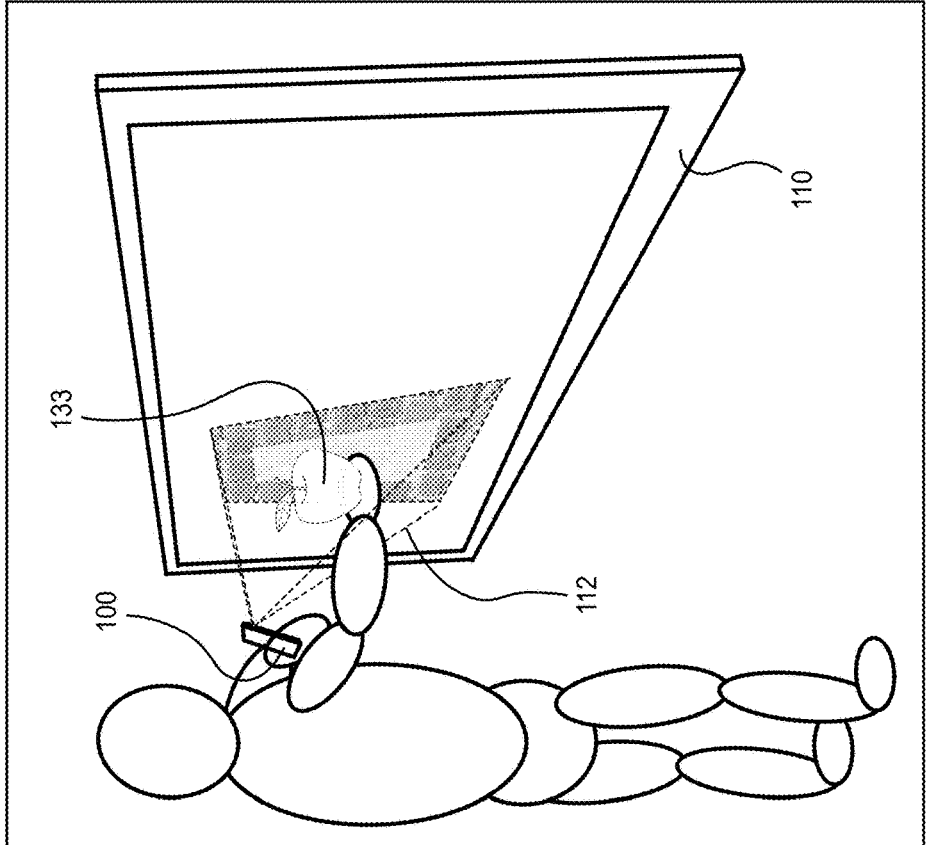

FIGS. 6C-1 and 6C-2 show non-limiting example illustrations associated with extracting an occluding object image (e.g., as discussed with respect to FIG. 5A). FIG. 6C-1 specifically shows a situation where the user places occluding object 133 in field of view of camera device 100 (i.e., within a truncated pyramid of vision 112) where FIG. 6C-2 shows occluding object image 133a displayed on display device 110 after the object 133 has been extracted and processed by engine 200. In more detail, and as discussed herein, camera device 100 extracts an image of the occluding object 133 (e.g., an apple) from the full captured image. Engine 200 can thus capture the image of occluding object 133, for use by the integrating application, for example to display the same occluding object image 133a on display 110, or, for example, to provide a shape for an object with physical properties that can interact with other objects in the integrating application. This example is of course non-limiting and the technology described herein envisions any variety of methods for extracting and displaying occluding object image 133a. For example, occluding object image 133a may instead be depicted as a virtual representation of occluding object 133 (e.g., as a virtual apple displayed in graphical form).

Figures 1, 6D:
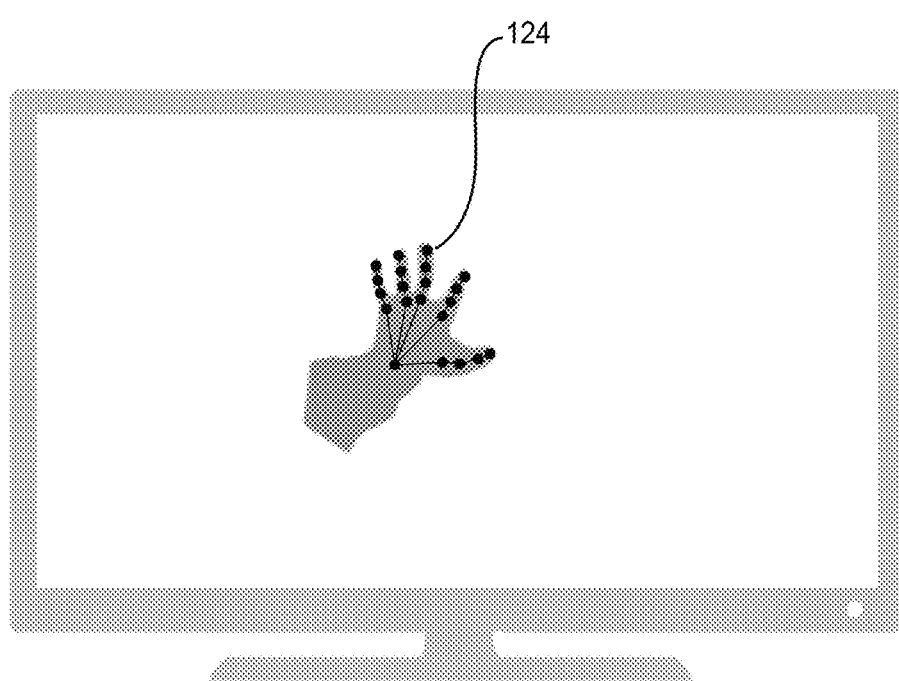
Figures 2, 6D:
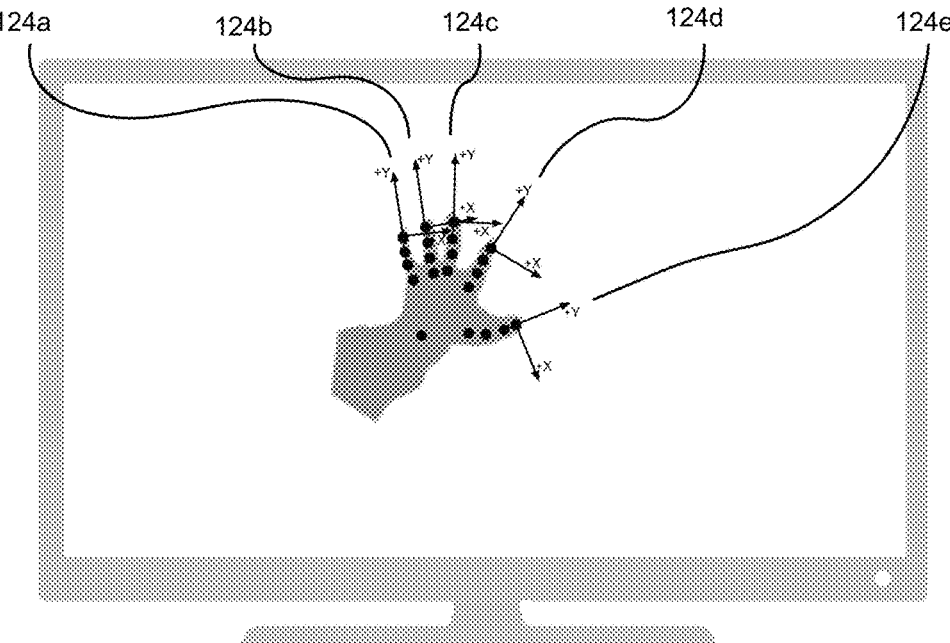
Figures 3, 6D:
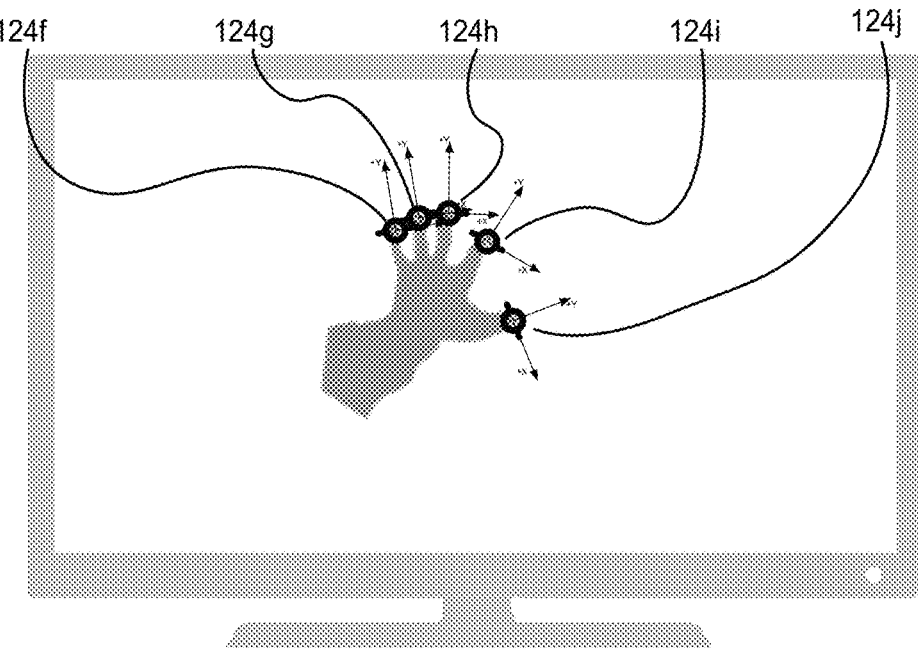

FIGS. 6D-1 to 6D-3 show further non-limiting example illustrations associated with different outputs of engine 200. In particular, FIG. 6D-1 shows a non-limiting example articulated hand skeleton 124 (corresponding to articulated hand skeleton 442a, 442b) where different points along the skeleton 124 are connected together in an articulated, posed 2D skeleton. FIG. 6D-2 shows a non-limiting example articulated hand skeleton 124 with fingertip marks XY depict various coordinate points of fingertips 124a-e. Specifically, fingertips 124a-e include two-dimensional coordinate points for little tip 124a, ring tip 124b, middle tip 124c, index tip 124d, and thumb tip 124e. FIG. 6D-3 thus shows a non-limiting example of fingertip cursors 124f-j associated with fingertips 124a-e. In particular, fingertip cursors 124f-j (e.g., corresponding to fingertip cursors 530) include cursors indicating little tip cursor 124f, ring tip cursor 124g, middle tip cursor 124h, index tip cursor 124i, thumb tip cursor 124j.

Figures 1, 6E:
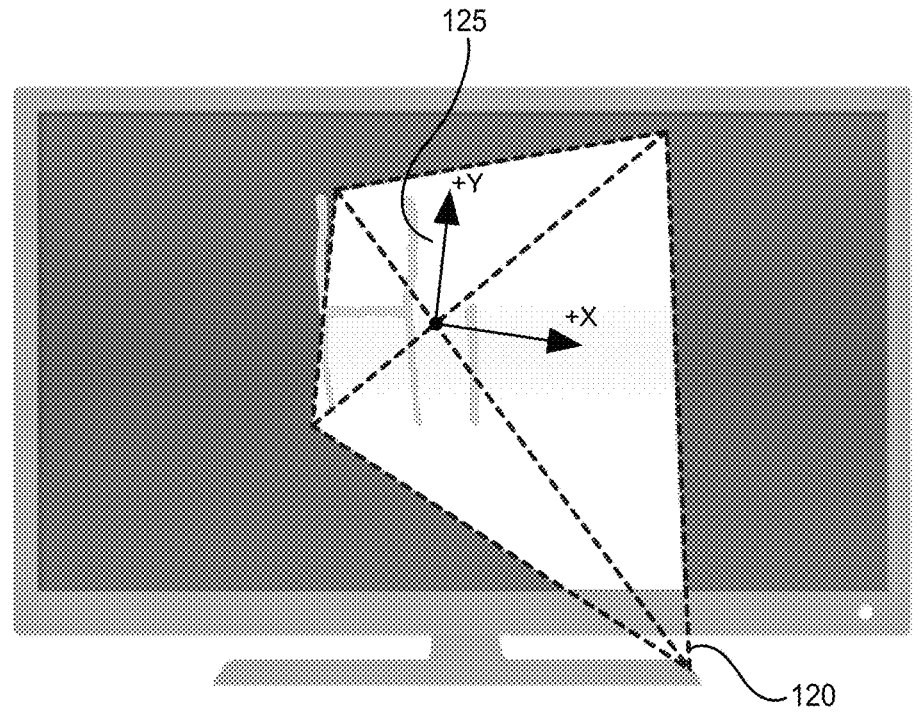
Figures 2, 6E:
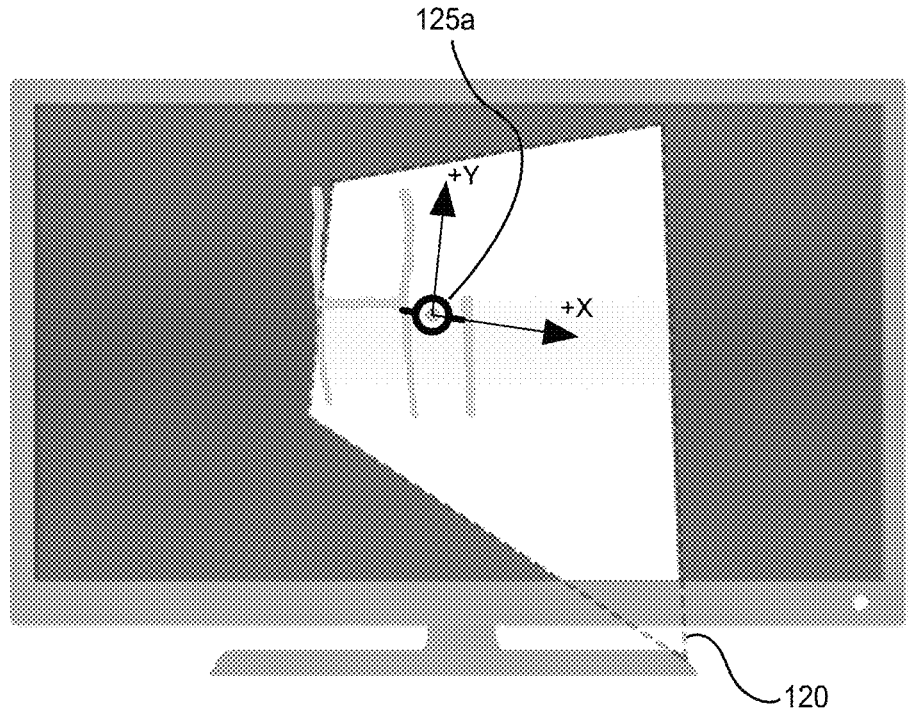
Figures 3, 6E:
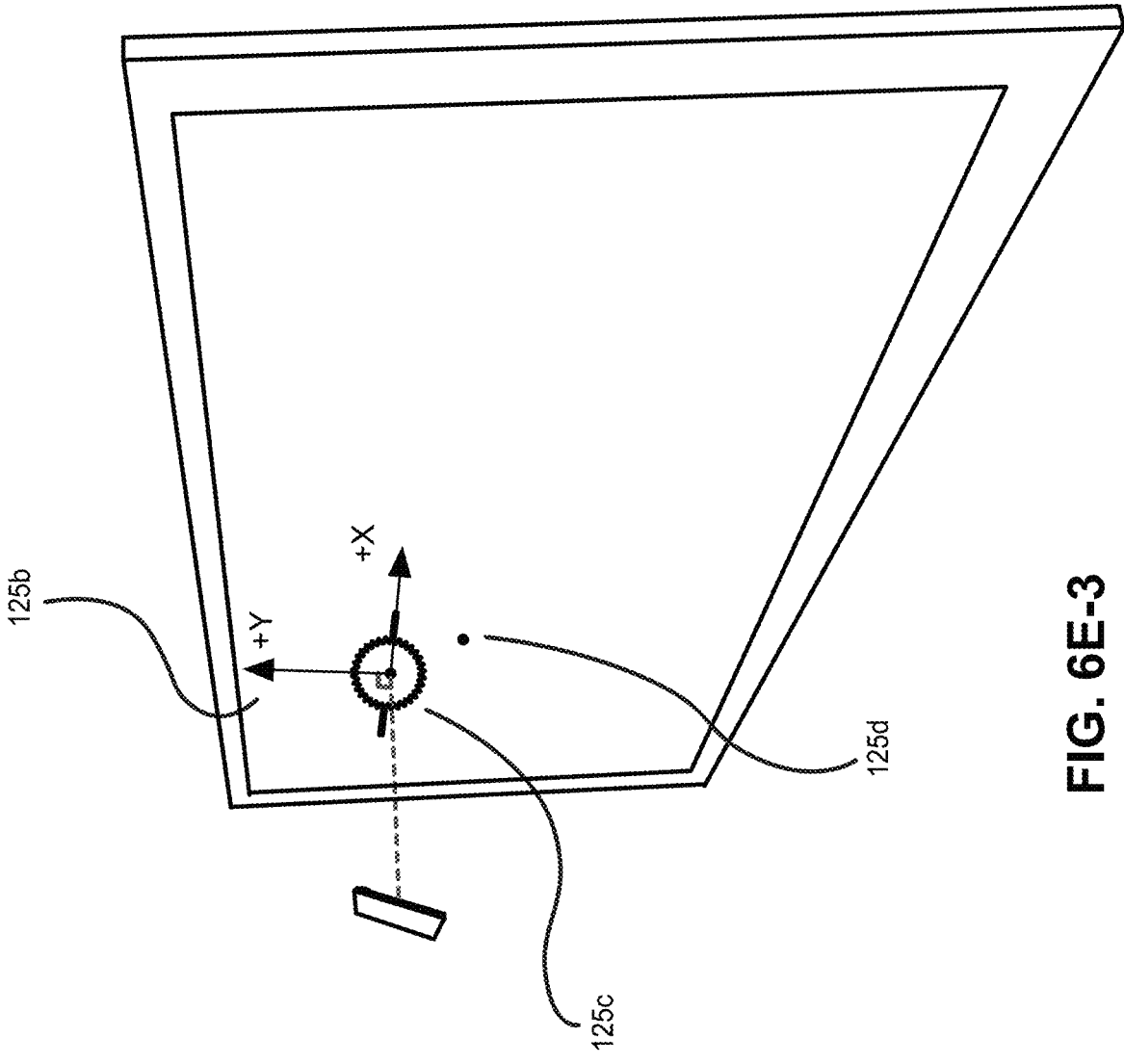

FIGS. 6E-1 to 6E-3 show further non-limiting example illustrations associated with different outputs of engine 200. In particular, FIG. 6E-1 shows a non-limiting example of camera focus XY 125 (e.g., corresponding to camera focus XY 447a) where a two-dimensional axis forms at an origin of an intersection point of viewability quad 120. FIG. 6E-2 thus shows camera focus cursor 125a (e.g., corresponding to camera focus cursor 531) where cursor 125a indicates a two-dimensional coordinate point of a location of camera focus XY 125. FIG. 6E-3 shows a non-limiting example of camera ortho XY 125b (e.g., corresponding to camera ortho XY 446). Camera ortho XY 125b includes camera focus XY origin 125d that includes a two-dimensional coordinate point of an origin of camera focus XY, where camera ortho cursor 125c includes values of two-dimensions in ".screen" or three-dimensions in ".trackingPlane."

Figures 1, 6F:
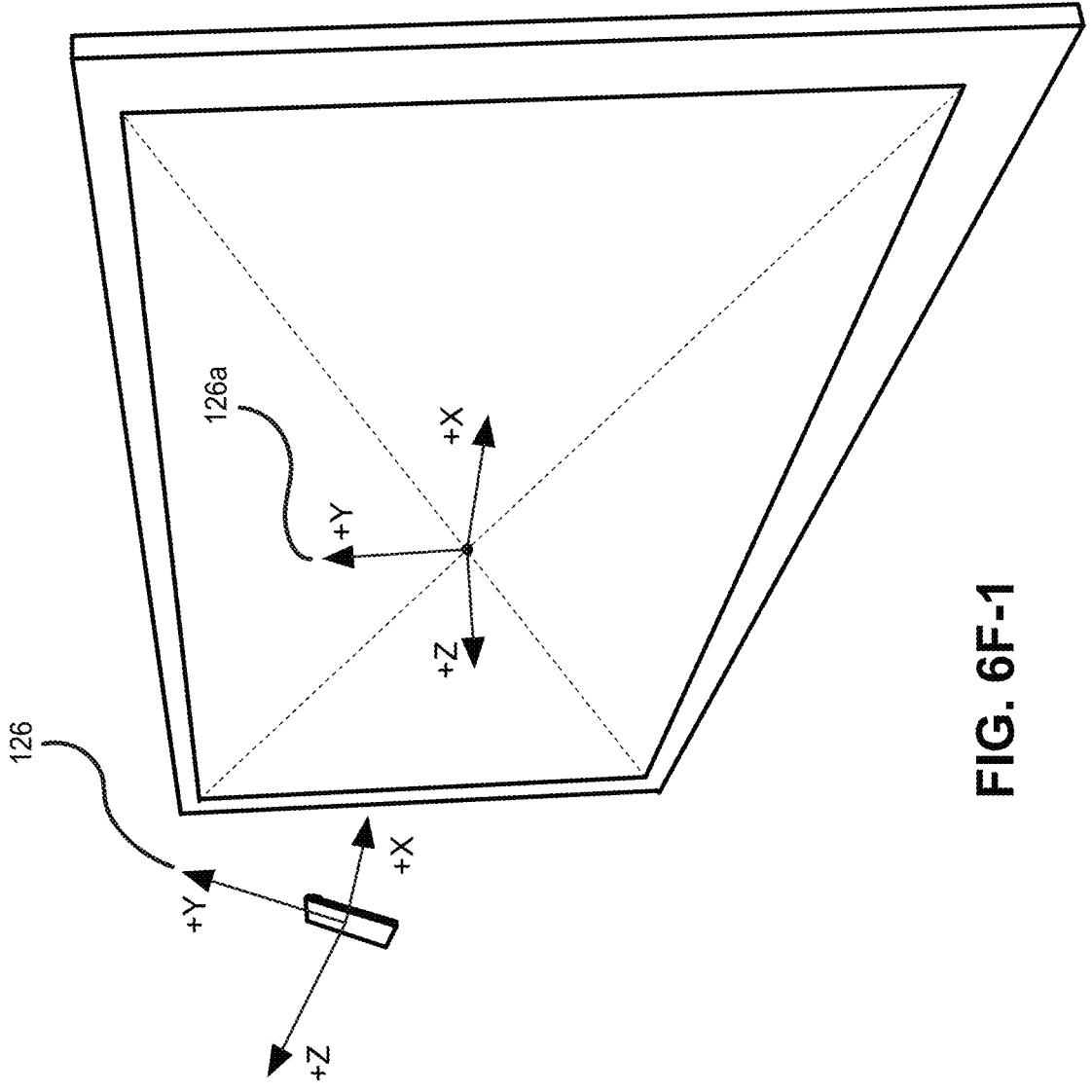
Figures 2, 6F:
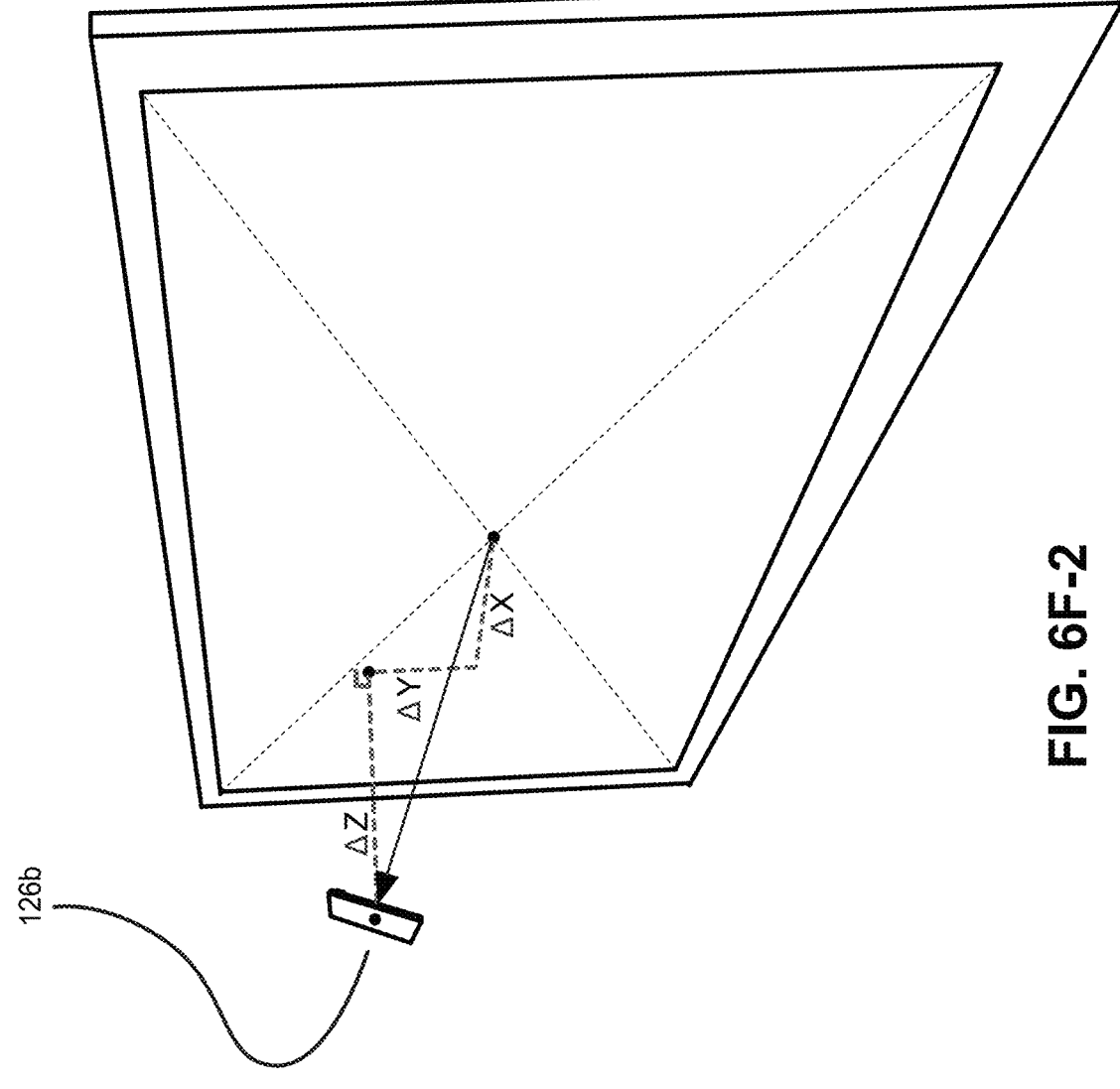
Figures 3, 6F:
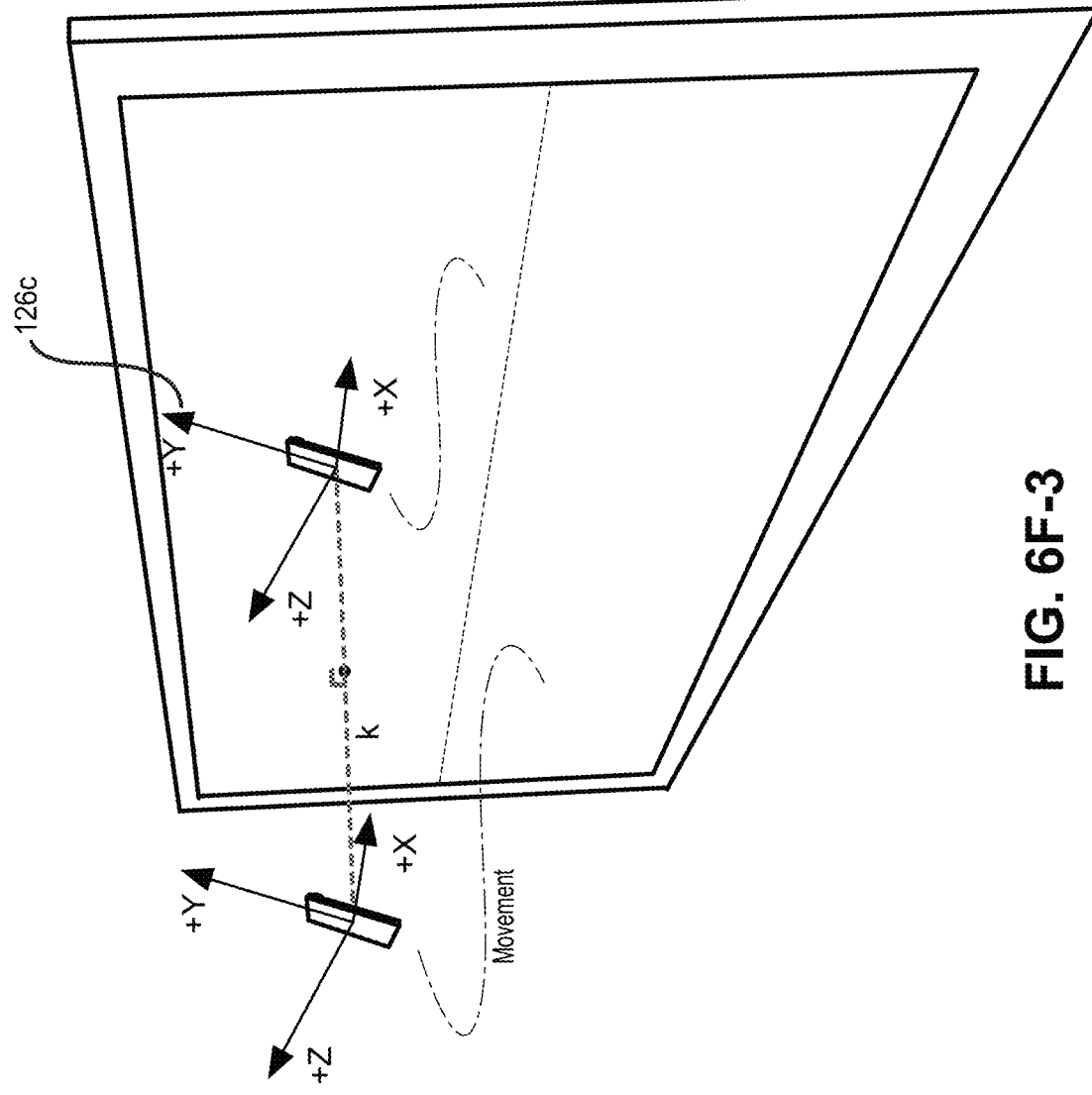

FIGS. 6F-1 to 6F-6b show non-limiting example illustrations associated with different transforms generated by engine 200. FIG. 6F-1 shows a non-limiting example of camera transform 126 where tracking plane coordinate frame 126a is derived in association with camera transform 126. In one example, tracking plane coordinate frame 126a may indicate where the camera position and orientation has been transformed in the real world space to that of the tracking plane. FIG. 6F-2 shows a non-limiting example of camera transform origin 126b including three-dimensional coordinates associated with the camera's transform origin. Camera transform origin 126b may include a change in coordinate location along each of the X-Y-Z axes in a three-dimensional coordinate system. It should be appreciated that camera transform 126 may include a position and orientation of camera device with respect to the tracking plane (which coincides with the screen). In one example, to place a spotlight in a three-dimensional graphical scene, located in the three-dimensional scene to coincide in the real-world space with camera device, and pointing where the camera device is pointed. In another example, to control and coincide with an off-screen bow-and-arrow.

Figures 4, 6F:
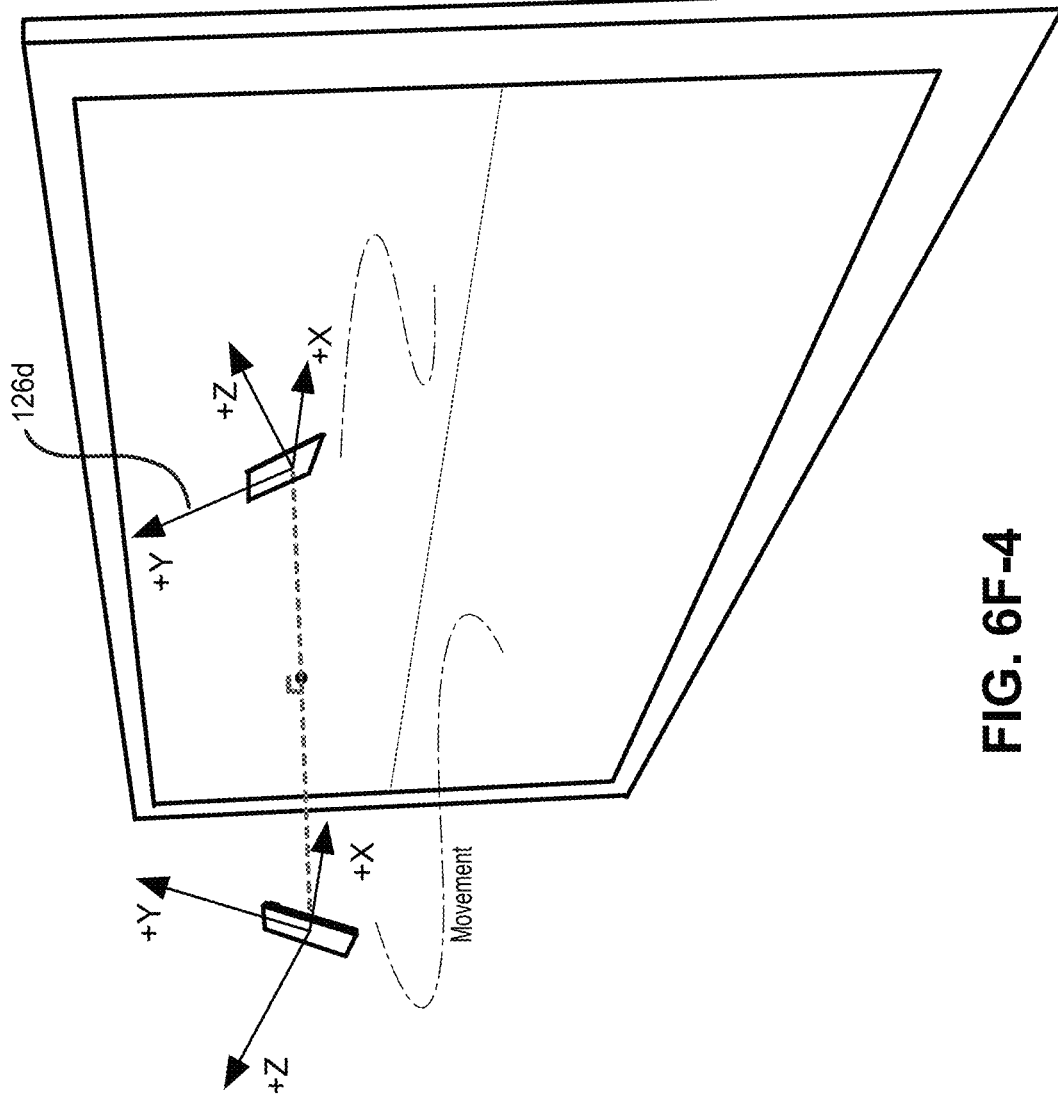
Figures 5A, 6F:
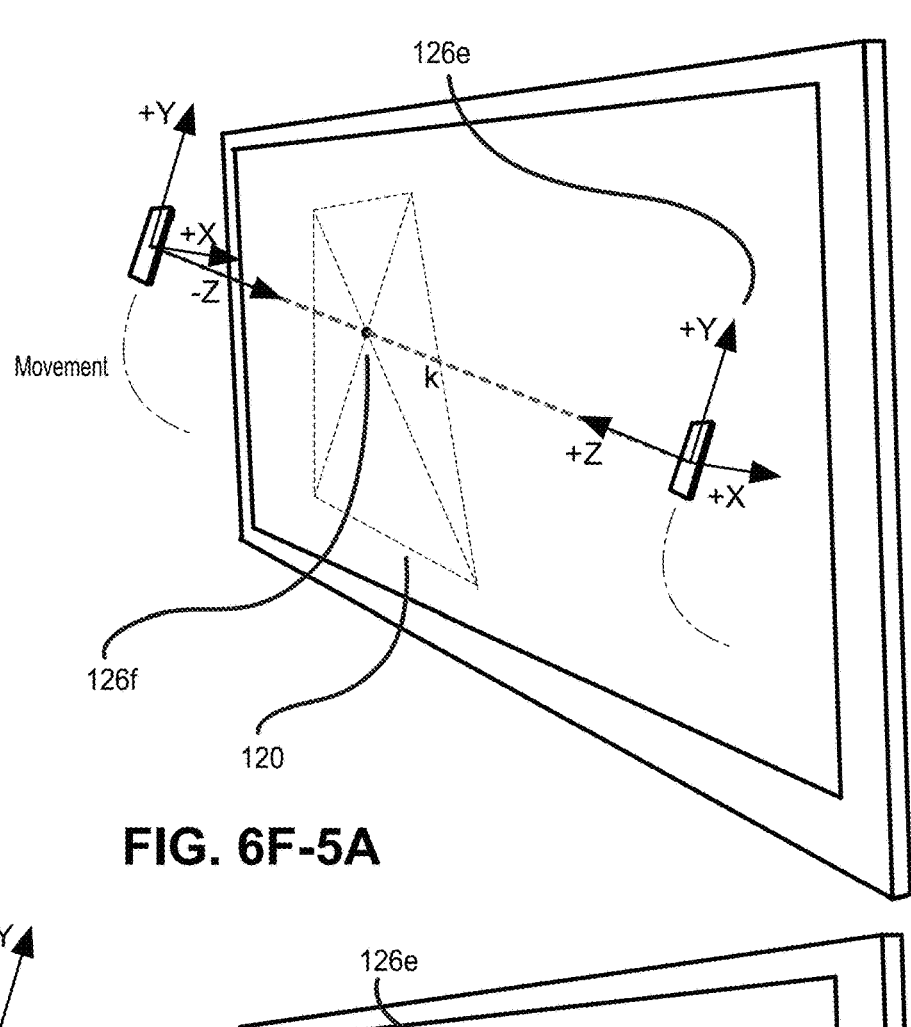
Figures 5B, 6F:
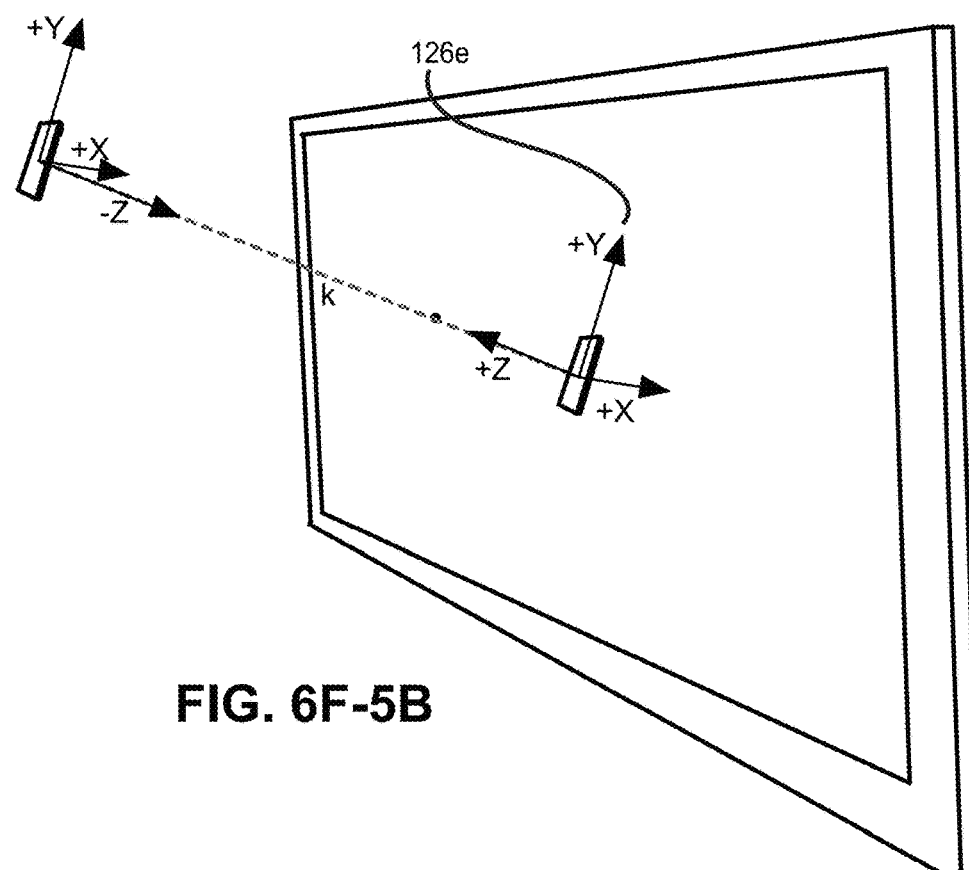
Figures 6A, 6F:
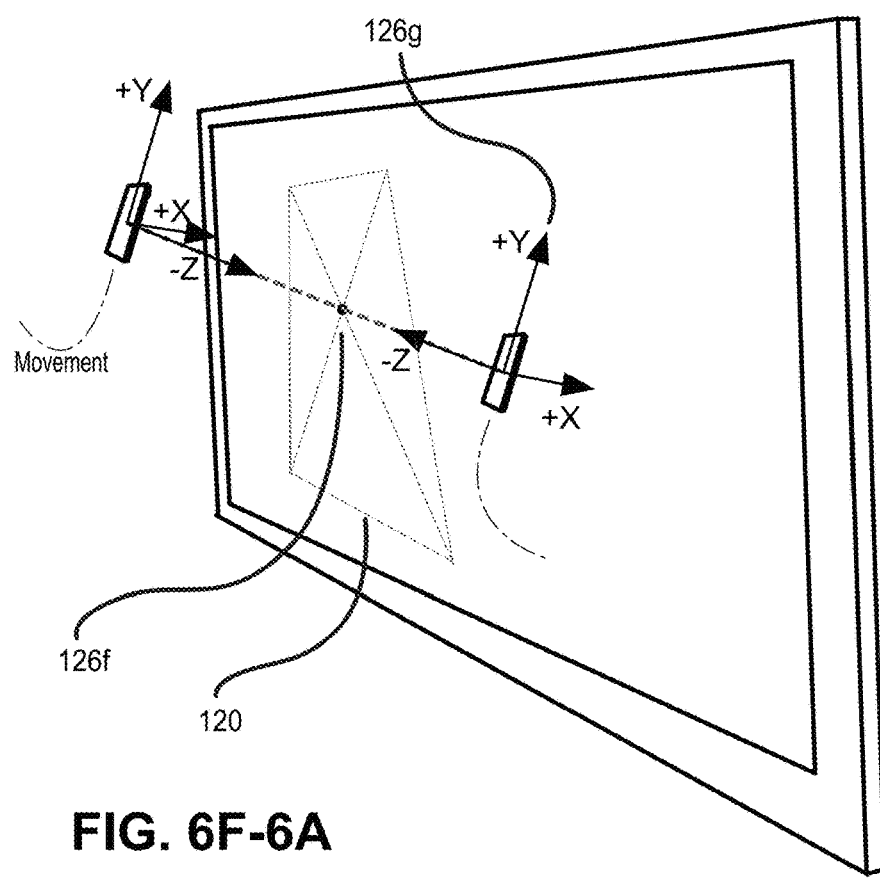
Figures 6B, 6F:
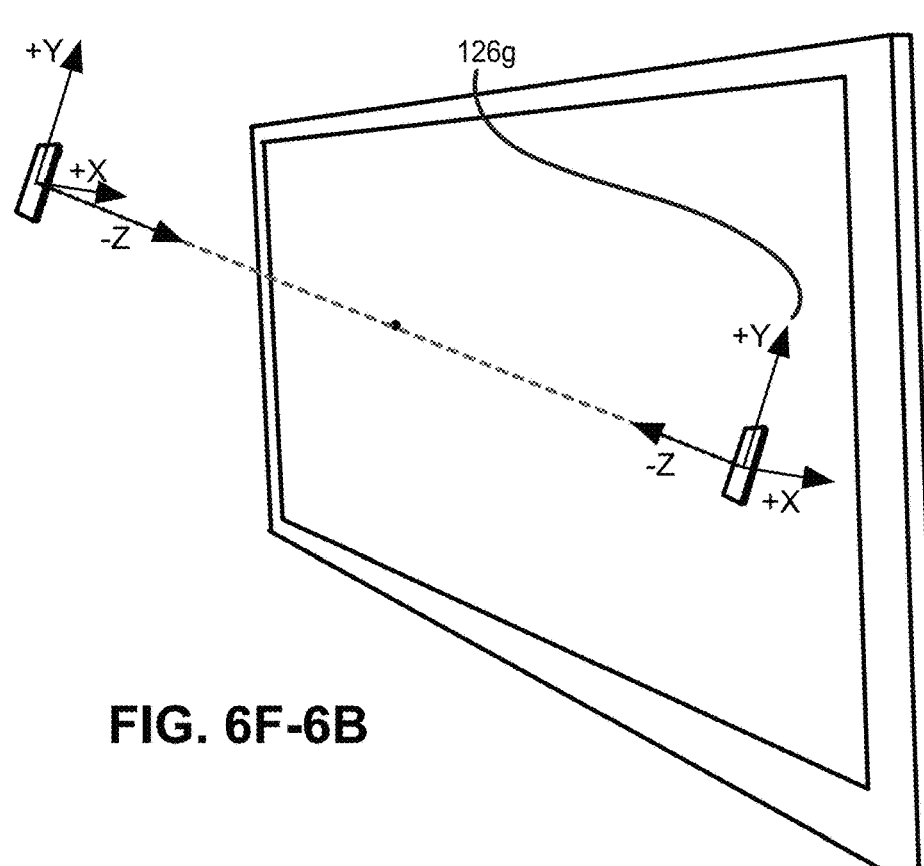

FIG. 6F-3 shows a non-limiting example of mimic transform 126c (e.g., corresponding to mimic transform 526e) where camera device movements are "mimicked" between the three-dimensional real world space and the device space. Mimic transform 126c may include camera transform, with a fixed translation (k) in ".trackingPlane" negative-Z so it is positioned in the scene on the side of the screen plane visible when a scene is rendered on a screen (e.g., to place a 6-DOF tennis racket that parallel's screen device real world position and orientation). FIG. 6F-4 shows a non-limiting example of mirror transform 126d (e.g., corresponding to mirror transform 526d) where camera device movements are "mirrored" between the three-dimensional real world space and the device space. Mirror transform 126d may include camera transform, reflected along ".trackingPlane" negative-Z across camera ortho XY origin, to mirror the movements of camera device so it is positioned in the scene on a side of screen plane that is visible when a scene is rendered on screen (e.g., to position screen device avatar model across TV plane, such that it may seem like the TV is a mirror reflecting the real screen device, as in mirrored coaching scenes).

FIGS. 6F-5a and 6F-5b show non-limiting examples of fixed grabber transform 126e (e.g., corresponding to fixed grabber transform 526c) that includes camera focus point 126f. Fixed grabber transform 126e may include camera transform, with a fixed translation (k) in camera transform own negative-Z, through camera focus XY origin, so it is positioned in a scene on a side of a screen plane visible when the scene is rendered on the screen (e.g., a first person pool game where user moves camera device to control a pool cue whose one end coincides with camera device real-world position and orientation, and whose other end is a fixed distance away in a 3D scene).

FIGS. 6F-6a and 6F-6b show non-limiting examples of mirrored grabber transform 126g (e.g., corresponding to mirrored grabber transform 526b) that includes camera focus point 126f. Mirrored grabber transform 126 may include camera transform, reflected along its own negative-Z across camera focus XY origin, such that camera focus XY origin is a midpoint of a line segment connecting camera transform origin and its own, so it is positioned in a scene on a side of screen plane that is visible when a scene is rendered on the screen (e.g., to place an object in a 3D scene such that it is at an end of a virtual, variable-length stick (or grabber) attached to the camera device—a distance from the camera device to screen is equal to a distance from origin of this transform, to screen). It should be appreciated that each of these transforms may be in a three-dimensional coordinate frame in the ".trackingPlane" coordinate space.

Figures 1, 6G:
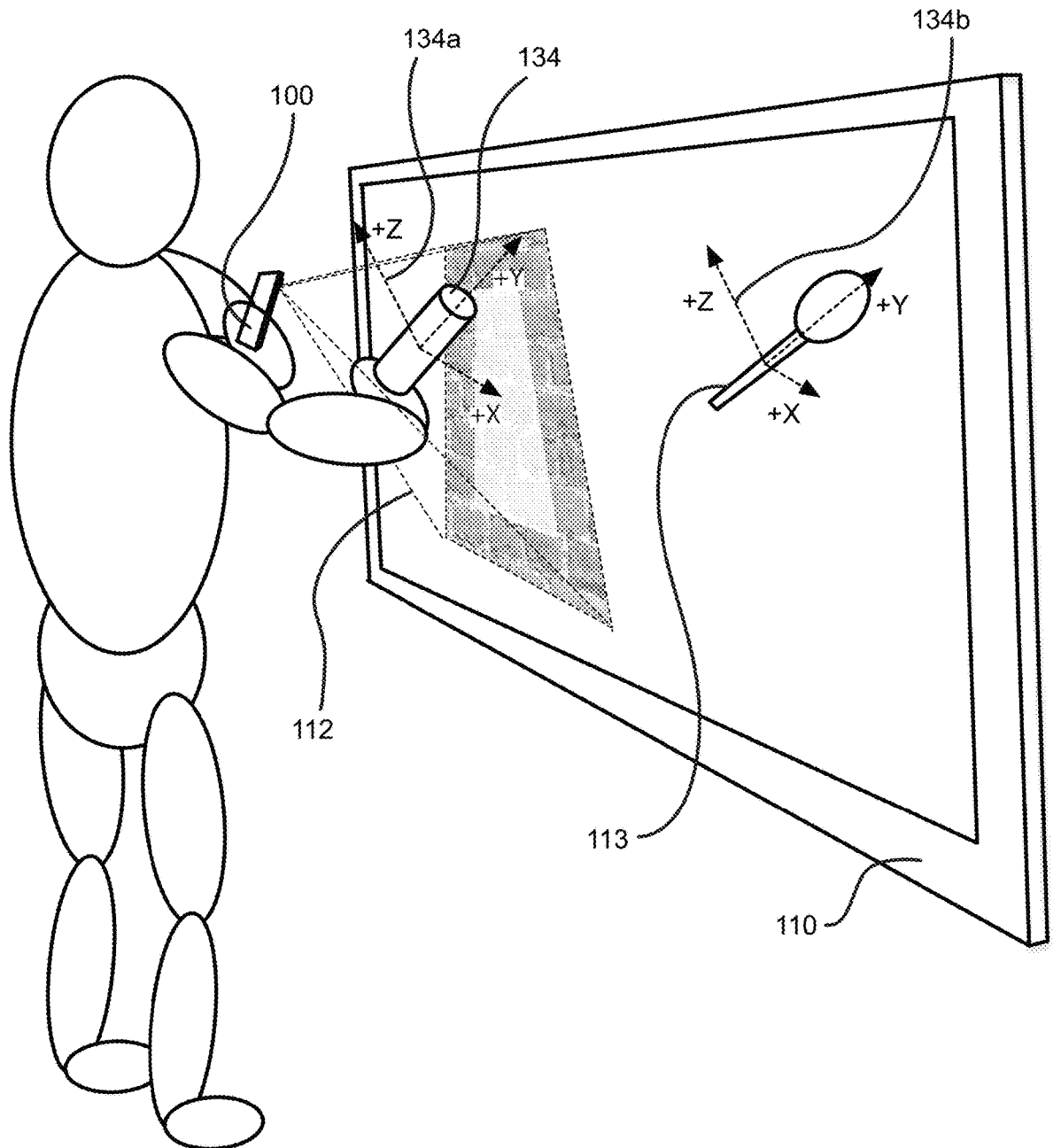
Figures 2, 6G:
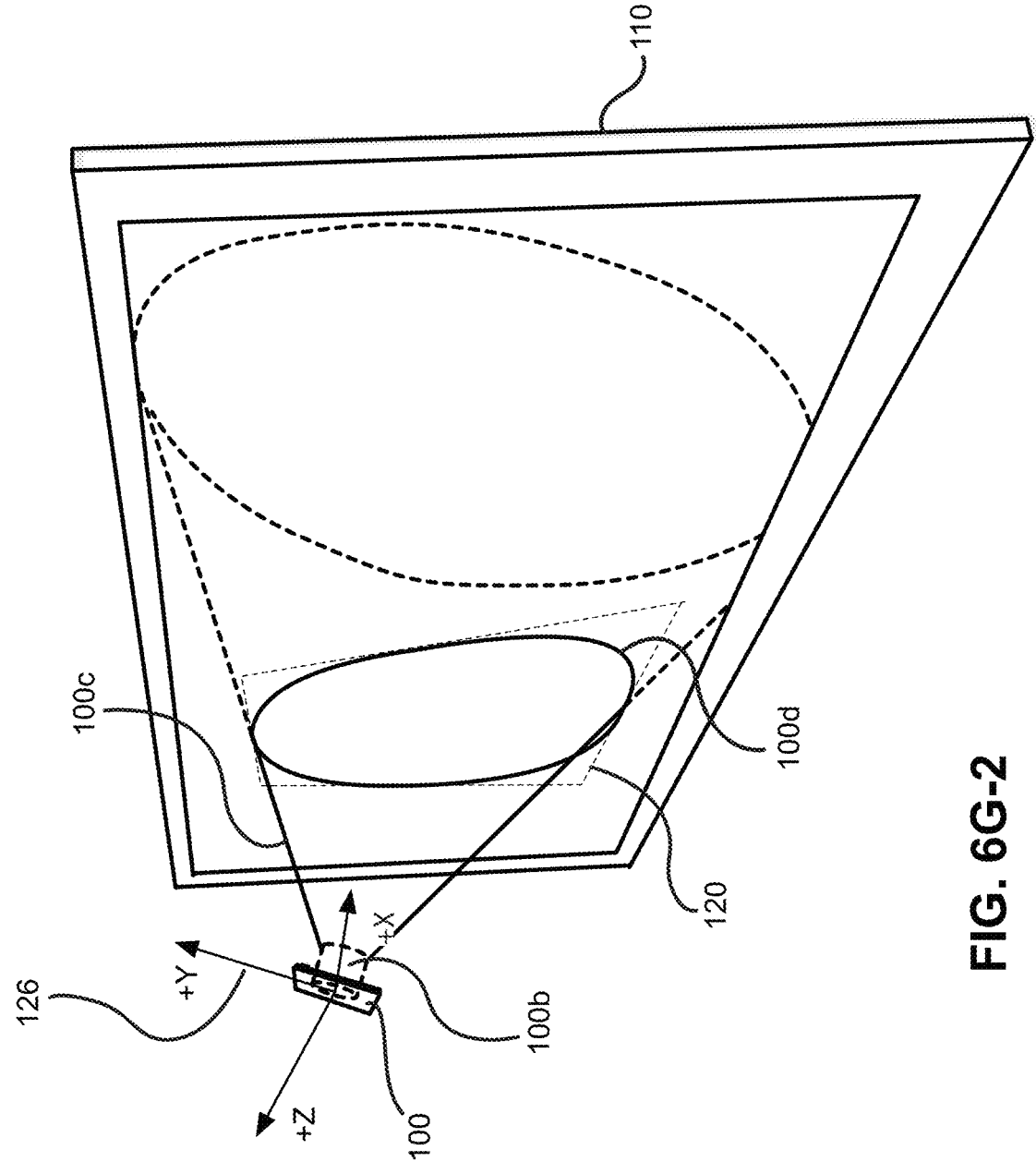

FIGS. 6G-1 and 6G-2 show non-limiting example illustrations of other aspects associated with processing and output of engine 200. FIG. 6G-1 specifically depicts an illustration of how a recognized object may be reflected on display 110. In the example of FIG. 6G-1, the user is holding camera 100 in one hand, while holding a recognizable object 134 (e.g., banana, wand) in another hand where camera 100 can view (e.g., via truncated pyramid of vision 112) and capture an image of object 134. The recognizable object 134 may be recognizable because it was scanned previously by engine 200. The recognizable object 134 may include an object transform 134a indicating the object's transform value in the three-dimensional space where the resultant output will be recognizable object mimic transform 134b. That is, recognizable object mimic transform 134b could include the corresponding "mimic transform" (discussed herein) of the object 134 based on object transform 134a. The resultant output can be reflected as avatar 113 where avatar 113 may move based on movement of object 134 in free space. It should be appreciated that avatar 113 could be a real or virtual representation of actual object 134. Likewise, avatar 113 could be a representation of an entirely different object than that of object 134 (e.g., a space ship).

FIG. 6G-2 shows a non-limiting example illustration of camera spotlight 100b, a virtual three-dimensional object, output by engine 200, that acts as a spotlight in a three-dimensional scene rendered on display 110. In the example of FIG. 6G-2, the spotlight has a position and orientation that coincides with camera 100's transform, and would directionally cast light and illuminate various virtual objects that would also occur in the same three dimensional scene, rendered on display 110. The displayed spotlight may track movement of camera 100 based on camera transform 126. Camera spotlight 100b can "cast light" toward display 110 which may be contained within the volume represented by the three-dimensional spotlight cone 100c where spotlight intersection 100d represents an elliptical intersection of spotlight cone 100c and a screen plane. The spotlight cone 100c may be a three-dimensional cone that extends infinitely in the three-dimensional scene rendered on the display.

Figures 1, 6H:
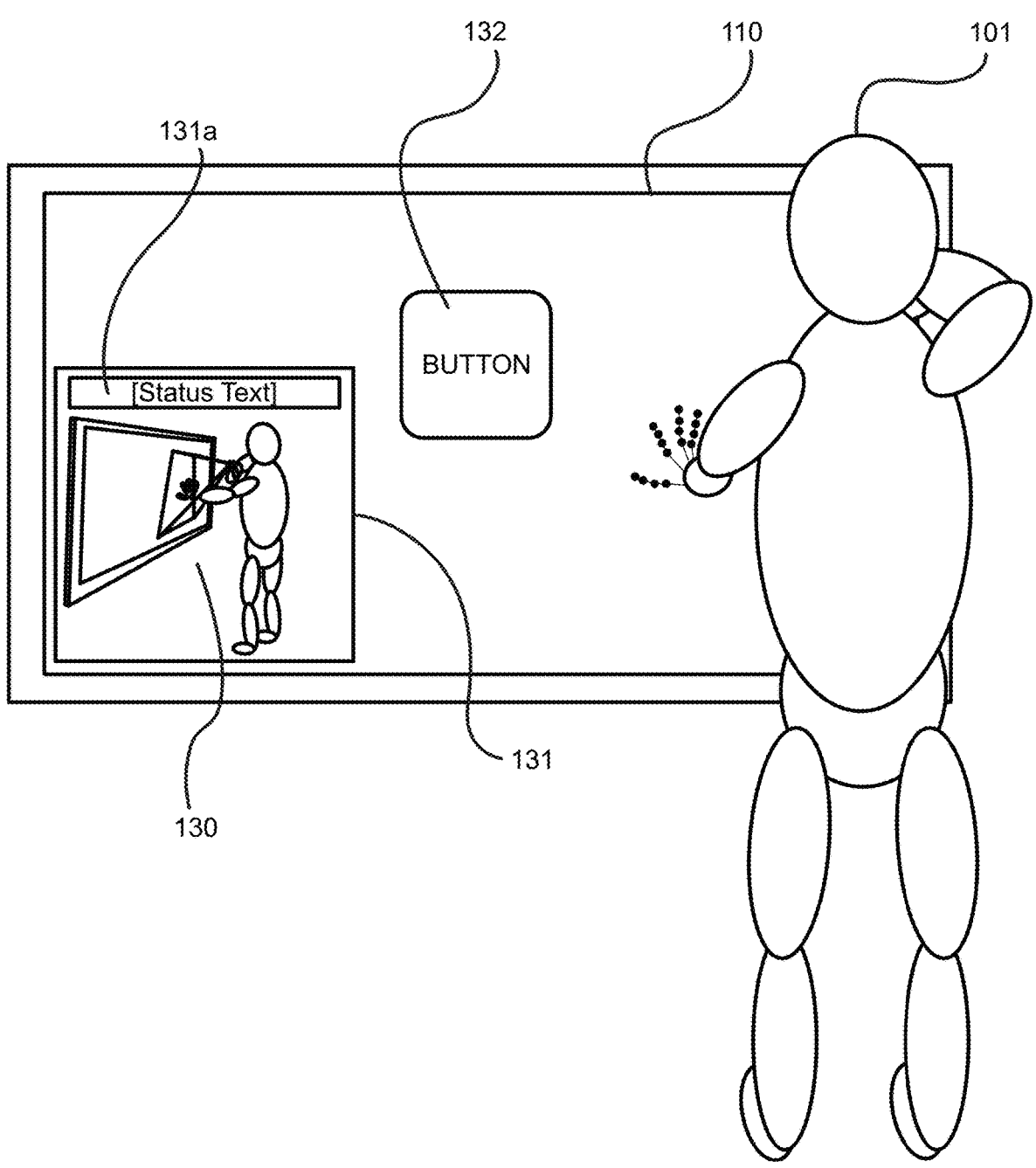
Figures 2, 6H:
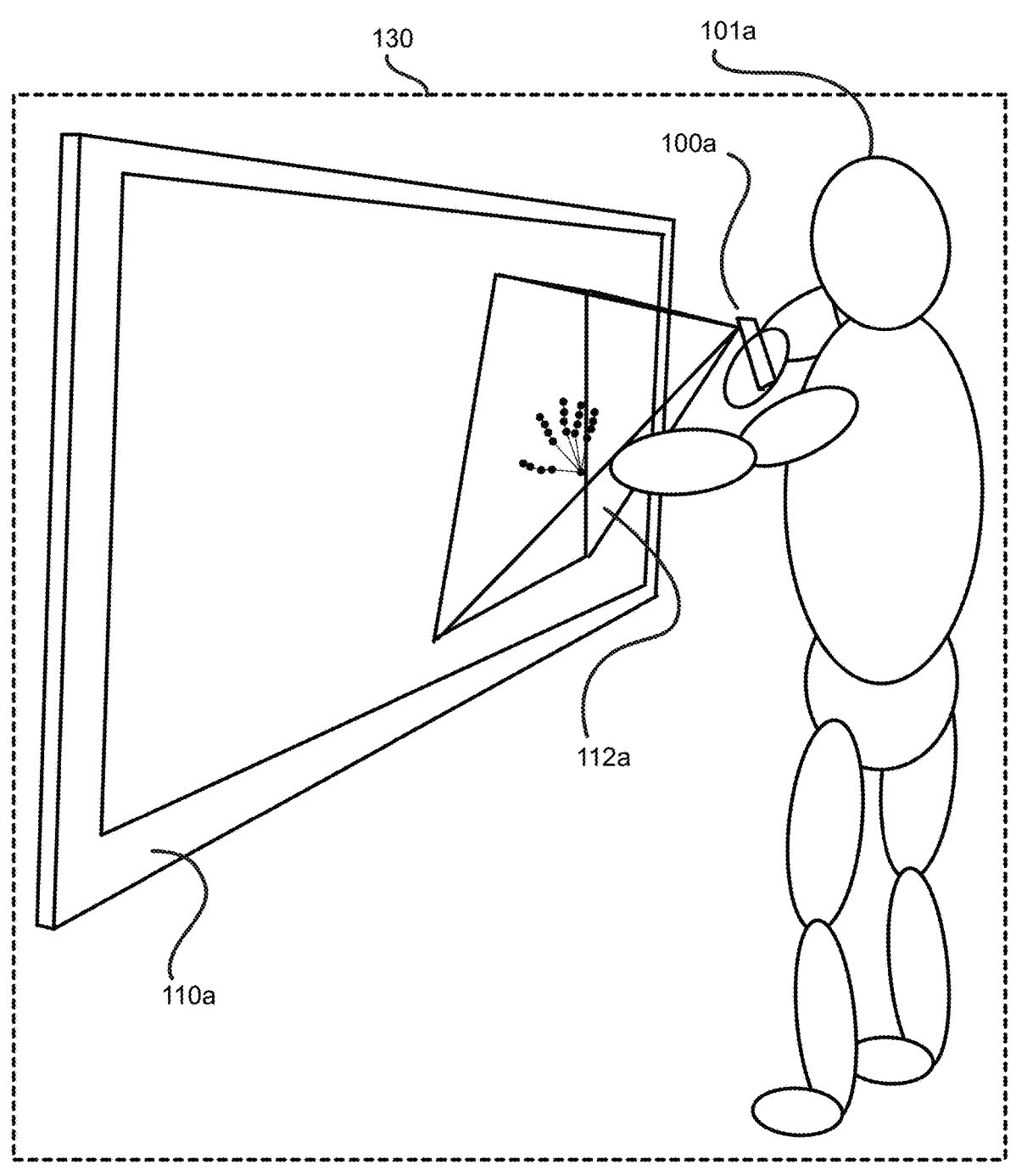
Figures 3, 6H:
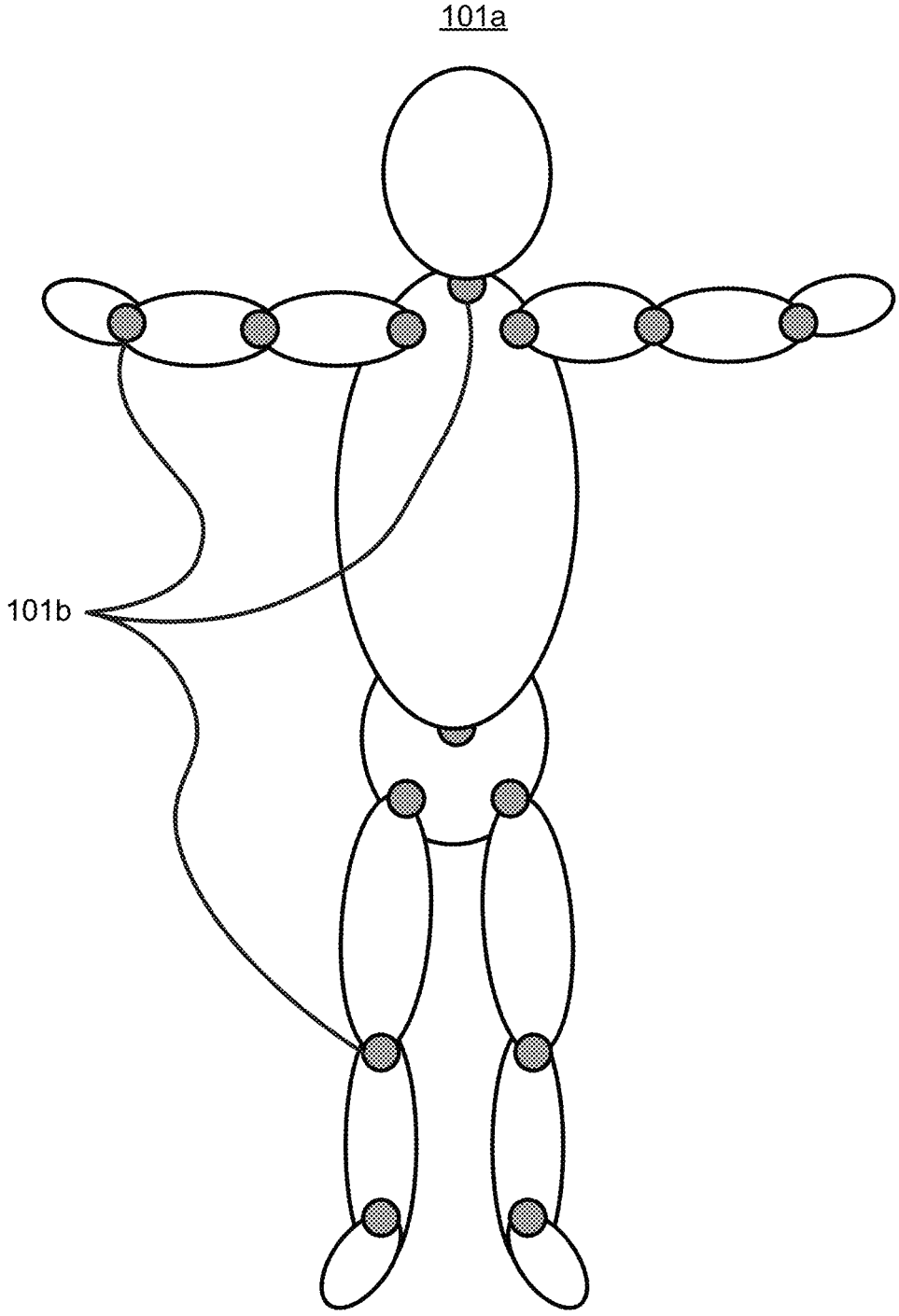
Figures 4, 6H:
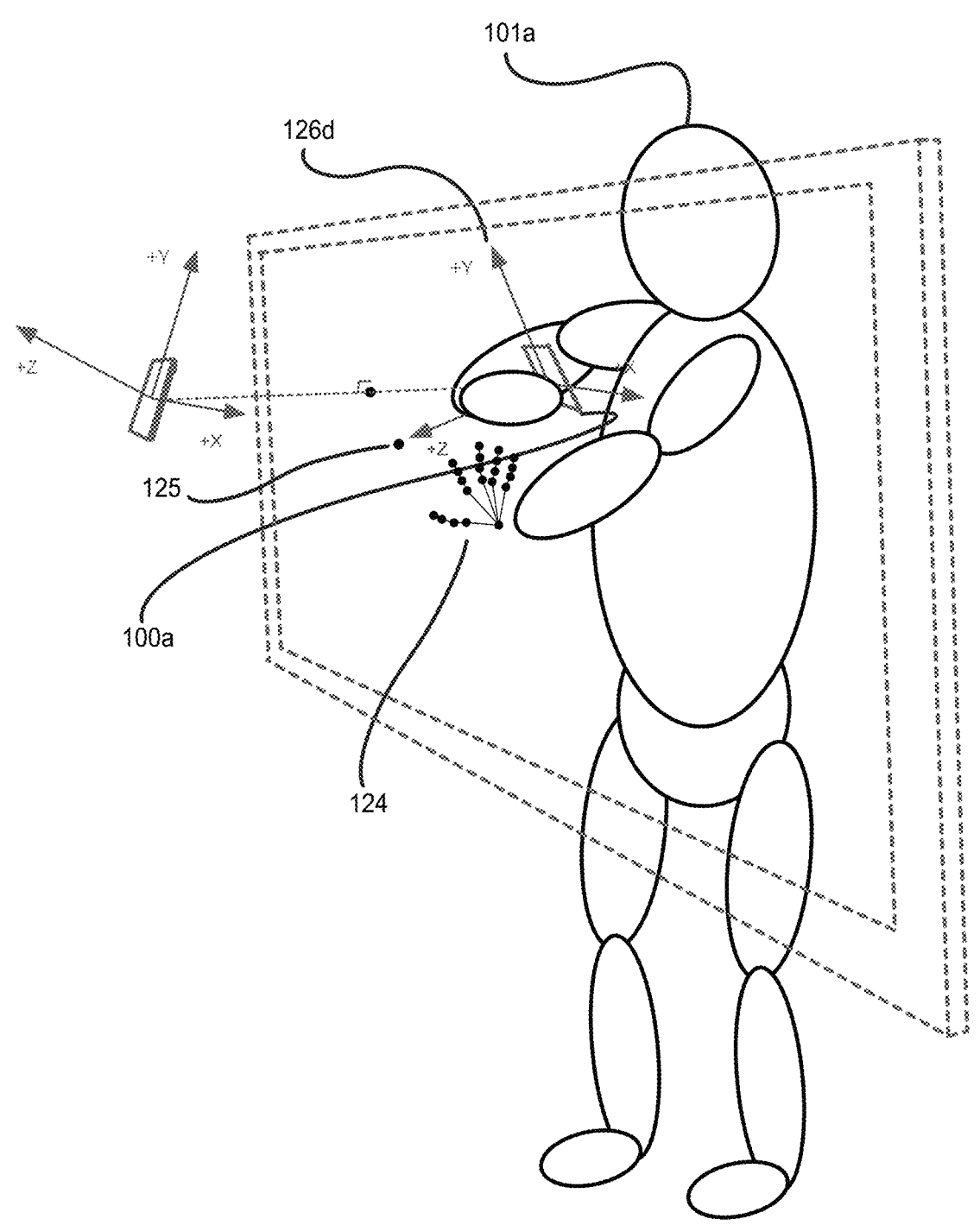
Figures 5, 6H:
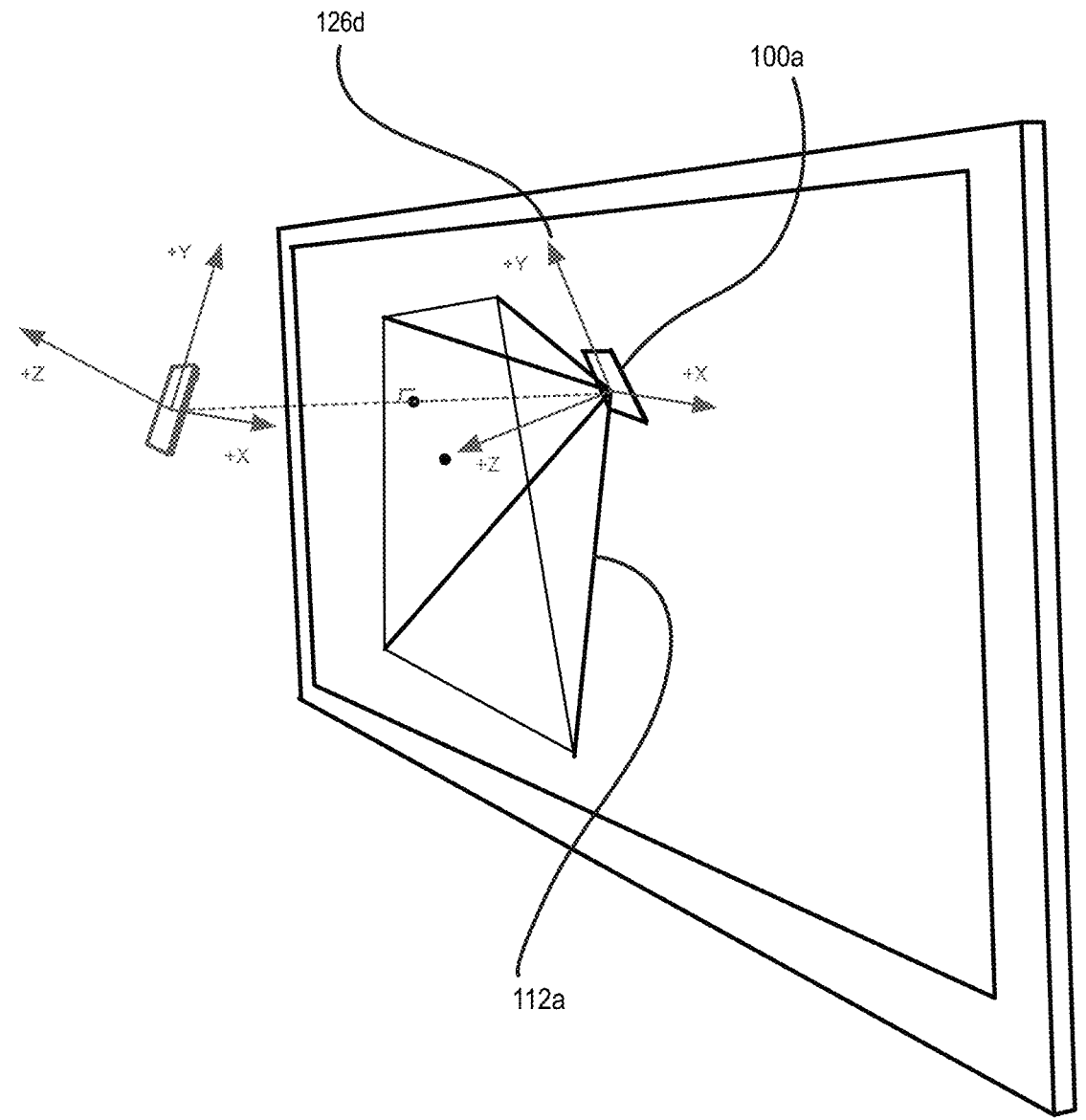
Figures 6, 6H:
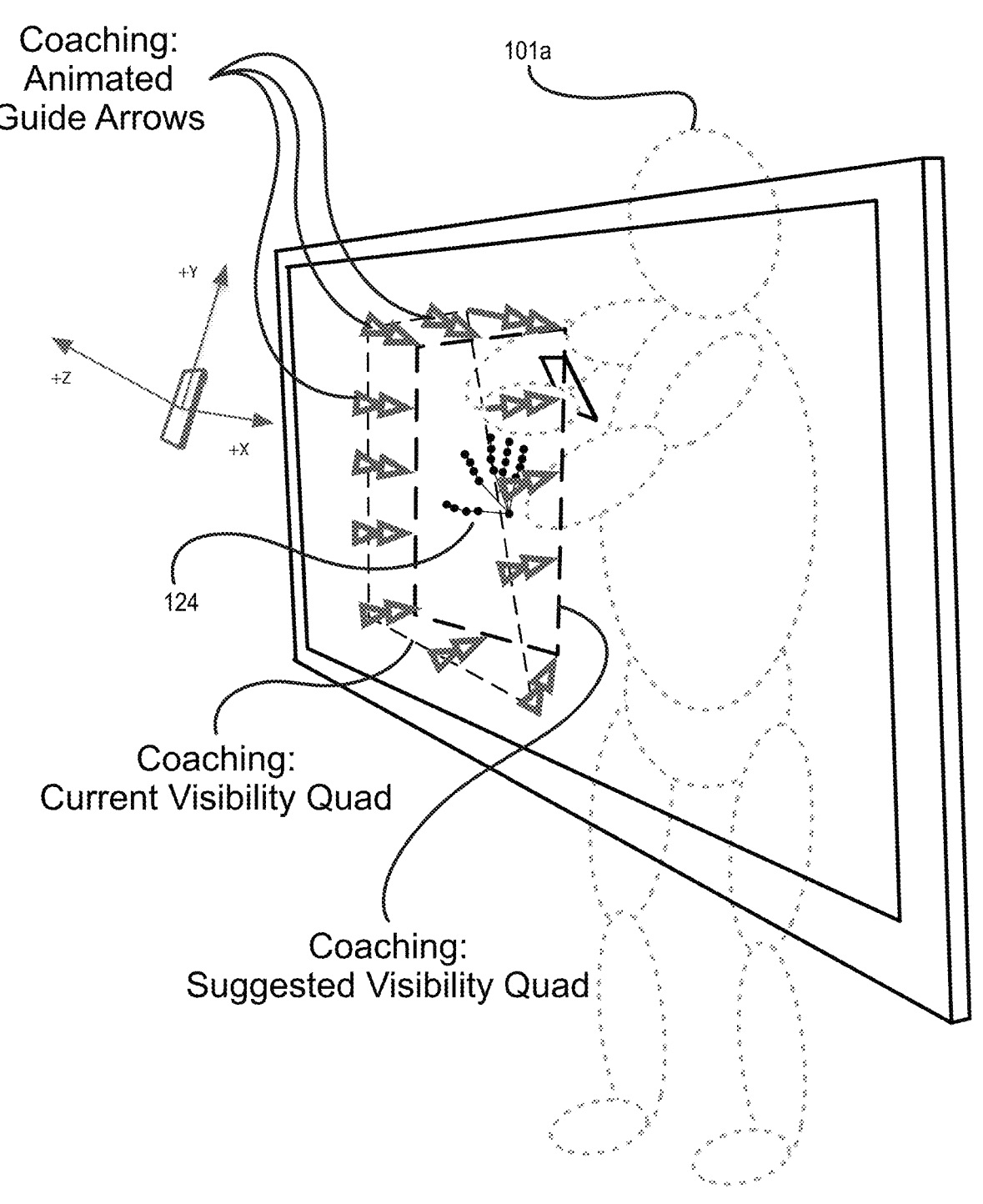

FIGS. 6H-1 to 6H-6 show non-limiting example illustrations associated with generated a third person interaction three-dimensional scene view (e.g., as discussed with respect to the items of FIG. 5L). In the example shown in FIG. 6H-1, a user 101 viewing screen 110 is depicted in a third person interaction 130 scene. In one example embodiment, the screen 110 may display application specific visuals 132 (e.g., button) along with system status UI 131 and system status text 131a.

FIG. 6H-2 shows a further illustration of third person interaction 130 where articulated IK user 101a is displayed as a posed avatar model along with camera device avatar model 100a. Third person interaction 130 includes pyramid of vision model 112a (e.g., corresponding to real world pyramid of vision 112) along with screen device avatar model 110a (e.g., corresponding to real world display device 110). Third person interaction 130 can include a three-dimensional scene (in the ".screen" coordinate space) depicting interaction of any of an articulated IK humanoid user avatar model, a camera device avatar model, a screen device avatar model, a truncated pyramid of vision model, HUD elements, articulated hand skeleton (or an object derived therefrom), hand shadow image and/or additional background objects. Camera device avatar model 100a includes a three-dimensional model of camera device 100

(in the ".trackingPlane" coordinate space) and can depict the real-world position and orientation of the camera device relative to other objects in the third person simulation scene. Articulated IK user 101*a* can be a three-dimensional model (in the ".trackingPlane" coordinate space) of user 101 that can include an articulated and rigged motion capture 3D model, resembling a figure of a person (e.g., holding camera device 100 and interacting with display 110). User 101*a* may depict a user 101 orientation and positioned relative to display 110 and have joint (shown as example joints 101*b* in FIG. 6H-3) angles computed such that it depicts an approximation of a user's likely body pose. User 101*a* can use as inputs camera device position and orientation (as well as articulated hand skeleton or stylus position and integrating application mode) to compute position, orientation, and pose using inverse kinematics.

Screen device avatar model 110*a* can include a three-dimensional model (in the ".trackingPlane" coordinate space) representing display 110. Model 110*a* may depict a real-world position and orientation of the screen device relative to other objects in a third person simulation scene. Truncated pyramid of vision model 112*a* may include a three-dimensional model (in the ".trackingPlane" coordinate space) of a 3D geometry of a top part of a pyramid of vision, truncated by screen, for use in 3D scenes. The pyramid of vision can represent a volume of space visible by camera device.

FIG. 6H-4 shows a non-limiting example illustration of a full screen mirrored interaction 3D scene. In the example of FIG. 6H-4, user 101*a* and other various components (e.g., camera device) depicted a mirrored version of movements associated with the corresponding real world objected (e.g., using "mirror transform"). FIG. 6H-5 similarly shows a non-limiting example illustration of a mirrored camera device model 100*a* including a mirrored pyramid of vision 112*a* (e.g., using "mirror transform" in a manner similarly depicted in FIG. 6H-4). FIG. 6H-6 shows a further non-limiting example illustration of an example mirrored coaching scene for user 101*a* where the system 1 is resolving engine state ".handInFramePartially." In the example of FIG. 6H-6 various coaching visuals are depicted to aid the user in properly positioning a hand within a viewable frame of the camera, using the third person interaction 130 interface.

Figure 7:
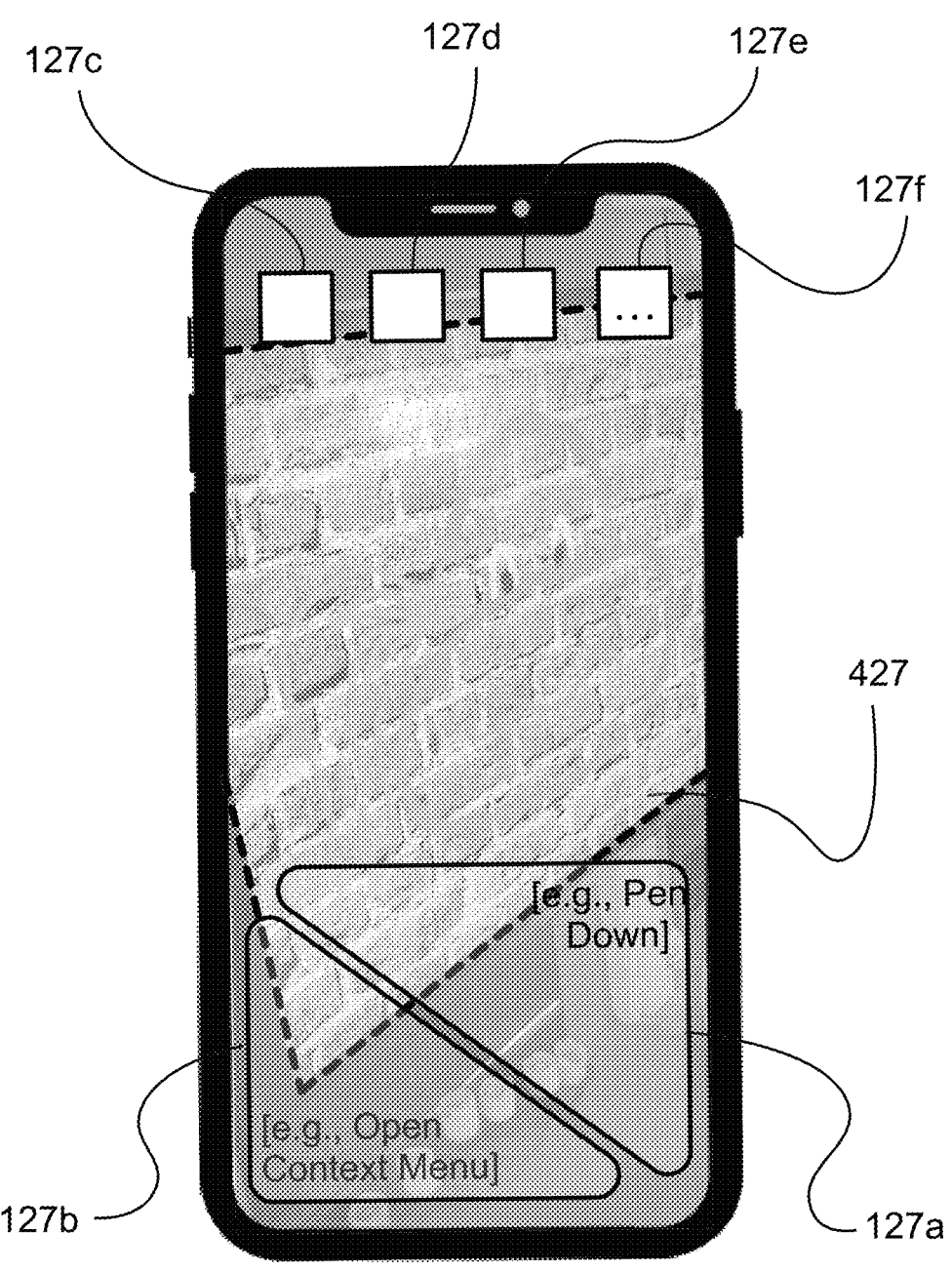
FIG. 7 shows a non-limiting example diagram of an example user interface.

FIG. 7 shows a non-limiting example illustration of camera view UI 127 (e.g., corresponding to camera view UI 428). In the example of FIG. 7, camera view UI 127 includes various user interface elements including buttons 127*a-f*. In one example embodiment, camera view UI 127 may be shown while a three-dimensional mixed reality scene is being viewed where tracking image alignment quad 427 indicates the alignment with tracking image as it is viewed in a camera feed. Camera view UI could include any configuration and the example shown in FIG. 7 is non-limiting. For example buttons 127*a* and 127*b* may be replaced with a single touch tracking area where an X-Y position on the screen can be controlled based on user input to the single touch tracking area.

Buttons 127*a* and 127*b* may include a primary action button and secondary action button allowing a user to perform corresponding actions associated with an application running engine 200. Likewise, buttons 127*c-f* could include other various operation buttons including, but not limited to, refresh tracking, open settings, open help, and/or any application specific features.

A non-limiting example of a HUD generated by engine 200 for display in a 2-D integrating application may include, from back to front, full-screen tracking image 111, visuals specific to integrating app, front composited shadow plane 121, partial tracking image 111*a*, index tip cursor 124*i*, third person interaction 130 scene.

Figure 8A:
Figure 1:
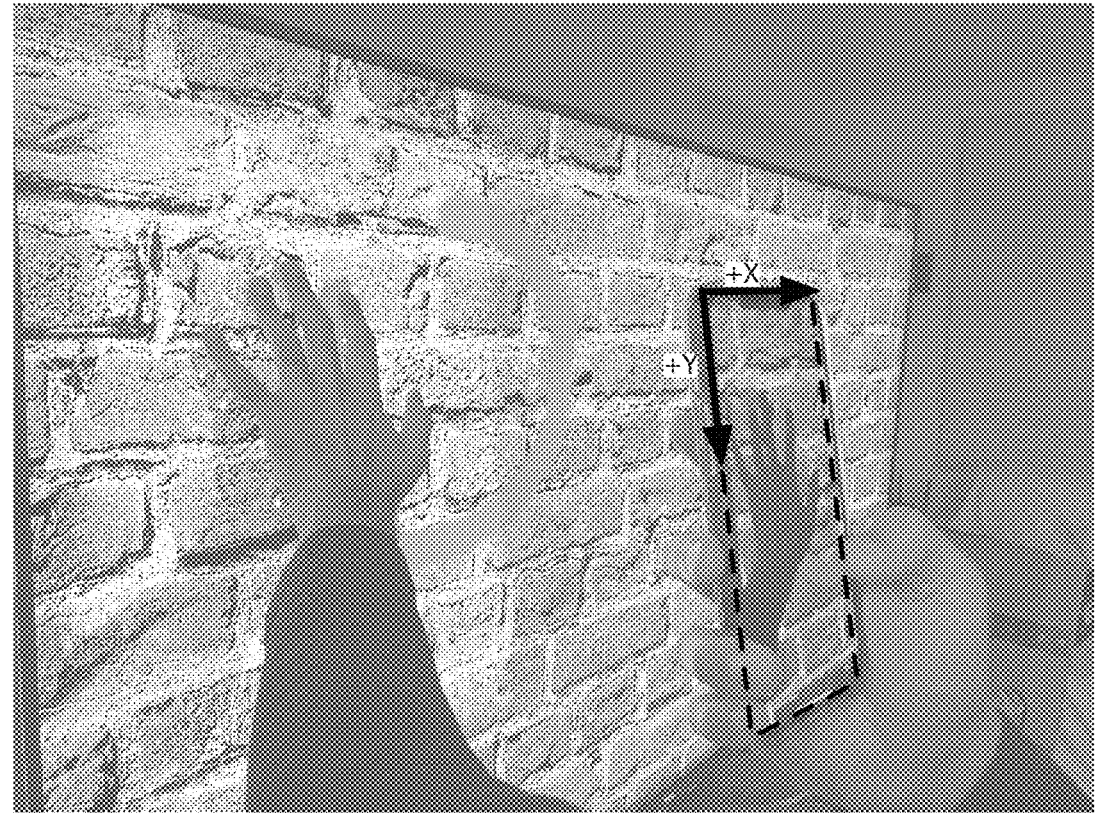
Figure 8A:
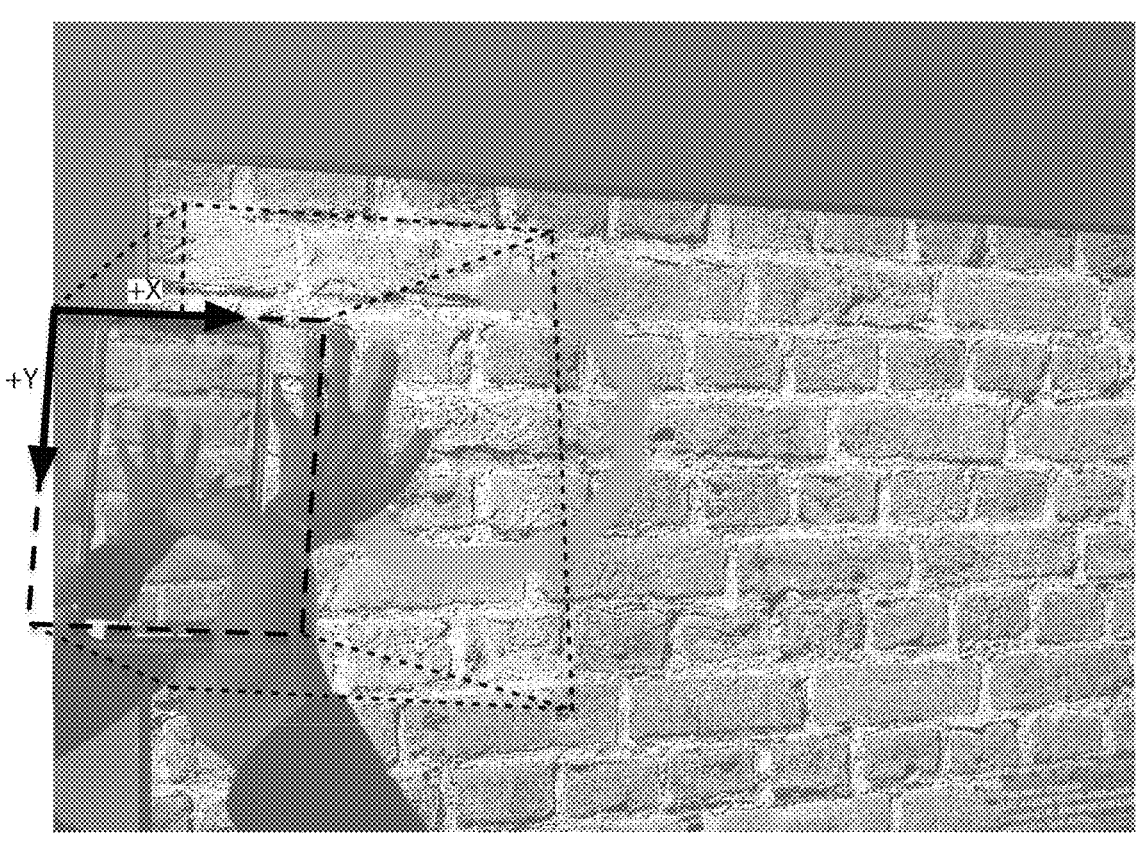
Figure 2:
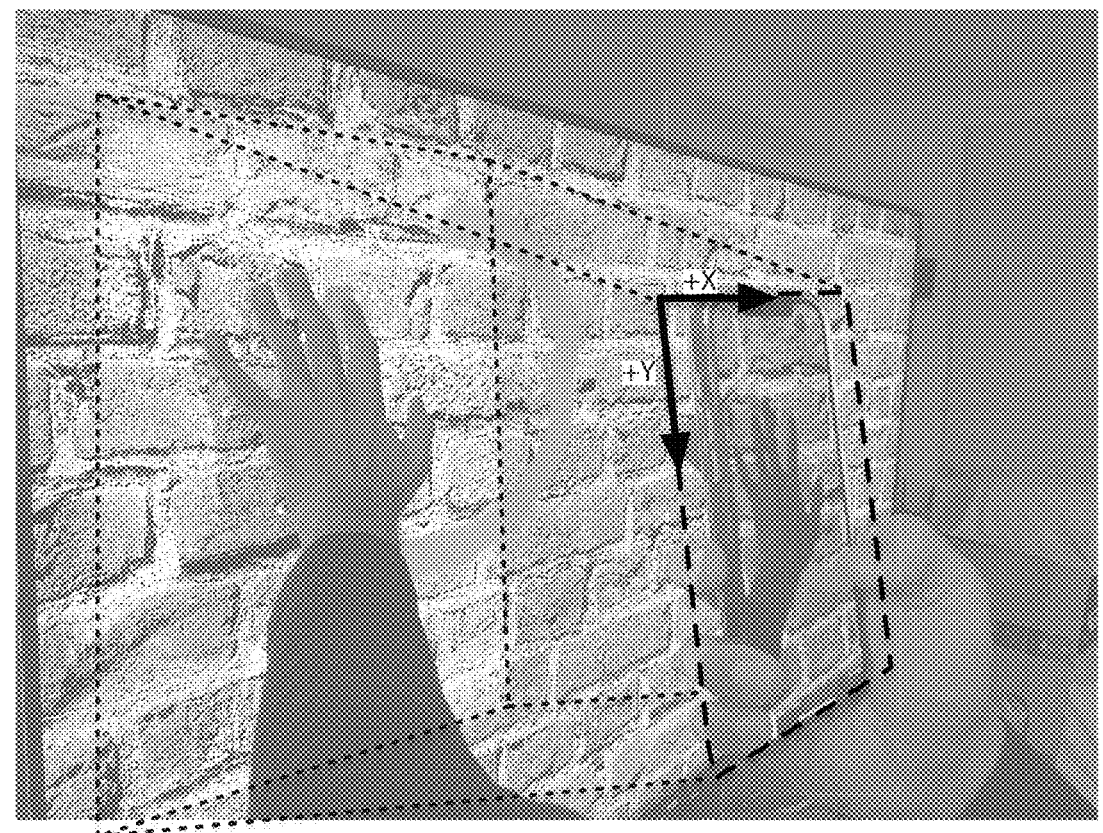
Figure 8A:
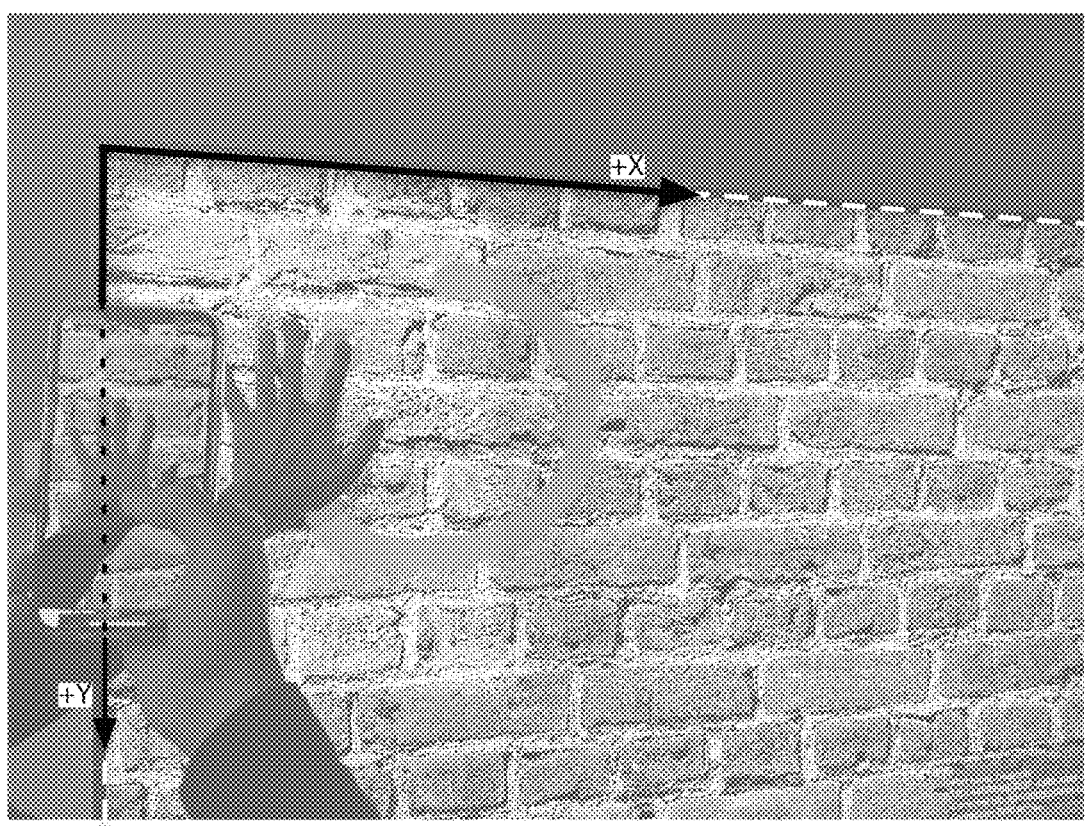
Figure 3:
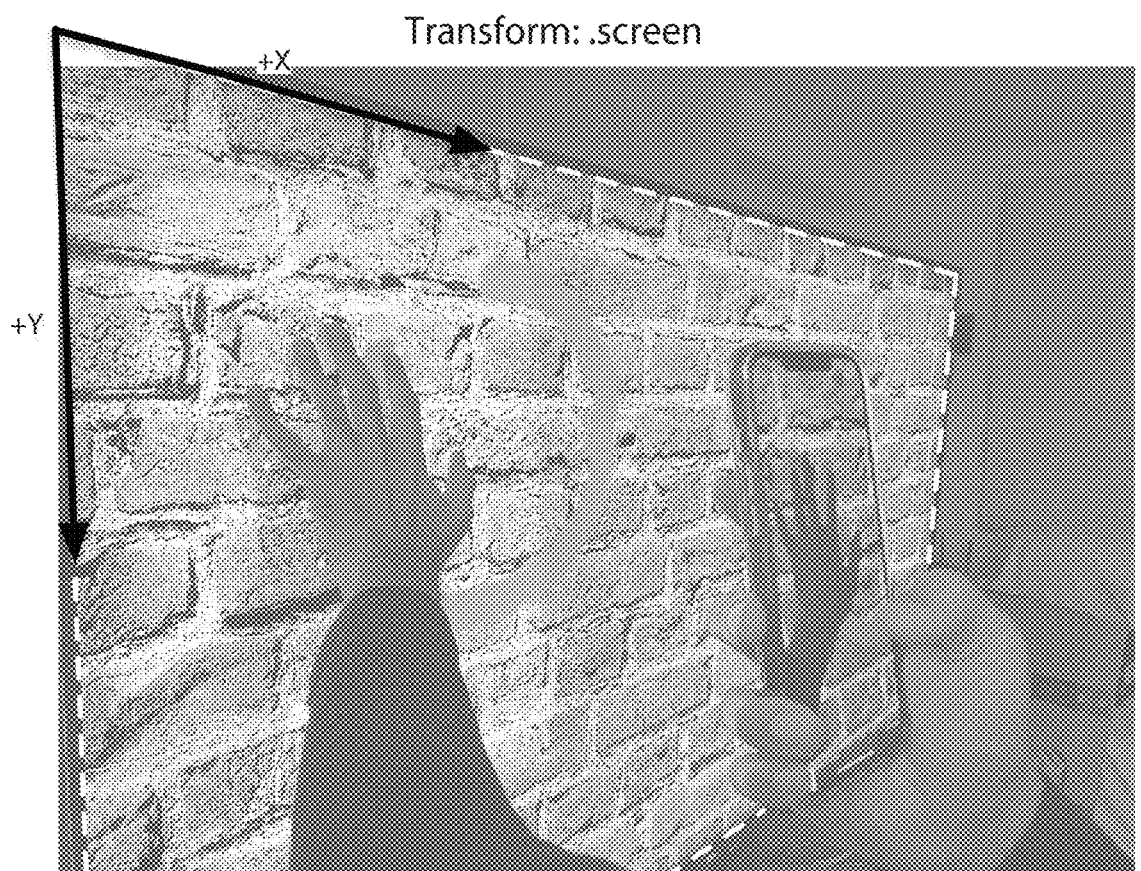
Figure 8A:
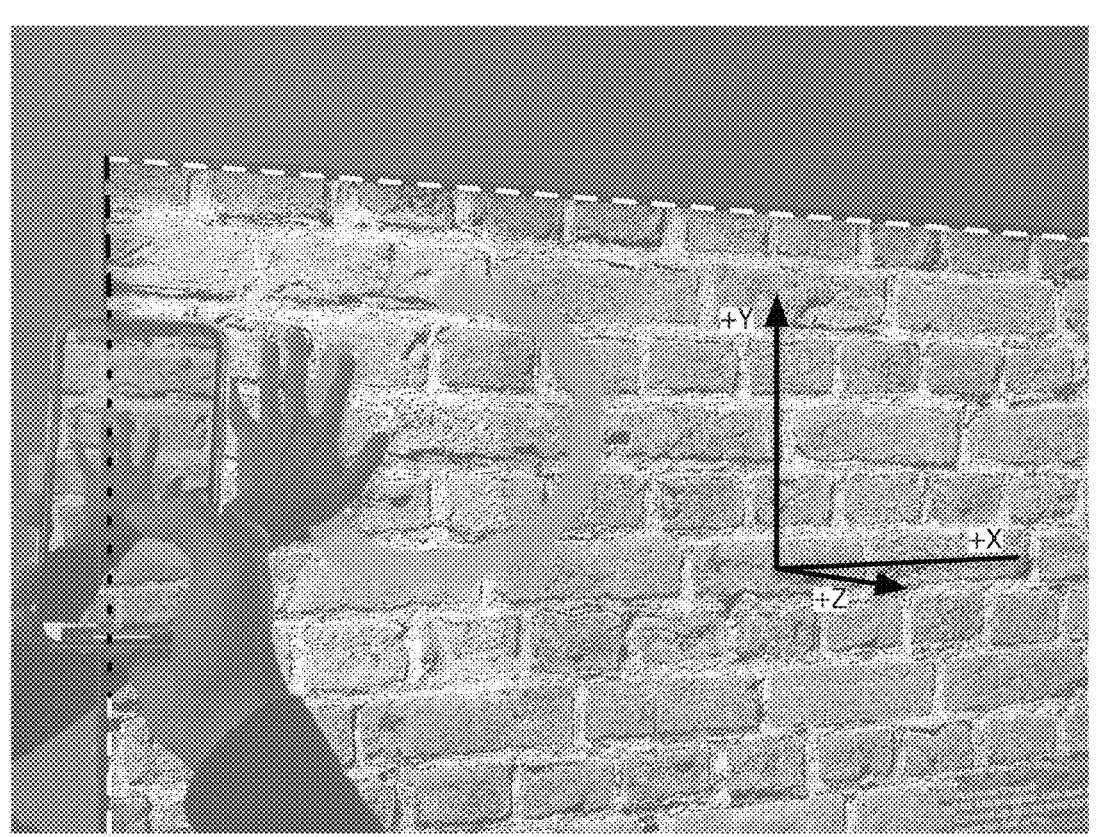
Figure 4:
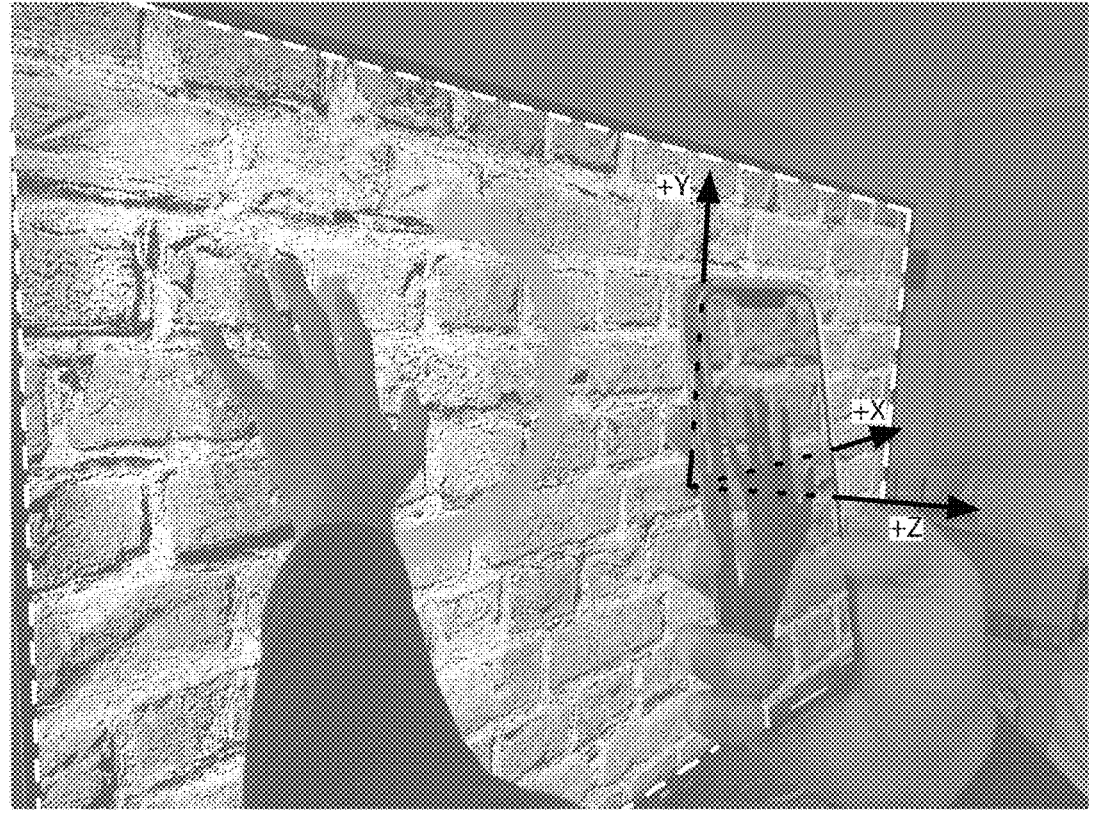
Figure 8A:
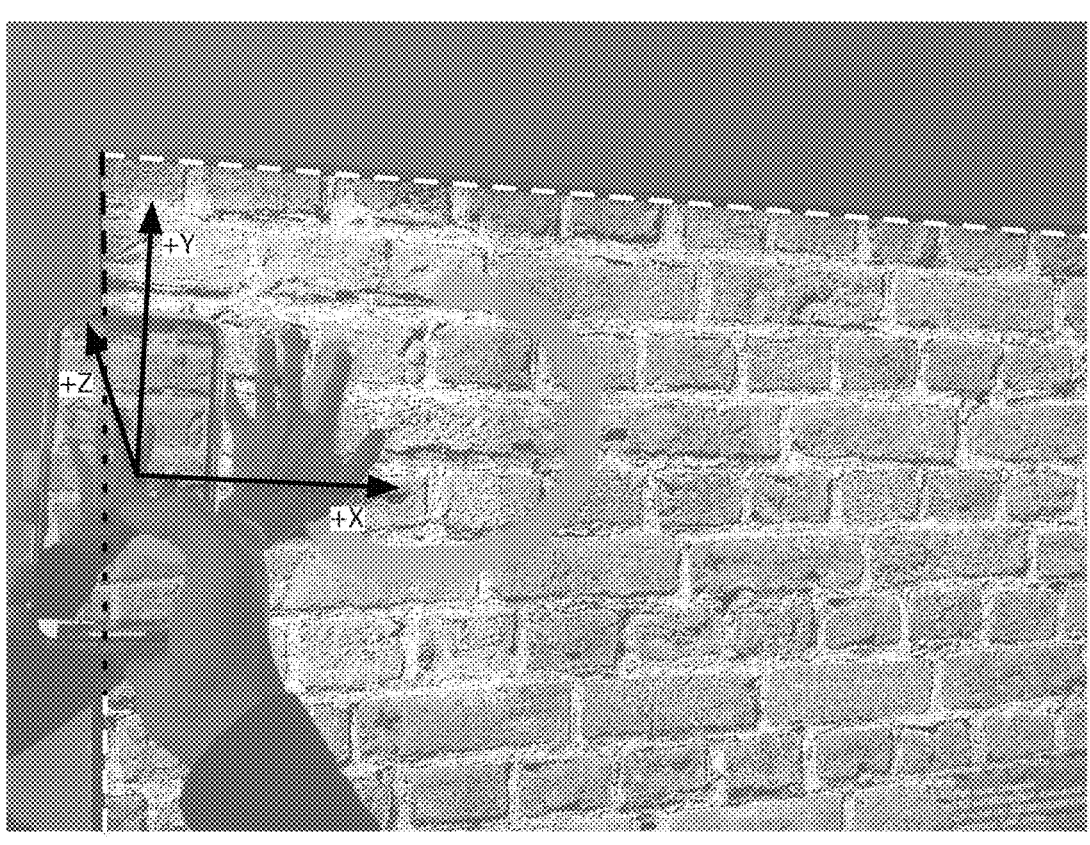
Figure 5:
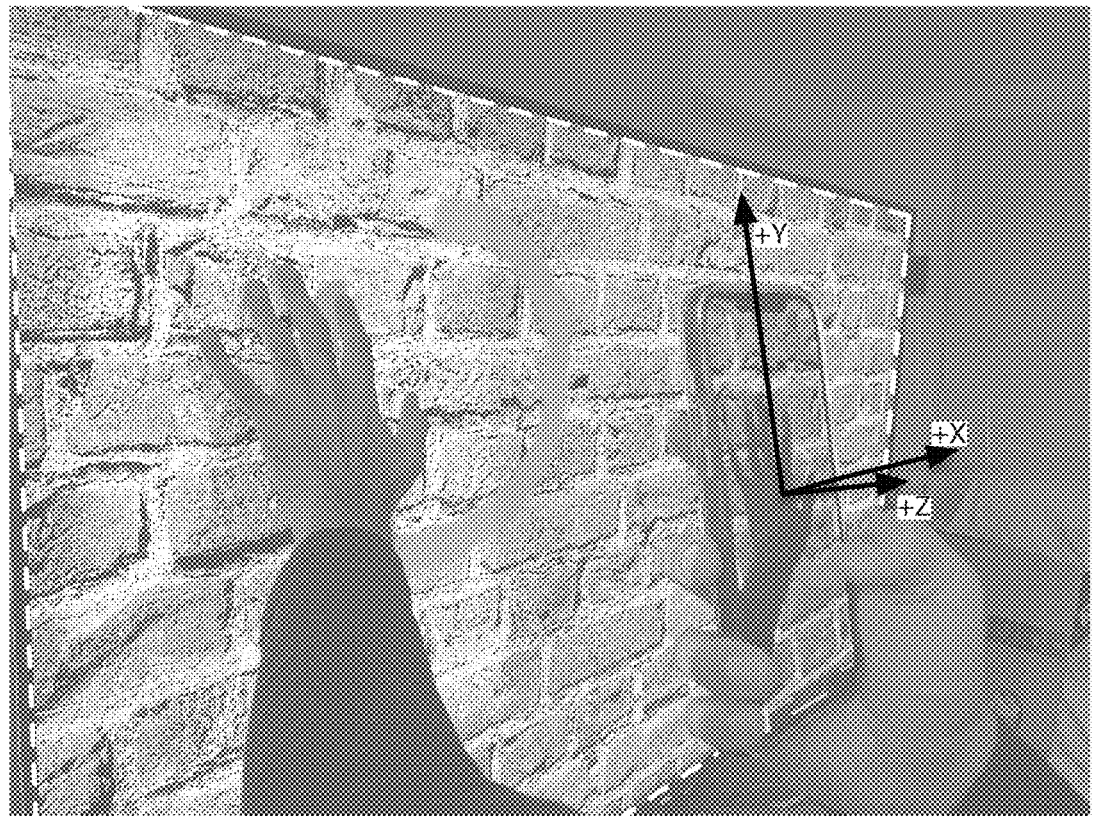
Figures 1, 8B:
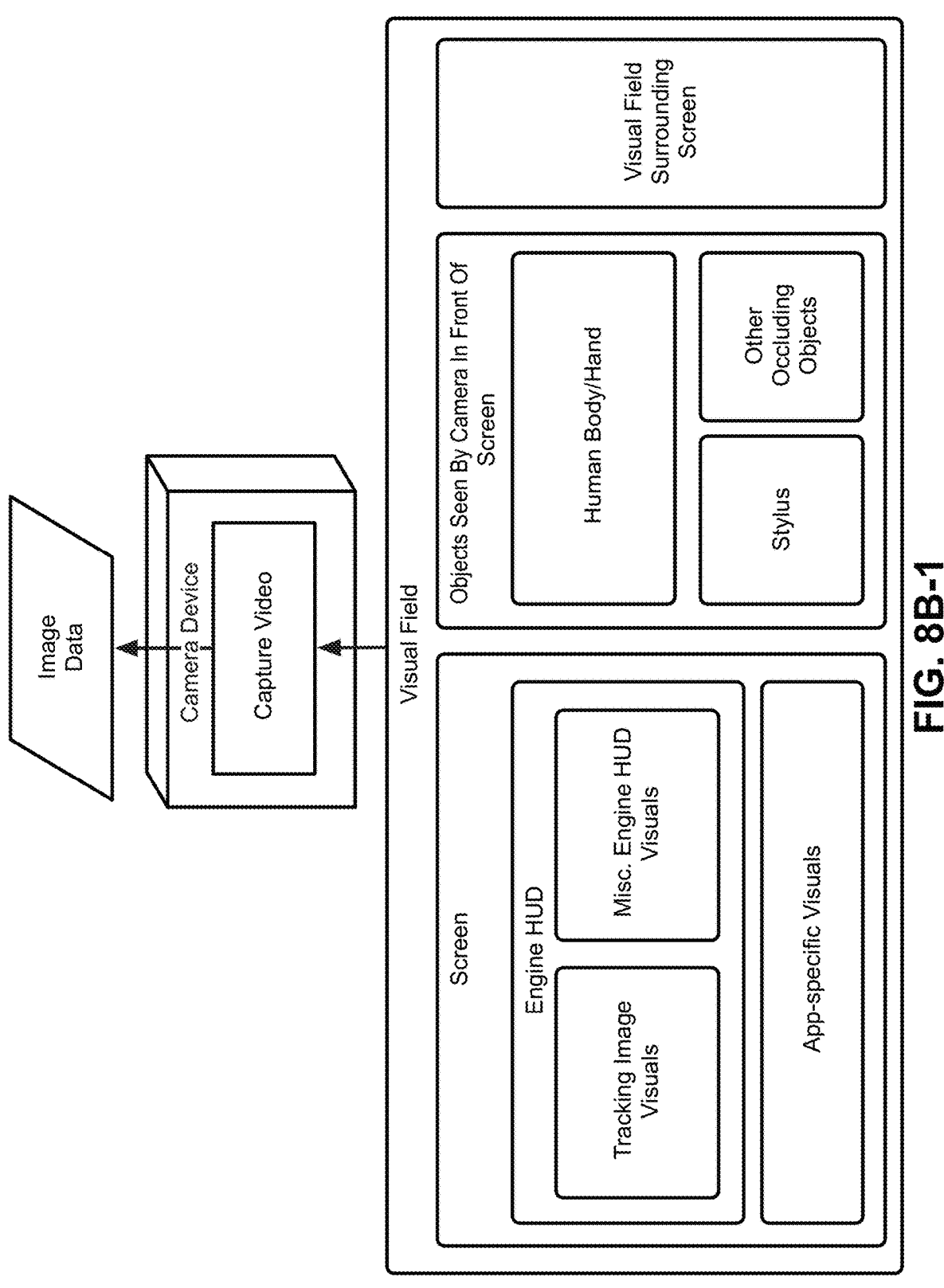

FIGS. 8A-1 to 8A-5 show illustrations of the different coordinate spaces (and associated transformations) discussed herein. FIGS. 8B-1 to 8B-3 show non-limiting examples of visual fields and associated visual field example breakdowns (as discussed herein). FIG. 8B-1 specifically shows a non-limiting example block diagram of a visual field associated with camera 100 and display 110 in various processing of engine 200. FIGS. 8B-2 and 8B-3 show an example full visual field, a visual field surrounding screen, a human body/hand in the visual field, various occluding objects, application-specific visuals, and/or tracking image visuals.

Figure 9:
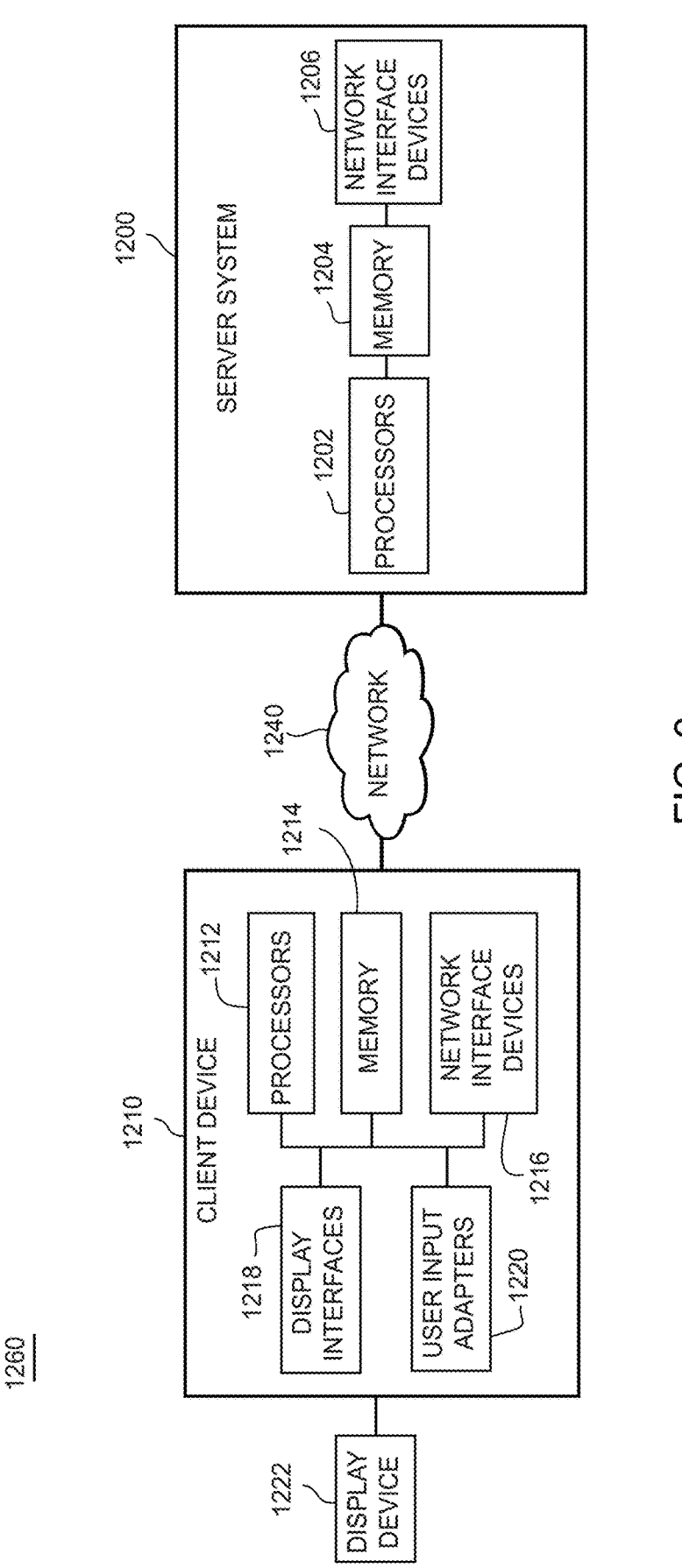
FIG. 9 shows a non-limiting example block diagram of hardware components associated with the system.

FIG. 9 shows a non-limiting example block diagram of a hardware architecture for the system 1260. In the example shown in FIG. 9, the client device 1210 communicates with a server system 1200 via a network 1240. The network 1240 could comprise a network of interconnected computing devices, such as the internet. The network 1240 could also comprise a local area network (LAN) or could comprise a peer-to-peer connection between the client device 1210 and the server system 1200. As will be described below, the hardware elements shown in FIG. 9 could be used to implement the various software components and actions shown and described above as being included in and/or executed at the client device 1210 and server system 1200.

In some embodiments, the client device 1210 (which may also be referred to as "client system" herein) includes one or more of the following: one or more processors 1212; one or more memory devices 1214; one or more network interface devices 1216; one or more display interfaces 1218; and one or more user input adapters 1220. Additionally, in some embodiments, the client device 1210 is connected to or includes a display device 1222. As will explained below, these elements (e.g., the processors 1212, memory devices 1214, network interface devices 1216, display interfaces 1218, user input adapters 1220, display device 1222) are hardware devices (for example, electronic circuits or combinations of circuits) that are configured to perform various different functions for the computing device 1210.

In some embodiments, each or any of the processors 1212 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1212 uses an instruction set architecture such as x86 or Advanced RISC Machine (ARM).

In some embodiments, each or any of the memory devices 1214 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1212). Memory devices 1214 are examples of non-volatile computer-readable storage media.

In some embodiments, each or any of the network interface devices 1216 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1218 is or includes one or more circuits that receive data from the processors 1212, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1222, which displays the image data. Alternatively or additionally, in some embodiments, each or any of the display interfaces 1218 is or includes, for example, a video card, video adapter, or graphics processing unit (GPU).

In some embodiments, each or any of the user input adapters 1220 is or includes one or more circuits that receive and process user input data from one or more user input devices (not shown in FIG. 9) that are included in, attached to, or otherwise in communication with the client device 1210, and that output data based on the received input data to the processors 1212. Alternatively or additionally, in some embodiments each or any of the user input adapters 1220 is or includes, for example, a PS/2 interface, a USB interface, a touchscreen controller, or the like; and/or the user input adapters 1220 facilitates input from user input devices (not shown in FIG. 9) such as, for example, a keyboard, mouse, trackpad, touchscreen, etc. . . . .

In some embodiments, the display device 1222 may be a Liquid Crystal Display (LCD) display, Light Emitting Diode (LED) display, or other type of display device. In embodiments where the display device 1222 is a component of the client device 1210 (e.g., the computing device and the display device are included in a unified housing), the display device 1222 may be a touchscreen display or non-touchscreen display. In embodiments where the display device 1222 is connected to the client device 1210 (e.g., is external to the client device 1210 and communicates with the client device 1210 via a wire and/or via wireless communication technology), the display device 1222 is, for example, an external monitor, projector, television, display screen, etc. . . . .

In various embodiments, the client device 1210 includes one, or two, or three, four, or more of each or any of the above-mentioned elements (e.g., the processors 1212, memory devices 1214, network interface devices 1216, display interfaces 1218, and user input adapters 1220). Alternatively or additionally, in some embodiments, the client device 1210 includes one or more of: a processing system that includes the processors 1212; a memory or storage system that includes the memory devices 1214; and a network interface system that includes the network interface devices 1216.

The client device 1210 may be arranged, in various embodiments, in many different ways. As just one example, the client device 1210 may be arranged such that the processors 1212 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the client device 1210 may be arranged such that: the processors 1212 include two, three, four, five, or more multi-core processors; the network interface devices 1216 include a first network interface device that implements Ethernet and a second network interface device that implements WiFi and/or Bluetooth; and the memory devices 1214 include a RAM and a flash memory or hard disk.

Server system 1200 also comprises various hardware components used to implement the software elements for server system(s) 20. In some embodiments, the server system 1200 (which may also be referred to as "server device" herein) includes one or more of the following: one or more processors 1202; one or more memory devices 1204; and one or more network interface devices 1206. As will explained below, these elements (e.g., the processors 1202, memory devices 1204, network interface devices 1206) are hardware devices (for example, electronic circuits or combinations of circuits) that are configured to perform various different functions for the server system 1200.

In some embodiments, each or any of the processors 1202 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1202 uses an instruction set architecture such as x86 or Advanced RISC Machine (ARM).

In some embodiments, each or any of the memory devices 1204 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1202). Memory devices 1204 are examples of non-volatile computer-readable storage media.

In some embodiments, each or any of the network interface devices 1206 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In various embodiments, the server system 1200 includes one, or two, or three, four, or more of each or any of the above-mentioned elements (e.g., the processors 1202, memory devices 1204, network interface devices 1206). Alternatively or additionally, in some embodiments, the server system 1200 includes one or more of: a processing system that includes the processors 1202; a memory or storage system that includes the memory devices 1204; and a network interface system that includes the network interface devices 1206.

The server system 1200 may be arranged, in various embodiments, in many different ways. As just one example, the server system 1200 may be arranged such that the processors 1202 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the server system 1200 may be arranged such that: the processors 1202 include two, three, four, five, or more multi-core processors; the network interface devices 1206 include a first network interface device that implements Ethernet and a second network interface device that implements WiFi and/or Bluetooth; and the memory devices 1204 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the client device 1210 or the server system 1200, each of which will be referred to individually for clarity as a "component" for the remainder of this paragraph, are implemented using an example of the client device 1210 or the server system 1200 of FIG. 9.

In such embodiments, the following applies for each component: (a) the elements of the client device 1210 shown in FIG. 9 (i.e., the one or more processors 1212, one or more memory devices 1214, one or more network interface devices 1216, one or more display interfaces 1218, and one or more user input adapters 1220) and the elements of the server system 1200 (i.e., the one or more processors 1202, one or more memory devices 1204, one or more network interface devices 1206), or appropriate combinations or subsets of the foregoing, are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the respective memory devices (e.g., in various embodiments, in a volatile memory device such as a RAM or an instruction register and/or in a non-volatile memory device such as a flash memory or hard disk) and all actions described herein as performed by the software modules are performed by the respective processors in conjunction with, as appropriate, the other elements in and/or connected to the client device 1210 or server system 1200; (c) alternatively or additionally, to the extent it is described herein that the component processes and/or otherwise handles data, in some embodiments, such data is stored in the respective memory devices (e.g., in some embodiments, in a volatile memory device such as a RAM and/or in a non-volatile memory device such as a flash memory or hard disk) and/or is processed/handled by the respective processors in conjunction, as appropriate, the other elements in and/or connected to the client device 1210 or server system 1200; (d) alternatively or additionally, in some embodiments, the respective memory devices store instructions that, when executed by the respective processors, cause the processors to perform, in conjunction with, as appropriate, the other elements in and/or connected to the client device 1210 or server system 1200, each or any combination of actions described herein as performed by the component and/or by any software modules described herein as included within the component.

The hardware configurations shown in FIG. 9 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 9, (e) via other hardware arrangements, architectures, and configurations, and/or via combinations of the technology described in (a) through (e).

In many places in this document, software modules and actions performed by software modules are described. This is done for ease of description; it should be understood that, whenever it is described in this document that a software module performs any action, the action is in actuality performed by underlying hardware components (such as a processor and a memory) according to the instructions and data that comprise the software module.

Technical Advantages

The technology described herein provides improvements to existing technology for using an image capture device to interact with a display. In particular, the technology allows for a user to operate an image capture device in order to generate and/or control objects on a larger display. In doing so, the technology advantageously improves the overall human-computer interaction by enabling the user to use a larger display (e.g., television) to interact with a smaller device (e.g., image capture device with a touch sensitive display). Specifically, the technology advantageously allows the user to use an "everyday" device (e.g., smart phone) in conjunction with a large display to perform actions on the large display based on how the user is operating the smaller device.

The technology also, in certain example embodiments, advantageously allows the user to operate an image capture device to image a real world object (e.g., piece of paper) to detect a tracking image so that the image capture device can operate in an augmented reality space. In doing so, the technology advantageously transforms an "everyday" device (e.g., smart phone) into a tool usable in an augmented reality environment thus improving the overall operation of the device.

Selected Definitions

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, w Whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

FURTHER APPLICATIONS OF DESCRIBED SUBJECT MATTER

Although process steps, algorithms or the like, including without limitation with reference to FIGS. 1-7, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

At least the following is claimed:

1. A system, comprising:
an image capture device; and
processing circuitry having at least one processor and at least one memory, wherein the processing circuitry is configured to execute software that causes the system to:
display, on a display surface separate from the image capture device, a recognizable tracking image, or portion thereof, with at least partial opacity, at least some of the time;
capture image data using the image capture device;
detect recognizable features in the captured image data associated with the displayed tracking image,
wherein the displayed tracking image, or the portion thereof, is selectively masked to include a predefined, or dynamically determined, sub-region that occurs substantially within a current field of view of the image capture device;
track the display surface associated with the displayed tracking image using the recognizable features;
determine a position and an orientation of the image capturing device with respect to the display surface; and
generate output data using the determined position and orientation of the image capturing device with respect to the display surface, wherein the output data is used to generate a user interface displayed on the display surface, and the user interface includes, or is co-displayed with, the displayed tracking image, or the portion thereof.

2. The system of claim 1, wherein the image capture device is operable as a controller to relay three-dimensional movements in space.

3. The system of claim 2, wherein the controller operates with up to six degrees of freedom.

4. The system of claim 1, wherein the processing circuitry is further configured to execute software that causes the system to:
extract an occluding object image from the captured image data, wherein the object image depicts a real-world occluding object; and
generate image data associated with the occluding object image, wherein
a plane of the surface is positioned behind the object image with respect to a viewpoint of the image capture device.

5. The system of claim 1, wherein the generated output data includes a three-dimensional model of a robot whose position, orientation, and body pose mimic a user's own, with respect to the surface and/or with respect to the image capture device.

6. The system of claim 1, wherein the system is further caused to:

detect and track recognizable features of a real-world object positioned between the image capture device and the surface; and determine the position and orientation of the real-world object with respect to the surface and/or with respect to the image capture device, using the detected recognizable features of the real-world object.

7. The system of claim 1, wherein one or more points on an image plane of the captured image are translated, in a virtual three-dimensional scene, along a ray from the viewpoint of a virtual camera in the virtual three-dimensional scene to the surface.

8. The system of claim 7, wherein at least one translated point, from the one or more points, is used to operate a cursor on or near the surface.

9. The system of claim 7, wherein a plurality of translated points, from the one or more points, is used to determine the location and shape of visuals displayed on a display surface.

10. The system of claim 1, wherein the tracking image is configured to change periodically at different points in time.

11. A method for generating a virtual environment, the method comprising:

displaying, on a display surface separate from an image capture device, a recognizable tracking image, or a portion thereof, with at least partial opacity, at least some of the time;

capturing image data using the image capture device;

detecting recognizable features in the captured image data associated with the displayed tracking image, wherein the displayed tracking image, or the portion thereof, is selectively masked to include a predefined, or dynamically determined, sub-region that occurs substantially within a current field of view of the image capture device;

tracking the display surface associated with the displayed tracking image using the recognizable features;

determining a position and an orientation of the image capture device with respect to the display surface; and generating output data using the determined position and orientation of the image capture device with respect to the display surface, wherein the output data is used to generate a user interface displayed on the display surface, and the user interface includes, or is co-displayed with, the displayed tracking image, or the portion thereof.

12. The method of claim 11, wherein the image capture device is operable as a controller to relay three-dimensional movements in space.

13. A system, comprising:

an image capture device; and processing circuitry having at least one processor and at least one memory, wherein the processing circuitry is configured to execute software that causes the system to:

capture image data using the image capture device;

detect and track recognizable features in the captured image data associated with a recognizable tracking image, wherein the recognizable tracking image exists on a surface, and the recognizable tracking image, or a portion thereof, may be displayed on a display surface separate from the image capture device, with at least partial opacity, at least some of the time;

detect and track one or more recognizable physical feature points in the captured image data, wherein the surface is positioned, with respect to a viewpoint of the image capture device, behind the one or more detected physical feature points;

translate each of the one or more detected physical feature points, in a virtual three-dimensional scene, along each ray from the viewpoint of a virtual camera in the virtual three-dimensional scene, through each detected physical feature point, to the surface; and generate output data using the one or more translated detected physical feature points, wherein the output data is used to generate a user interface displayed on a display surface, the display surface being (i) integrated with the image capture device, or (ii) separate from the image capture device, and wherein, in case (ii), the user interface includes, or is co-displayed with, the displayed tracking image, or the portion thereof.

14. The system of claim 13, wherein the one or more detected physical feature points are part of a human body.

15. The system of claim 13, wherein the image capture device is operable as a controller to relay three-dimensional movements in space.

16. The system of claim 13, wherein the system is further caused to:

extract an occluding object image from the captured image data, wherein the object image depicts a real-world occluding object; and generate image data associated with the occluding object image, wherein a plane of the surface is positioned behind the object image with respect to a viewpoint of the image capture device.

17. The system of claim 13, wherein the generated output data includes a three- dimensional model of a robot or robotic figure, wherein the position and orientation of at least a portion of the three-dimensional model substantially mimic the position and orientation of a corresponding portion of a user's body with respect to the surface and/or the image capture device, and wherein a pose of the portion of the three-dimensional model substantially mimics the pose of the corresponding portion of the user's body.

18. The system of claim 13, wherein one or more points on an image plane of the captured image are translated, in a virtual three-dimensional scene, along a ray from the viewpoint of a virtual camera in the virtual three-dimensional scene to the surface.

19. The system of claim 13, wherein the system is further caused to:

detect and track recognizable features of a real-world object positioned between the image capture device and the surface; and determine the position and orientation of the real-world object with respect to the surface and/or with respect to the image capture device, using the detected recognizable features of the real-world object.

20. The system of claim 13, wherein detection of different physical feature points causes the system to automatically change software state and/or automatically change a cursor
displayed on the display surface.

* * * * *